(12) United States Patent
Fudaba et al.

(10) Patent No.: US 8,489,236 B2
(45) Date of Patent: Jul. 16, 2013

(54) CONTROL APPARATUS AND CONTROL METHOD FOR ROBOT ARM, ROBOT, CONTROL PROGRAM FOR ROBOT ARM, AND INTEGRATED ELECTRONIC CIRCUIT

(71) Applicant: Panasonic Corporation, Osaka (JP)

(72) Inventors: Yudai Fudaba, Osaka (JP); Masaki Yamamoto, Nara (JP); Yuko Tsusaka, Osaka (JP); Taichi Sato, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/630,430

(22) Filed: Sep. 28, 2012

(65) Prior Publication Data

US 2013/0030569 A1 Jan. 31, 2013

Related U.S. Application Data

(63) Continuation of application No. PCT/JP2012/000034, filed on Jan. 5, 2012.

(30) Foreign Application Priority Data

Jan. 27, 2011 (JP) ................................. 2011-015226

(51) Int. Cl.
*G06F 19/00* (2011.01)
*B25J 9/22* (2006.01)
*B25J 17/00* (2006.01)
*B25J 17/02* (2006.01)
*B25J 18/00* (2006.01)
*G05B 19/42* (2006.01)

(52) U.S. Cl.
USPC ........ 700/245; 901/4; 318/568.14; 74/490.01

(58) Field of Classification Search
USPC .................. 318/568.1–568.25; 700/245–264; 706/45–61; 901/3–5, 14–18, 30–35, 49, 50; 74/490.01–490.06
See application file for complete search history.

(56) References Cited

U.S. PATENT DOCUMENTS 6,212,443 B1 * 4/2001 Nagata et al. ................. 700/245
6,477,448 B1 11/2002 Maruyama
(Continued)

FOREIGN PATENT DOCUMENTS

JP 1-164541 6/1989
JP 4-164584 6/1992
(Continued)

OTHER PUBLICATIONS

International Search Report issued Apr. 3, 2012 in International (PCT) Application No. PCT/JP2012/000034.

*Primary Examiner* — Khoi Tran
*Assistant Examiner* — Abby Lin
(74) *Attorney, Agent, or Firm* — Wenderoth, Lind & Ponack, L.L.P.

(57) ABSTRACT

There is provided a control apparatus and control method for robot arm, robot, control program for robot arm, and integrated electronic circuit, which can improve robot arm operability upon performing tasks such as cooperative conveyance and direct teaching. The grip portion separated from the end effector attached to the robot arm is provided. When a person grips and shifts the grip portion, a tracking control unit controls so that the robot arm follows the shift. A fixing switch unit switches between a fixing state where, upon switching to "playback mode", a fixing portion is located at a fixed position to fix the end effector and the grip portion to maintain a gap distance therebetween and a relatively shiftable state where, upon switching to "teaching mode", the fixing portion is located at an accommodated position to relatively shift them from each other without maintaining the gap distance.

8 Claims, 43 Drawing Sheets

U.S. PATENT DOCUMENTS

2007/0112458 A1    5/2007    Kondo et al.
2007/0118252 A1*   5/2007    Okazaki et al. ............... 700/254

FOREIGN PATENT DOCUMENTS

| | | |
|---|---|---|
| JP | 6-131032 | 5/1994 |
| JP | 11-231925 | 8/1999 |
| JP | 2000-246674 | 9/2000 |
| JP | 2001-260062 | 9/2001 |
| JP | 2005-14132 | 1/2005 |
| JP | 2005-14133 | 1/2005 |
| JP | 2005-193340 | 7/2005 |
| JP | 2006-247787 | 9/2006 |
| JP | 2007-76807 | 3/2007 |

* cited by examiner

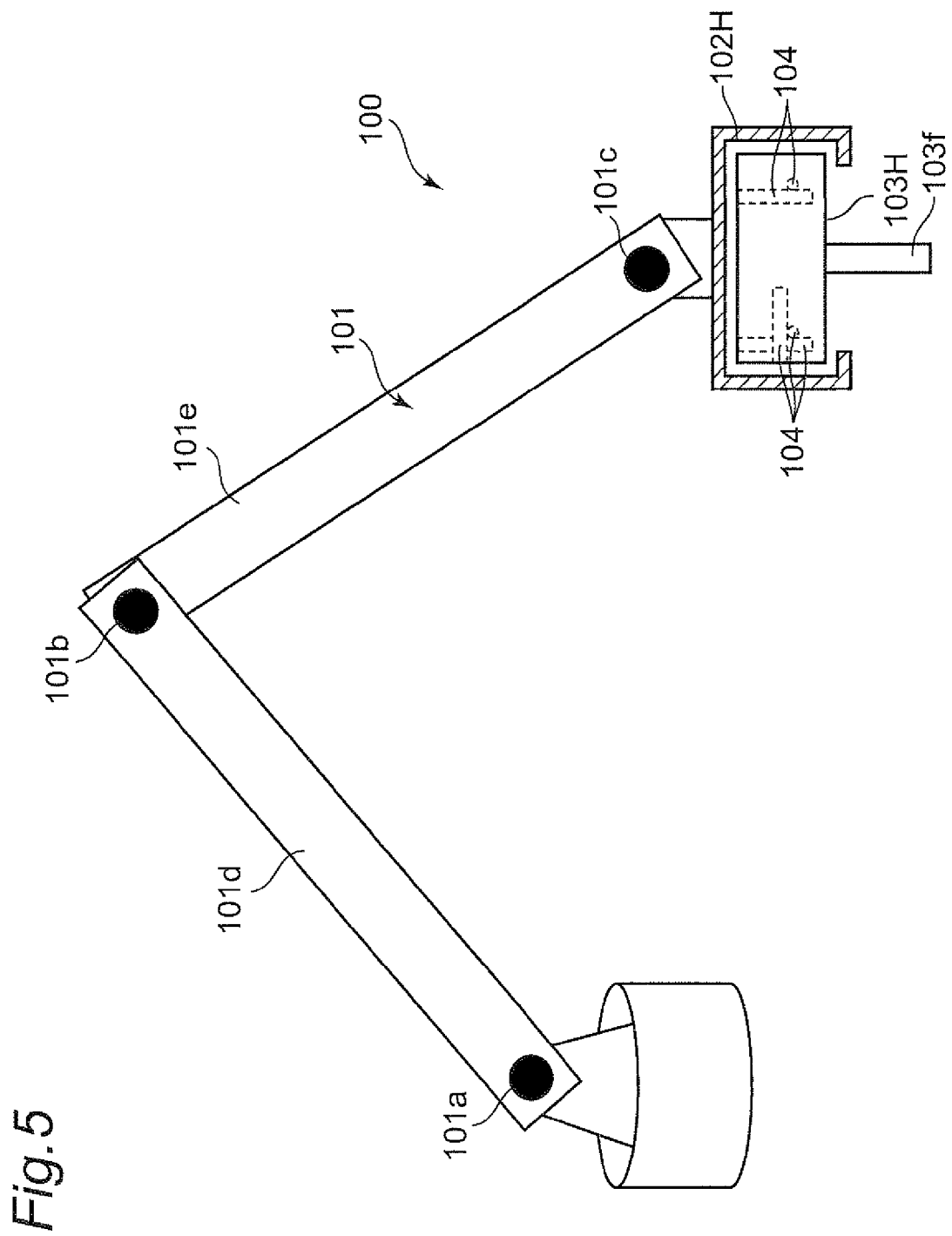

Fig.28

| MAGNITUDE OF FORCE | VELOCITY (mm/ms) |
|---|---|
| TIME POINT WHEN EXCEEDING 1.0 N | 0.008 |
| TIME POINT WHEN EXCEEDING 3.0 N | 0.015 |
| OTHER TIME POINTS | TRAJECTORY DURING TEACHING MOTION |

CONTROL APPARATUS AND CONTROL METHOD FOR ROBOT ARM, ROBOT, CONTROL PROGRAM FOR ROBOT ARM, AND INTEGRATED ELECTRONIC CIRCUIT

This is a continuation application of International Application No. PCT/JP2012/000034, with an international filing date of Jan. 5, 2012, which claims priority of Japanese Patent Application No. 2011-015226 filed on Jan. 27, 2011, the content of which is incorporated herein by reference.

TECHNICAL FIELD

The technical field relates to a control apparatus and control method for a robot arm, a robot including the control apparatus for a robot arm, a control program for a robot arm, and an integrated electronic circuit, which are used for causing motions of the robot to perform desired tasks such as teaching or cooperative conveyance.

BACKGROUND ART

In recent years, model changes at manufacturing sites have been frequently observed in order to realize small lot production in great varieties. In such recent manufacturing sites where cell production has been widely conducted, in order to automate, with use of robots, thread fastening, fitting and attaching components, inserting flexible boards or the like, polishing, etc., such robots are required to be flexibly adaptable to a wide variety of types of components and to various operation steps. Every time components to be handled are replaced, assembling positions, directions, or the like are changed, and the process order of tasks is also changed. Accordingly, the robots need to be adapted to these changes. Those tasks of handling soft articles, such as insertion of a flexible board, are complicated, so that such tasks are still performed manually. A person can perform a complicated task by estimating the degree of warp or the position of such a soft article on the basis of reactive force that can be felt with a hand when the soft article is in contact with a target object and is thus warped.

To the contrary, in a robot, it is impossible to formulate force information or positional information on a soft article that is warped in a different manner or at a different portion in each trial. Therefore, it is quite difficult for such a robot to perform a complicated task in accordance with acquired reactive force. There are strong demands for solving this problem to automate, by means of robots, those tasks that have been primarily performed manually.

In order to realize such demands, there have been conventionally adopted methods of teaching tasks to robots with use of teaching pendants or programming. However, teaching according to these methods needs a quite large number of teaching steps. In addition, it may be impossible in some cases to teach a task that needs complicated movement such as moving a plurality of joints of a robot at one time.

As mentioned above, there are limits in the methods with use of the teaching pendants or programming.

Therefore, conventionally, there has been adopted a method of easily teaching by means of direct teaching, i.e. teaching by touching a robot. The direct teaching has advantages such as enabling intuitive operations, and achieving operations appropriate for physical reactive force because a working person feels the reactive force when the robot is in contact with a target object. On the other hand, in a case where a robot is heavy by itself, the direct teaching also has disadvantages such as that a person cannot support the robot and thus cannot operate the robot, and that the person cannot feel the physical reactive force when the robot is in contact with a target object because of the heavy weight of the robot itself. It is therefore quite important, upon teaching a robot that has poor operability, to improve the operability of the robot.

There has been devised a configuration for direct teaching, in which a distal end of an arm tip of a first robot arm holds a second robot arm that is attached by means of a spring. This configuration including the two robot arms realizes more accurate direct teaching, as compared to the configuration including only one robot arm according to the conventional art (refer to Patent Literature 1).

There has been also adopted a method of displacing a retainer member with small force even in a case of holding a relatively heavy object, by limiting the shift of the retainer member into the horizontal direction and detecting the peripheral environment (the amount of displacement of or force information on a retained target object) to perform impedance control (refer to Patent Literature 2).

On the other hand, in a case where a task of conveying a product or a task of fitting a heavy component is too complicated to realize by means of a robot in a method of using a teaching pendant or programming, such a task has been performed by two working persons. There are strong demands for reducing workloads of working persons in these tasks with use of robots. Upon automation of such a task, it is impossible for a working person to teach the task to a robot by direct teaching because a product is too heavy. In this case, there is adopted a cooperative conveyance method in which the robot and the working person cooperatively convey such a heavy product that is gripped by the robot.

In this cooperative conveyance, there is an idea of causing a robot to generate assistive power, so that the product can be cooperatively conveyed by small operation force. The value of this assistive power is obtained in the following manner. The joint angle of a robot and the position of an arm tip of the robot, as well as force to be applied to a target object by a working person cooperating with the robot are detected respectively, a viscosity coefficient of the fingers of the working person, an elastic modulus thereof, and positions of the fingers at the natural lengths of the working person are estimated respectively from these detected values, and the value of the assistive power is obtained from these estimated values (refer to Patent Literature 3).

There has been also disclosed a configuration for power assistive conveyance upon conveying an object, in which a floating mechanism is provided between a portion gripped by a person and a portion to be conveyed, so that the assistive conveyance is controlled in accordance with the amount of displacement of the floating mechanism (refer to Patent Literature 4).

Citation List

Patent Literature

Patent Literature 1: JP H04-164584 A
Patent Literature 2: JP 2006-247787 A
Patent Literature 3: JP 2007-76807 A
Patent Literature 4: JP 2005-193340 A

SUMMARY OF THE INVENTION

Patent Literature 1 has a problem in operability because the robot arm, which is attached to the distal end of the arm tip by means of the spring, is influenced by elastic force of the spring. In addition, because the first and second robot arms do not operate in cooperation with each other, it is necessary to move the second arm after the motion of the first robot arm is completed if the task has a large working area, which leads to increase in operation steps.

In the technique according to Patent Literature 2, the retainer member can move only in the horizontal direction and it is difficult to move the retainer member in other directions. Moreover, the retainer member and the robot arm are made in contact with each other. The robot arm is thus influenced by the weight of the retainer member or frictional force generated by such contact, which causes a problem in operability.

Although the robot according to Patent Literature 3 generates assistive power, the person still feels the weight of the target object or that of the robot due to errors in the estimated values, thereby causing a problem in operability. Furthermore, it is required to provide a force sensor, which remarkably increases the cost.

Patent Literature 4 discloses only teaching related to power assistance, and never refers to a playback mode that is to be selected by switching after a teaching motion and is performed.

One non-limiting and exemplary embodiment provides a control apparatus and a control method for a robot arm, a robot, a control program for a robot arm, and an integrated electronic circuit, which can improve operability of the robot arm to easily move the robot arm upon performing tasks such as cooperative conveyance and direct teaching.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: a control apparatus of a robot arm, for controlling a motion of the robot arm, the control apparatus comprising:

an end effector attached to a main body of the robot arm touched and operated by a person and caused to perform a task;

a grip portion attached to the main body of the robot arm so as to be separated from the end effector with a gap of a predetermined size being provided therebetween, the grip portion being relatively shiftable with respect to the end effector and being gripped by the person during the operation;

a relative positional information acquisition unit that acquires information on a relative position of the grip portion with respect to the end effector during the operation;

a tracking control unit that obtains a shift amount of the robot arm in order to perform tracking control of shifting the robot arm in accordance with an amount of variation of a size of the gap between the end effector and the grip portion so that the information on the relative position acquired by the relative positional information acquisition unit is within a range of a predetermined threshold;

a control unit that controls the robot arm so as to shift in accordance with the amount of variation of the size of the gap between the end effector and the grip portion, based on the shift amount of the robot arm obtained by the tracking control unit;

a fixing portion including a fixing member shiftable between a fixed position where the fixing member is in contact with the end effector and the grip portion to fix the end effector and the grip portion and restrict relative shift between the end effector and the grip portion, and an accommodated position where the fixed member is accommodated in the end effector or in the grip portion and allows the end effector and the grip portion to shift relatively, the fixing portion maintaining the size of the gap between the end effector and the grip portion when the fixing member is located at the fixed position;

a mode switch unit that switches between a "teaching mode" and a "playback mode" as a control mode of the robot arm;

a fixing switch unit that switches between a fixing state where, when the mode switch unit switches to the "playback mode", the fixing portion is located at the fixed position to fix the end effector and the grip portion and maintain the size of the gap between the end effector and the grip portion, and a relatively shiftable state where, when the mode switch unit switches to the "teaching mode", the fixing portion is located at the accommodated position and allows the end effector and the grip portion to shift relatively without maintaining the size of the gap between the end effector and the grip portion;

an arm tip positional information acquisition unit that acquires positional information on the end effector of the robot arm during the "teaching mode"; and a desired trajectory generation unit that generates a desired trajectory of the end effector of the robot arm during the "teaching mode", based on the arm tip positional information acquired by the arm tip positional information acquisition unit and the information on the relative position acquired by the relative positional information acquisition unit, wherein the control unit causes the tracking control unit to perform tracking control on the robot arm moving in accordance with a teaching operation of the person when the mode switch unit switches to the "teaching mode", and controls the robot arm in accordance with the desired trajectory generated by the desired trajectory generation unit when the mode switch unit switches to the "playback mode".

These general and specific aspects may be implemented using a system, a method, and a computer program, and any combination of systems, methods, and computer programs.

BRIEF DESCRIPTION OF DRAWINGS

These and other aspects and features of the present invention will become clear from the following description taken in conjunction with the embodiments thereof with reference to the accompanying drawings, in which:

FIG. 5 is a configuration view different from FIG. 1, showing an end effector, a grip portion, and the relative position sensors in the robot according to the first embodiment of the present invention;

FIG. 18 is an explanatory view of a robot arm in a robot according to a third embodiment of the present invention, more specifically, wherein FIG. 18(a) to (c) are an explanatory view showing a movable range of the robot arm, an explanatory view showing a movable range of the robot arm during a teaching motion, and a movable range of the robot arm during a playback motion in the robot according to the third embodiment of the present invention;

FIG. 28 is an explanatory view on sensor feedback in the robot according to the fourth embodiment of the present invention;

DETAILED DESCRIPTION

Figure 1:
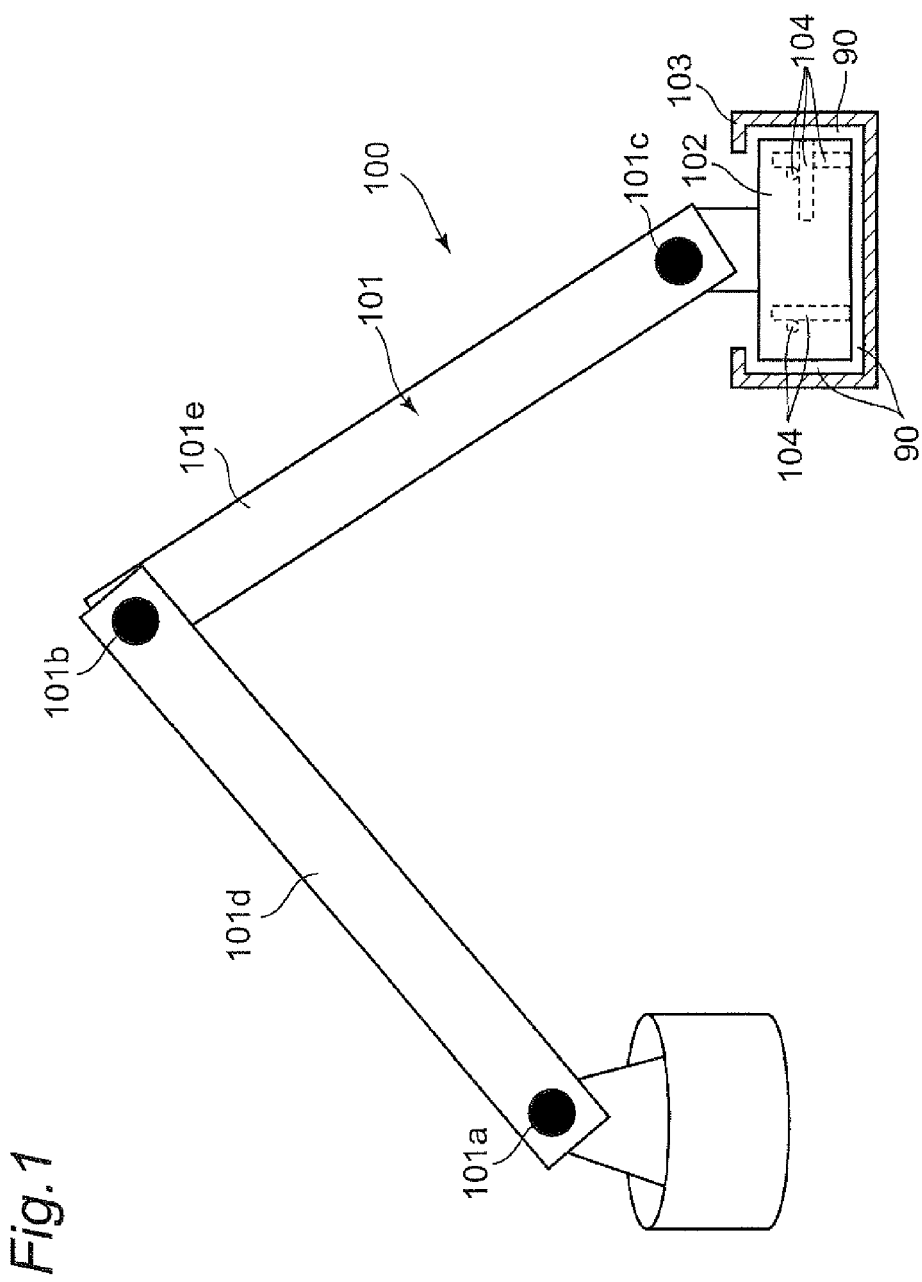
FIG. 1 is a configuration view showing an end effector, a grip portion, and relative position sensors in a robot according to a first embodiment of the present invention.

Before the description of the present invention proceeds, it is to be noted that like parts are designated by like reference numerals throughout the accompanying drawings.

Prior to the detailed description of embodiments of the present invention based upon the drawings, various aspects for the present invention will be explained.

According to a first aspect of the present invention, there is provided a control apparatus of a robot arm, for controlling a motion of the robot arm, the control apparatus comprising:

an end effector attached to a main body of the robot arm touched and operated by a person and caused to perform a task;

a grip portion attached to the main body of the robot arm so as to be separated from the end effector with a gap of a predetermined size being provided therebetween, the grip portion being relatively shiftable with respect to the end effector and being gripped by the person during the operation;

a relative positional information acquisition unit that acquires information on a relative position of the grip portion with respect to the end effector during the operation;

a tracking control unit that obtains a shift amount of the robot arm in order to perform tracking control of shifting the robot arm in accordance with an amount of variation of a size of the gap between the end effector and the grip portion so that the information on the relative position acquired by the relative positional information acquisition unit is within a range of a predetermined threshold;

a control unit that controls the robot arm so as to shift in accordance with the amount of variation of the size of the gap between the end effector and the grip portion, based on the shift amount of the robot arm obtained by the tracking control unit;

a fixing portion including a fixing member shiftable between a fixed position where the fixing member is in contact with the end effector and the grip portion to fix the end effector and the grip portion and restrict relative shift between the end effector and the grip portion, and an accommodated position where the fixed member is accommodated in the end effector or in the grip portion and allows the end effector and the grip portion to shift relatively, the fixing portion maintaining the size of the gap between the end effector and the grip portion when the fixing member is located at the fixed position;

a mode switch unit that switches between a "teaching mode" and a "playback mode" as a control mode of the robot arm;

a fixing switch unit that switches between a fixing state where, when the mode switch unit switches to the "playback mode", the fixing portion is located at the fixed position to fix the end effector and the grip portion and maintain the size of the gap between the end effector and the grip portion, and a relatively shiftable state where, when the mode switch unit switches to the "teaching mode", the fixing portion is located at the accommodated position and allows the end effector and the grip portion to shift relatively without maintaining the size of the gap between the end effector and the grip portion;

an arm tip positional information acquisition unit that acquires positional information on the end effector of the robot arm during the "teaching mode"; and a desired trajectory generation unit that generates a desired trajectory of the end effector of the robot arm during the "teaching mode", based on the arm tip positional information acquired by the arm tip positional information acquisition unit and the information on the relative position acquired by the relative positional information acquisition unit, wherein the control unit causes the tracking control unit to perform tracking control on the robot arm moving in accordance with a teaching operation of the person when the mode switch unit switches to the "teaching mode", and controls the robot arm in accordance with the desired trajectory generated by the desired trajectory generation unit when the mode switch unit switches to the "playback mode".

According to a second aspect of the present invention, there is provided the control apparatus for a robot arm according to the first aspect, further comprising:

a movable region acquisition unit that acquires a movable region of the robot arm; and a movable region limiting unit that obtains a limited region smaller than the movable region, from the movable region acquired by the movable region acquisition unit and the information on the relative position acquired by the relative positional information acquisition unit; wherein in the "teaching mode", the control unit controls the robot arm to be limitedly movable only within the limited region obtained by the movable region limiting unit.

According to a third aspect of the present invention, there is provided the control apparatus for a robot arm according to the first aspect, further comprising:

a force information acquisition unit that acquires information on force externally applied to the grip portion; wherein the control unit controls the robot arm so that the robot arm is taught and plays back a task performed with contact between the person and the grip portion, based on the force information acquired by the force information acquisition unit.

According to a fourth aspect of the present invention, there is provided the control apparatus for a robot arm according to the third aspect, wherein the control unit generates a sensor feedback rule in the "teaching mode" based on the desired trajectory generated by the desired trajectory generation unit and the force information acquired by the force information acquisition unit, and controls the motion of the robot arm in the "playback mode" in accordance with the desired trajectory, the force information acquired by the force information acquisition unit in the "playback mode", and the generated sensor feedback rule.

According to a fifth aspect of the present invention, there is provided a robot comprising:

the robot arm according to any one of the first to fourth aspects; and a control apparatus for the robot arm.

According to a sixth aspect of the present invention, there is provided a control method of a robot arm, for controlling a motion of the robot arm including: an end effector attached to a main body of the robot arm touched and operated by a person and caused to perform a task; and a grip portion attached to the main body of the robot arm so as to be separated from the end effector with a gap of a predetermined size being provided therebetween, the grip portion being relatively shiftable with respect to the end effector and being gripped by the person during the operation, the control method comprising:

acquiring, by a relative positional information acquisition unit, information on a relative position of the grip portion with respect to the end effector during the operation;

obtaining, by a tracking control unit, a shift amount of the robot arm in order to perform tracking control of shifting the robot arm in accordance with an amount of variation of a size of the gap between the end effector and the grip portion so that the information on the relative position acquired by the relative positional information acquisition unit is within a range of a predetermined threshold;

controlling, by a control unit, the robot arm so as to shift in accordance with the amount of variation of the size of the gap between the end effector and the grip portion, based on the shift amount of the robot arm obtained by the tracking control unit;

maintaining the size of the gap between the end effector and the grip portion, by a fixing portion including a fixing member shiftable between a fixed position where the fixing member is in contact with the end effector and the grip portion to fix the end effector and the grip portion and restrict relative shift between the end effector and the grip portion, and an accommodated position where the fixed member is accommodated in the end effector or in the grip portion and allows the end effector and the grip portion to shift relatively, when the fixing member is located at the fixed position;

switching, by a mode switch unit, between a "teaching mode" and a "playback mode" as a control mode of the robot arm;

switching, by a fixing switch unit, between a fixing state where, when the mode switch unit switches to the "playback mode", the fixing portion is located at the fixed position to fix the end effector and the grip portion and maintain the size of the gap between the end effector and the grip portion, and a relatively shiftable state where, when the mode switch unit switches to the "teaching mode", the fixing portion is located at the accommodated position and allows the end effector and the grip portion to shift relatively without maintaining the size of the gap between the end effector and the grip portion;

acquiring, by an arm tip positional information acquisition unit, positional information on the end effector of the robot arm during the "teaching mode"; and generating, by a desired trajectory generation unit, a desired trajectory of the end effector of the robot arm during the "teaching mode", based on the arm tip positional information acquired by the arm tip positional information acquisition unit and the information on the relative position acquired by the relative positional information acquisition unit, wherein the control unit causes the tracking control unit to perform tracking control on the robot arm moving in accordance with a teaching operation of the person when the mode switch unit switches to the "teaching mode", and controls the robot arm in accordance with the desired trajectory generated by the desired trajectory generation unit when the mode switch unit switches to the "playback mode".

According to a seventh aspect of the present invention, there is provided a control program of a robot arm, for controlling a motion of the robot arm including: an end effector attached to a main body of the robot arm touched and operated by a person and caused to perform a task; and a grip portion attached to the main body of the robot arm so as to be separated from the end effector with a gap of a predetermined size being provided therebetween, the grip portion being relatively shiftable with respect to the end effector and being gripped by the person during the operation, the control program causing a computer to execute steps of:

acquiring, by a relative positional information acquisition unit, information on a relative position of the grip portion with respect to the end effector during the operation;

obtaining, by a tracking control unit, a shift amount of the robot arm in order to perform tracking control of shifting the robot arm in accordance with an amount of variation of a size of the gap between the end effector and the grip portion so that the information on the relative position acquired by the relative positional information acquisition unit is within a range of a predetermined threshold;

controlling, by a control unit, the robot arm so as to shift in accordance with the amount of variation of the size of the gap between the end effector and the grip portion, based on the shift amount of the robot arm obtained by the tracking control unit;

maintaining the size of the gap between the end effector and the grip portion, by a fixing portion including a fixing member shiftable between a fixed position where the fixing member is in contact with the end effector and the grip portion to fix the end effector and the grip portion and restrict relative shift between the end effector and the grip portion, and an accommodated position where the fixed member is accommodated in the end effector or in the grip portion and allows the end effector and the grip portion to shift relatively, when the fixing member is located at the fixed position;

switching, by a mode switch unit, between a "teaching mode" and a "playback mode" as a control mode of the robot arm;

switching, by a fixing switch unit, between a fixing state where, when the mode switch unit switches to the "playback mode", the fixing portion is located at the fixed position to fix the end effector and the grip portion and maintain the size of the gap between the end effector and the grip portion, and a relatively shiftable state where, when the mode switch unit switches to the "teaching mode", the fixing portion is located at the accommodated position and allows the end effector and the grip portion to shift relatively without maintaining the size of the gap between the end effector and the grip portion;

acquiring, by an arm tip positional information acquisition unit, positional information on the end effector of the robot arm during the "teaching mode";

generating, by a desired trajectory generation unit, a desired trajectory of the end effector of the robot arm during the "teaching mode", based on the arm tip positional information acquired by the arm tip positional information acquisition unit and the information on the relative position acquired by the relative positional information acquisition unit; and causing, by the control unit, the tracking control unit to perform tracking control on the robot arm moving in accordance with a teaching operation of the person when the mode switch unit switches to the "teaching mode", and controlling, by the control unit, the robot arm in accordance with the desired trajectory generated by the desired trajectory generation unit when the mode switch unit switches to the "playback mode".

According to an eighth aspect of the present invention, there is provided an integrated electronic circuit of a robot arm, for controlling a motion of the robot arm including: an end effector attached to a main body of the robot arm touched and operated by a person and caused to perform a task; and a grip portion attached to the main body of the robot arm so as to be separated from the end effector with a gap of a predetermined size being provided therebetween, the grip portion being relatively shiftable with respect to the end effector and being gripped by the person during the operation, the integrated electronic circuit comprising:

acquiring, by a relative positional information acquisition unit, information on a relative position of the grip portion with respect to the end effector during the operation;

obtaining, by a tracking control unit, a shift amount of the robot arm in order to perform tracking control of shifting the robot arm in accordance with an amount of variation of a size of the gap between the end effector and the grip portion so that the information on the relative position acquired by the relative positional information acquisition unit is within a range of a predetermined threshold;

controlling, by a control unit, the robot arm so as to shift in accordance with the amount of variation of the size of the gap between the end effector and the grip portion, based on the shift amount of the robot arm obtained by the tracking control unit;

maintaining the size of the gap between the end effector and the grip portion, by a fixing portion including a fixing member shiftable between a fixed position where the fixing member is in contact with the end effector and the grip portion to fix the end effector and the grip portion and restrict relative shift between the end effector and the grip portion, and an accommodated position where the fixed member is accommodated in the end effector or in the grip portion and allows the end effector and the grip portion to shift relatively, when the fixing member is located at the fixed position;

switching, by a mode switch unit, between a "teaching mode" and a "playback mode" as a control mode of the robot arm;

switching, by a fixing switch unit, between a fixing state where, when the mode switch unit switches to the "playback mode", the fixing portion is located at the fixed position to fix the end effector and the grip portion and maintain the size of the gap between the end effector and the grip portion, and a relatively shiftable state where, when the mode switch unit switches to the "teaching mode", the fixing portion is located at the accommodated position and allows the end effector and the grip portion to shift relatively without maintaining the size of the gap between the end effector and the grip portion;

acquiring, by an arm tip positional information acquisition unit, positional information on the end effector of the robot arm during the "teaching mode"; and generating, by a desired trajectory generation unit, a desired trajectory of the end effector of the robot arm during the "teaching mode", based on the arm tip positional information acquired by the arm tip positional information acquisition unit and the information on the relative position acquired by the relative positional information acquisition unit, wherein the control unit causes the tracking control unit to perform tracking control on the robot arm moving in accordance with a teaching operation of the person when the mode switch unit switches to the "teaching mode", and controls the robot arm in accordance with the desired trajectory generated by the desired trajectory generation unit when the mode switch unit switches to the "playback mode".

In the control apparatus and the control method for the robot arm, the robot, the control program for the robot arm, and the integrated electronic circuit according to the present invention, the end effector attached to the main body of the robot arm and the grip portion gripped by a person are mechanically separated from each other. Therefore, the robot arm can be operated by the person who handles the grip portion. In this configuration, the grip portion is not influenced by inertia of the main body of the robot arm during the operation, with a result that operability can be improved remarkably.

There may be further included the force information acquisition unit for acquiring information on force externally applied to the grip portion. In this case, upon performing a task involving contact, a person can easily feel reactive force generated upon such contact through the grip portion.

Described below are the embodiments of the present invention with reference to the accompanying drawings.

(First Embodiment)

FIG. 1 shows a robot 601 including a robot arm 100, according to a first embodiment of the present invention. The robot arm 100 includes a manipulator 101 as one example of a main body of the robot arm 100, an end effector 102, a grip portion 103, and relative position sensors 104. In the present embodiment, the robot 601 is configured by the robot arm 100 and a control apparatus 602 for the robot arm.

The manipulator 101 has a plurality of multijoint mechanisms, and respective links 101$d$ and 101$e$ are driven to rotate about a plurality of joint shafts (101$a$, 101$b$, and 101$c$). The manipulator 101 has an arm tip to which an end effector 102 is attached.

The end effector 102 incorporates the plurality of relative position sensors 104, which function to measure a relative position of the grip portion 103 with respect to the end effector 102 (that is, relative positional information, in other words, measurement values or gauged values). The end effector 102 is fixed to the arm tip of the manipulator 101 so as not to be displaced, and measures the relative position of the grip portion 103 from the fixed position thereof. In the first embodiment, the relative position is measured with use of six relative sensors 104 (to be detailed later).

The grip portion 103 is gripped by a hand of a person upon performing tasks, and is configured to be separated from the end effector 102.

The relative position sensors 104 detect the relative position of the grip portion 103 with respect to the end effector 102. In the present embodiment, the relative position sensors 104 are exemplified as the six relative sensors 104 (to be detailed later).

The end effector 102, the grip portion 103, and the relative position sensors 104 are detailed below with reference to FIGS. 2A to 2C.

Figure 2A:
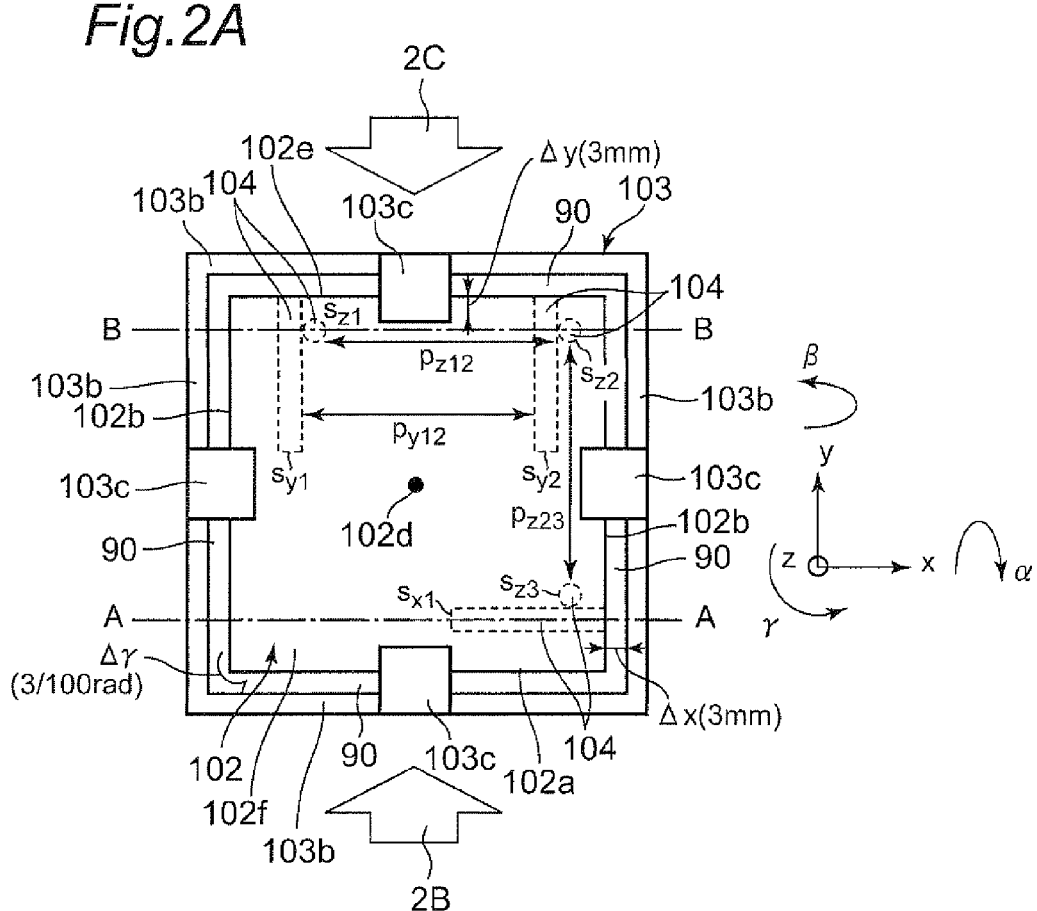
FIG. 2A is a plan view showing the end effector, the grip portion, and the relative position sensors in the robot according to the first embodiment of the present invention.

FIG. 2A is a plan view showing the end effector 102 in a rectangular parallelepiped shape having a square plane, the grip portion 103 in a quadrilateral box shape, and the relative position sensors 104. The arm tip of the manipulator 101 is to be coupled to the front surface in FIG. 2A. FIG. 2B is a sectional view taken along line A-A indicated in FIG. 2A, showing the end effector 102, the grip portion 103, and the relative position sensors 104, which are seen in the direction along an arrow 25. FIG. 2C is a sectional view taken along line B-B indicated in FIG. 2A, showing the end effector 102, the grip portion 103, and the relative position sensors 104, which are seen in the direction along an arrow 2C.

Figure 2B:
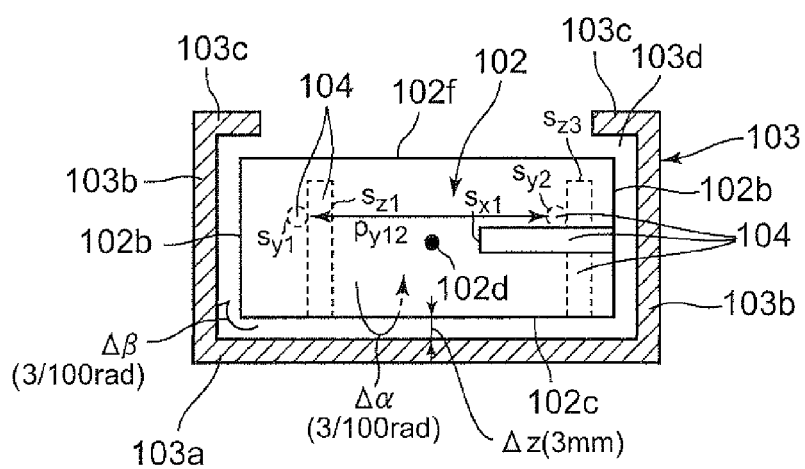
FIG. 2B is a sectional view taken along line A-A indicated in FIG. 2A, showing the end effector, the grip portion, and the relative position sensors in the robot according to the first embodiment of the present invention.
Figure 2C:
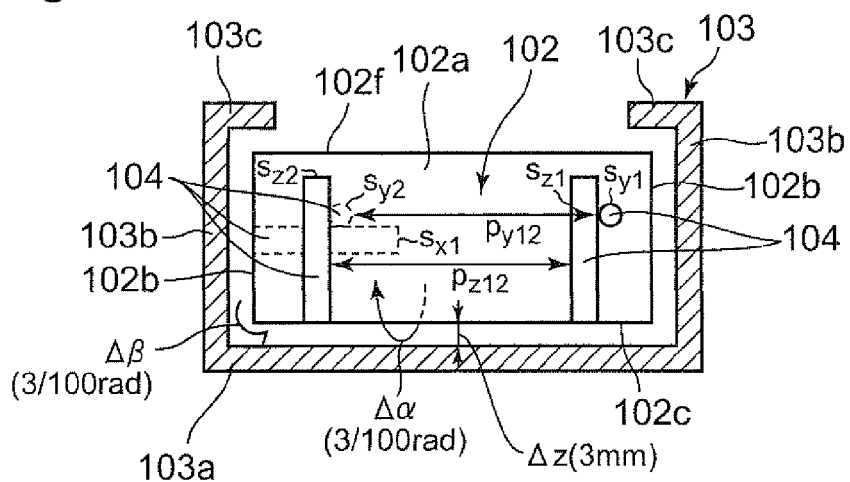
FIG. 2C is a sectional view taken along line B-B indicated in FIG. 2A, showing the end effector, the grip portion, and the relative position sensors in the robot according to the first embodiment of the present invention.

The end effector 102 according to the first embodiment has the shape as illustrated in FIGS. 2A to 2C. However, the end effector 102 may have any alternative shape such as a columnar object having a rectangular plane, a polygonal plane, or a circular plane; or a spherical object.

The grip portion 103 is configured as a quadrilateral box having a rectangular bottom surface portion 103a, four quadrilateral side surface portions 103b that stand on respective sides of the bottom surface portion 103a, and projections 103c that project inward from the upward centers of the respective side surface portions 103b and serve as one example of an anti disengagement members. There is formed, inside the grip portion 103, a concave space 103d that is formed in a box body configured by the bottom surface portion 103a and the four side surface portions 103b. The concave space 103d allows the end effector 102 to be located therein with predetermined gaps (spaces) 90 being left. Accordingly, the gaps 90 can be left from the bottom surface portion 103a, the four side surface portions 103b, and the four projections 103c, to the surfaces of the end effector 102 facing the bottom surface portion 103a, the four side surface portions 103b, and the four projections 103c, respectively.

Figure 3A:
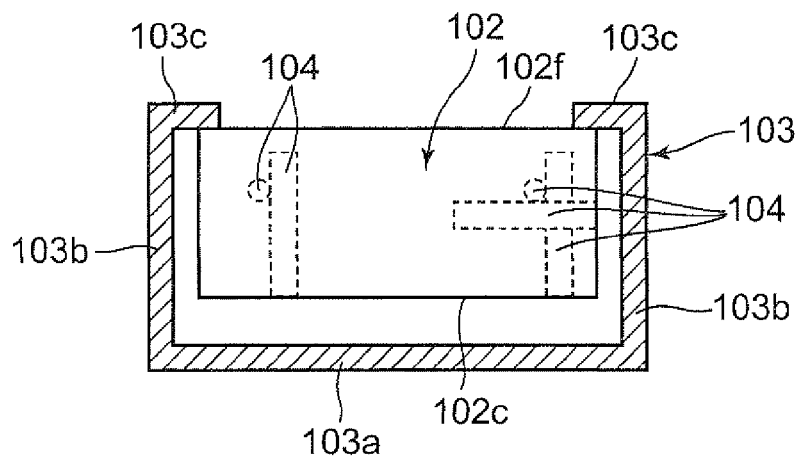
FIG. 3A is a sectional view showing the end effector, the grip portion, and the relative position sensors, upon dropping, in the robot according to the first embodiment of the present invention.

The projections 103c are plate members provided respectively to the side surface portions 103b at positions opposite to the bottom surface portion 103a. The projections 103c serve as one example of the anti disengagement members and prevent the end effector 102 located inside the concave space 103d formed in the box body from being extracted from the concave space 103d, as shown in FIG. 3A.

The grip portion 103 is provided separately from the end effector 102, and is configured by a member different from the end effector 102. In the present embodiment, the grip portion 103 has the shape as illustrated in FIGS. 2A to 2C. However, the grip portion 103 may have any alternative shape such as a box-shaped object having a rectangular plane, a polygonal plane, or a circular plane; or a spherical object.

The gaps 90 (respectively having widths $\Delta x$ to $\Delta \gamma$) are described with reference to FIGS. 2A to 2C.

In these figures, the lateral direction in FIG. 2A is defined to be along the x axis, the longitudinal direction in FIG. 2A is defined to be along the y axis, and the longitudinal direction in each of FIGS. 2B and 2C is defined to be along the z axis. By such definition, the width $\Delta x$ of the gap 90 in the x axis direction corresponds to the distance of the gap in the x axis direction between each side surface portion 102b of the end effector 102 and opposite one of the side surface portions 103b of the grip portion 103, which are located along the y axis perpendicular to the x axis. The width $\Delta y$ of the gap 90 in the y axis direction corresponds to the distance of the gap in the y axis direction between a front surface portion 102a or a rear surface portion 102e of the end effector 102 and opposite one of the side surface portions 103b of the grip portion 103, which are located along the x axis. The width $\Delta z$ of the gap 90 in the z axis direction corresponds to the distance of the gap in the z axis direction between a bottom surface portion 102c of the end effector 102 and the bottom surface portion 103a of the grip portion 103, which are located in the direction perpendicular to the z axis. The width $\Delta \alpha$ of the gap 90 in the $\alpha$ direction corresponds to the distance of the gap in the rotational direction a around the x axis, between the bottom surface portion 102c of the end effector 102 and the bottom surface portion 103a of the grip portion 103. The width $\Delta \beta$ of the gap 90 in the $\beta$ direction corresponds to the distance of the gap in the rotational direction $\beta$ around the y axis, between the bottom surface portion 102c of the end effector 102 and the bottom surface portion 103a of the grip portion 103. The width $\Delta \gamma$ of the gap 90 in the $\gamma$ direction corresponds to the distance of the gap in the rotational direction $\gamma$ around the z axis, between the front surface portion 102a of the end effector 102 and the side surface portion 103b of the grip portion 103.

The respective axes (x to $\gamma$) are described below with reference to FIGS. 2A to 2C. The x axis extends from a center portion 102d of the end effector 102 perpendicularly to the side surface portions 102b, with the rightward direction in FIG. 2A being a plus direction. The y axis extends from the center portion 102d of the end effector 102 perpendicularly to the front surface portion 102a or the rear surface portion 102e, with the upward direction in FIG. 2A being a plus direction. The z axis extends from the center portion 102d of the end effector 102 perpendicularly to the bottom surface portion 102c, with the upward direction in FIG. 2B being a plus direction. With regard to the rotation $\alpha$ about the x axis, the right-hand rule is applicable to the x axis. With regard to the rotation $\beta$ about the y axis, the right-hand rule is applicable to the y axis. With regard to the rotation $\gamma$ about the z axis, the right-hand rule is applicable to the z axis.

In the state shown in FIGS. 2A to 2C, the distances $\Delta x$, $\Delta y$, and $\Delta z$ of the gaps 90 between the end effector 102 and the grip portion 103 are equal to 3 mm as a specific example. The grip portion 103 can be shifted by the distance corresponding to the distance in the x, y, or z direction. Accordingly, in the state shown in FIGS. 2A to 2C, the movable ranges (as long as being separated from the end effector 102) of the grip portion 103 are $\pm 3$ mm along the x, y, and z axes, respectively. The movable ranges ($\Delta \alpha$, $\Delta \beta$, and $\Delta \gamma$) for the rotation of the grip portion 103 are $\pm 3/100$ radians respectively in the $\alpha$, $\beta$, and $\gamma$ directions, for example. The grip portion 103 may have any shape, similarly to the end effector 102.

Figure 3B:
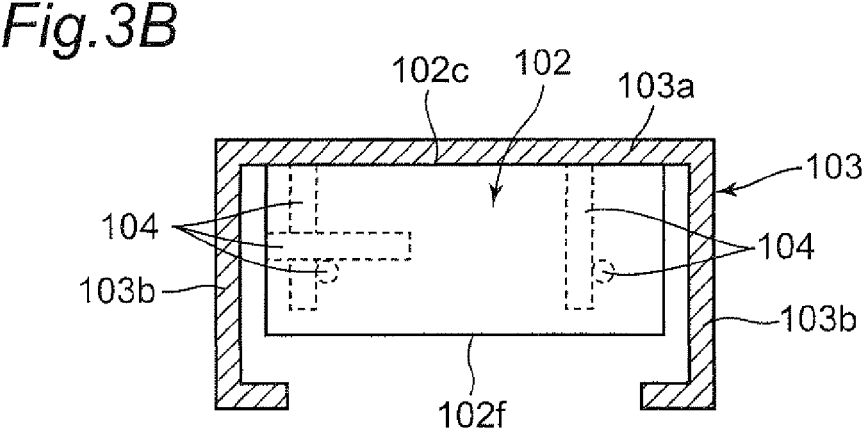
FIG. 3B is a sectional view showing the end effector, the grip portion, and the relative position sensors, upon dropping, in the robot according to the first embodiment of the present invention.
Figure 3C:
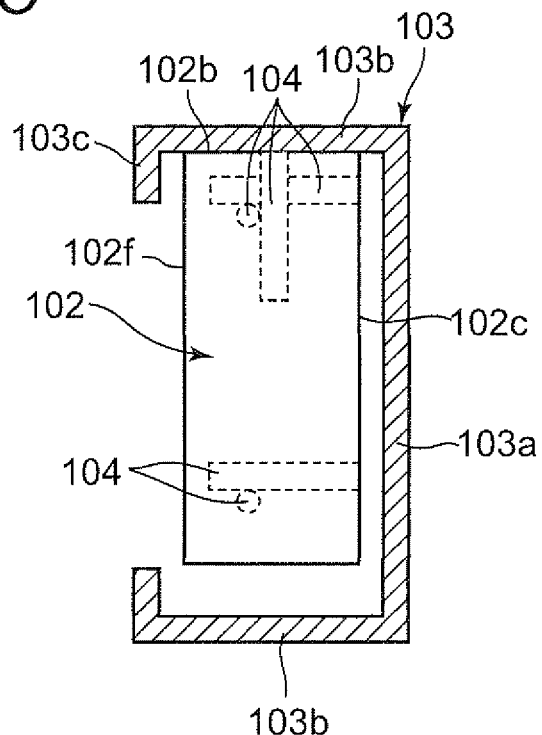
FIG. 3C is a sectional view showing the end effector, the grip portion, and the relative position sensors, upon dropping, in the robot according to the first embodiment of the present invention.
Figure 3D:
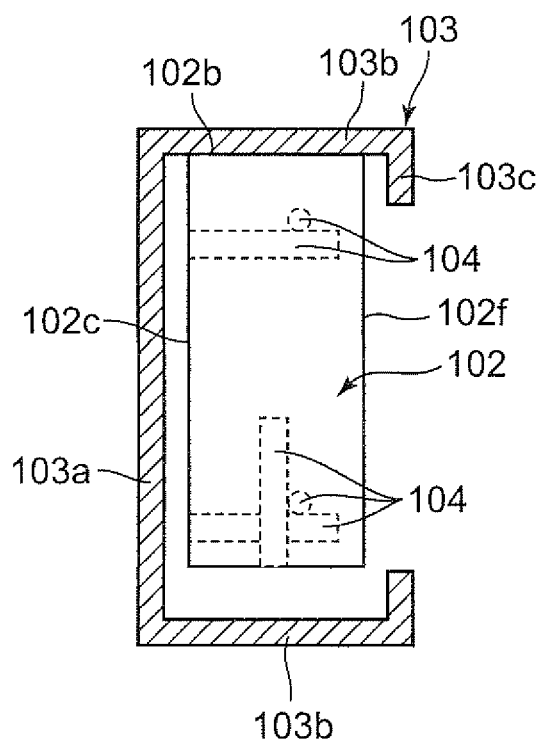
FIG. 3D is a sectional view showing the end effector, the grip portion, and the relative position sensors, upon dropping, in the robot according to the first embodiment of the present invention.
Figure 3E:
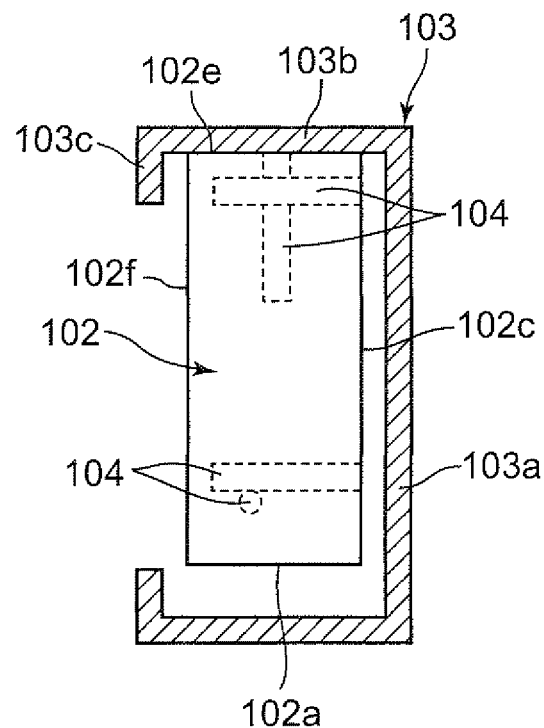
FIG. 3E is a sectional view showing the end effector, the grip portion, and the relative position sensors, upon dropping, in the robot according to the first embodiment of the present invention.
Figure 3F:
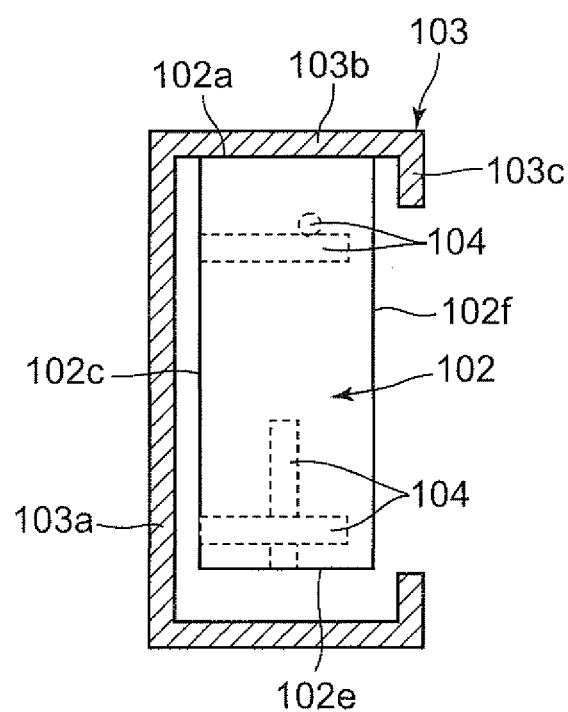
FIG. 3F is a sectional view showing the end effector, the grip portion, and the relative position sensors, upon dropping, in the robot according to the first embodiment of the present invention.
Figure 3G:
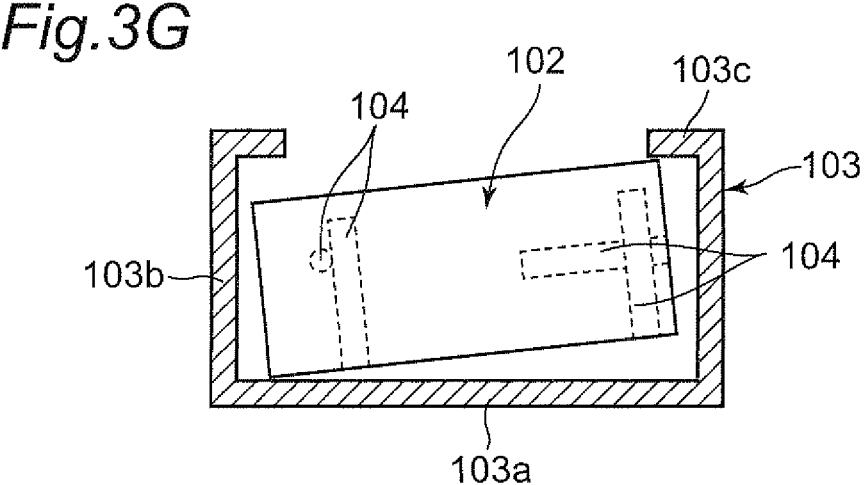
FIG. 3G is a sectional view showing the end effector, the grip portion, and the relative position sensors, upon dropping, in the robot according to the first embodiment of the present invention.
Figure 3H:
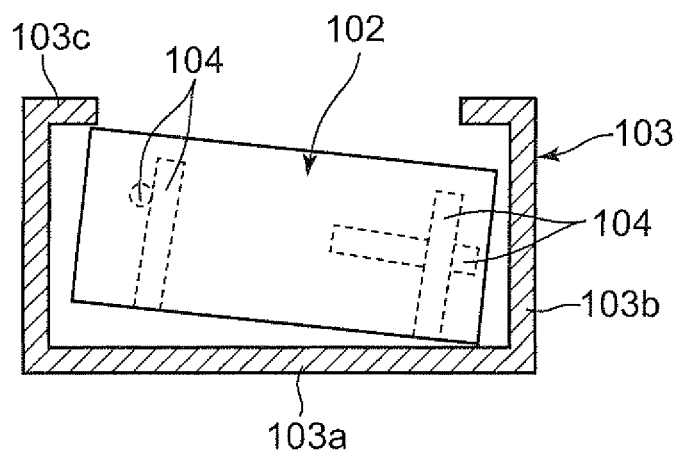
FIG. 3H is a sectional view showing the end effector, the grip portion, and the relative position sensors, upon dropping, in the robot according to the first embodiment of the present invention.
Figure 3I:
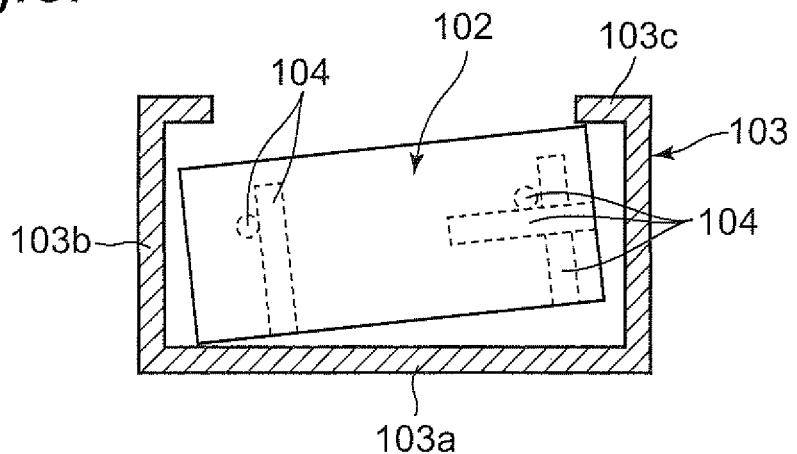
FIG. 3I is a sectional view showing the end effector, the grip portion, and the relative position sensors, upon dropping, in the robot according to the first embodiment of the present invention.
Figure 3J:
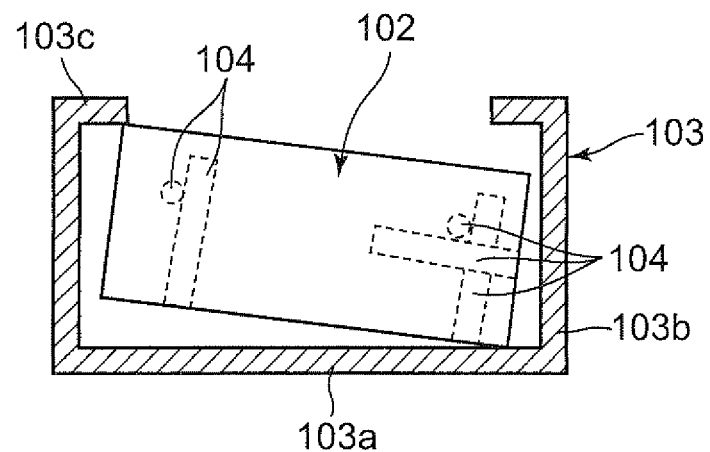
FIG. 3J is a sectional view showing the end effector, the grip portion, and the relative position sensors, upon dropping, in the robot according to the first embodiment of the present invention.

As shown in FIGS. 2A to 2C, the four projections 103c of the grip portion 103 are shaped so as to surround or hook the end effector 102, so that the grip portion 103 does not fall off the end effector 102 even in a case where a person does not grip the grip portion 103. Therefore, the grip portion 103 does not fall off the end effector 102 regardless of its orientation (see FIGS. 3A to 3F). More specifically, FIG. 3A shows a state where the grip portion 103 is shifted to the lowest position with respect to the end effector 102 and the four projections 103c are in contact with an upper surface portion 102f of the end effector 102 to prevent disengagement. FIG. 3B shows a state where the positional relationship between the grip portion 103 and the end effector 102 is upside down in comparison to the state shown in FIG. 3A and the bottom surface portion 103a of the grip portion 103 is in contact with the bottom surface portion 102c of the end effector 102. FIG. 3C shows a state where the positional relationship between the grip portion 103 and the end effector 102 is achieved by rotating clockwise by 90 degrees from the state shown in FIG. 3A and one of the side surface portions 103b of the grip portion 103 is in contact with the corresponding side surface portion 102b of the end effector 102. FIG. 3D shows a state where the positional relationship between the grip portion 103 and the end effector 102 is achieved by rotating counterclockwise by 90 degrees from the state shown in FIG. 3A and another one of the side surface portions 103b of the grip portion 103 is in contact with the corresponding side surface portion 102b of the end effector 102. FIG. 3E shows a state where the positional relationship between the grip portion 103 and the end effector 102 is achieved by rotating upward by 90 degrees about a lateral axis from the state shown in FIG. 3C and still another one of the side surface portions 103b of the grip portion 103 is in contact with the rear surface portion 102e of the end effector 102. FIG. 3F shows a state where the positional relationship between the grip portion 103 and the end effector 102 is achieved by rotating upward by 90 degrees in the direction opposite to that of the state shown in FIG. 3E, about the lateral axis from the state shown in FIG. 3C and further another one of the side surface portions 103b of the grip portion 103 is in contact with the front surface portion 102a of the end effector 102.

Figure 3K:
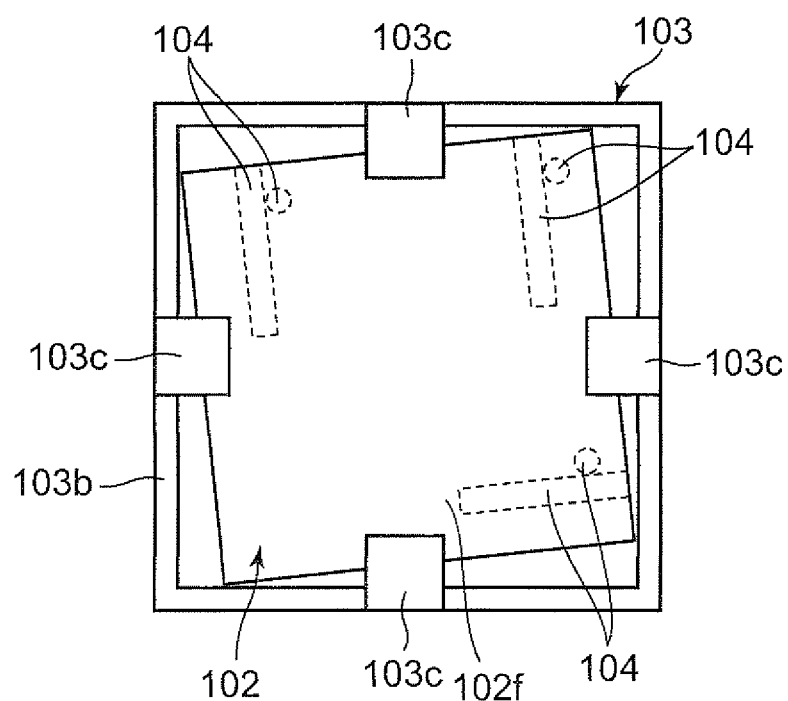
FIG. 3K is a plan view showing the end effector, the grip portion, and the relative position sensors, upon dropping, in the robot according to the first embodiment of the present invention.
Figure 3L:
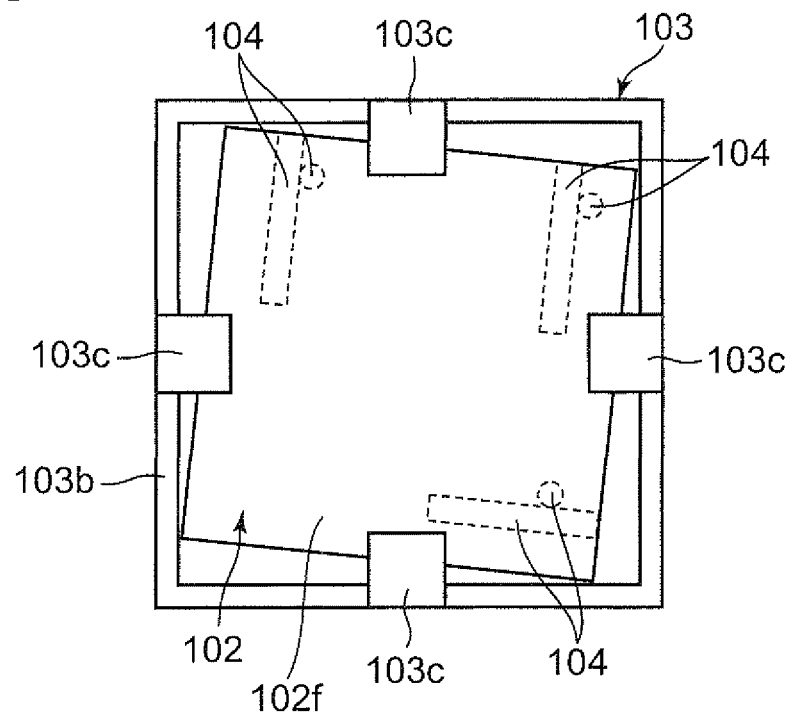
FIG. 3L is a plan view showing the end effector, the grip portion, and the relative position sensors, upon dropping, in the robot according to the first embodiment of the present invention.

Similarly, the grip portion 103 is configured not to fall off the end effector 102 even in a case where the grip portion 103 is rotated in any direction (see FIG. 3G to 3L). More specifically, FIGS. 3G to 3J show the states where the grip portion 103 does not fall off the end effector 102 even in a case where any one of the side surface portions 102b and the front surface portion 102a (the rear surface portion 102e) of the end effector 102 is rotated clockwise or counterclockwise in FIGS. 3G to 3J. It is because the right or left corner portion of the end effector 102 comes into contact with corresponding one of the projections 103c of the grip portion 103. FIGS. 3K and 3L show the states where the grip portion 103 does not fall off the end effector 102 even in a case where the upper surface portion 102f of the end effector 102 is rotated clockwise or counterclockwise in FIGS. 3K and 3L. It is because the corner portions of the end effector 102 come into contact with the side surface portions 103b of the grip portion 103 and the end effector 102 is restricted so as not to rotate excessively, as well as a part of the respective sides of the end effector 102 come into contact with the projections 103c of the grip portion 103.

Figure 4A:
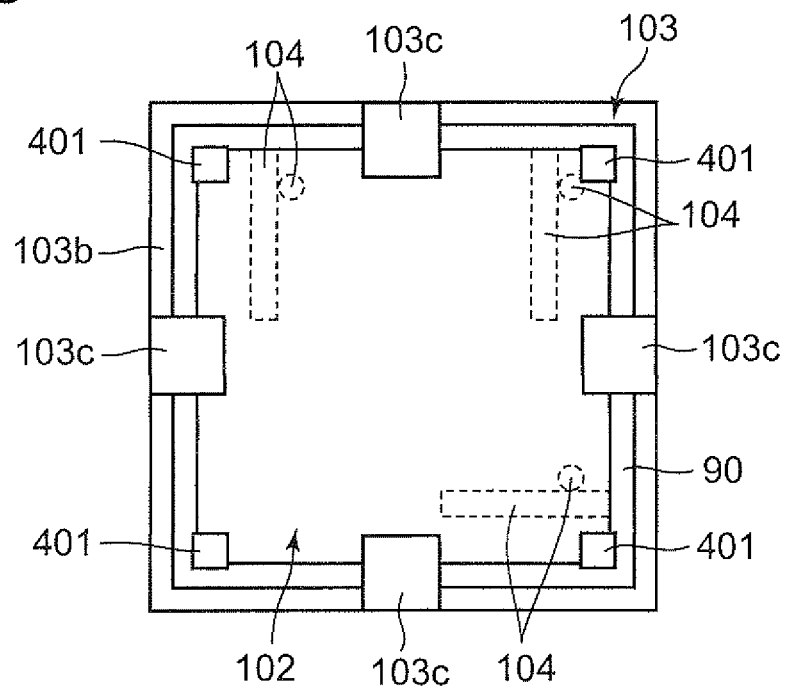
FIG. 4A is a plan view showing the end effector, the grip portion, the relative position sensors, and buffer members in the robot according to the first embodiment of the present invention.
Figure 4B:
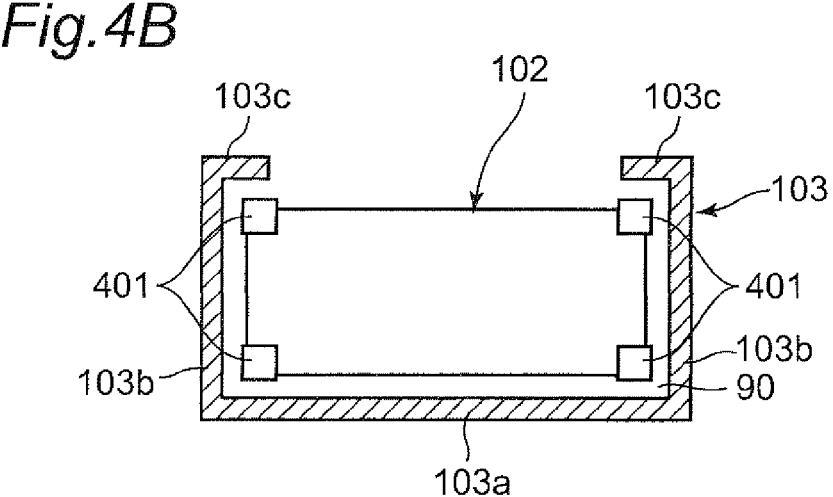
FIG. 4B is a side view showing the end effector, the grip portion, and the buffer members in the robot according to the first embodiment of the present invention.
Figure 4C:
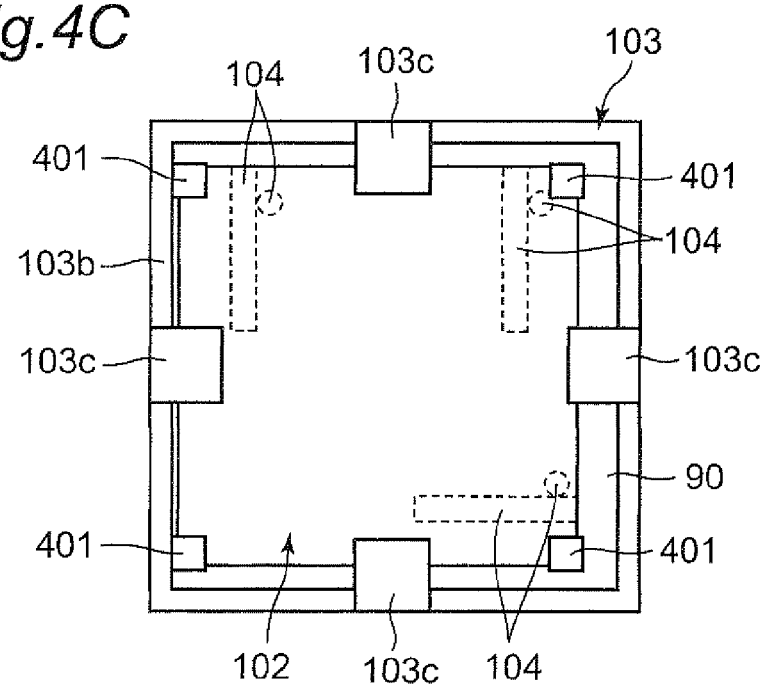
FIG. 4C is a plan view showing the end effector, the grip portion, the relative position sensors, and the buffer members, upon contact, in the robot according to the first embodiment of the present invention.
Figure 4D:
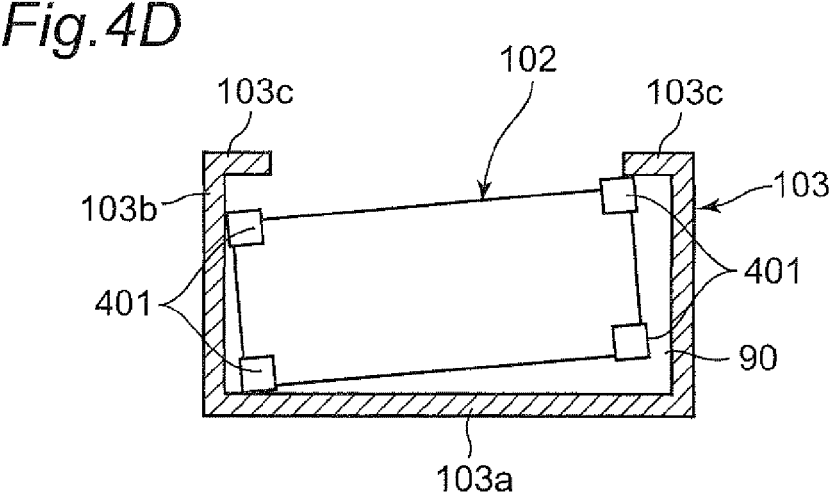
FIG. 4D is a side view showing the end effector, the grip portion, and the buffer members, upon contact, in the robot according to the first embodiment of the present invention.

It may be possible to attach buffer members 401 to the end effector 102, in order to reduce impact of contact between the end effector 102 and the grip portion 103 (see FIGS. 4A and 4B). As shown in FIGS. 4A and 4B, even in such a case where the buffer members 401 are attached to the upper, lower, right, and left corner portions of the end effector 102, the values of the gaps (Δx to Δγ) defined in FIGS. 2A to 2C remain unchanged. FIGS. 4C and 4D each show the state where the buffer members 401 and the grip portion 103 are in contact with each other. As apparent from FIGS. 4C and 4D, in the case where the buffer members 401 are attached to the end effector 102, only the buffer members 401 are in contact with the grip portion 103 and thus the end effector 102 and the grip portion 103 are not in direct contact with each other.

As shown in FIG. 5, the present embodiment can be adopted to a configuration in which the end effector 102 and the grip portion 103 are replaced with each other in terms of positioning. More specifically, a grip portion 103H in a rectangular parallelepiped shape having a square plane can be provided in a space inside an end effector 102H in a quadrilateral box shape, with gaps identical in size with the above gaps being provided therebetween. In this case, it is necessary to attach a handle member 103f onto the bottom surface portion of the grip portion 103H so that the grip portion 103H can be gripped easily by a person.

The relative position sensors 104 detect a relative position Δr of the grip portion 103 with respect to the end effector 102. It is noted that reference sign it collectively indicates signs Δx to Δγ.

The relative position Δr is expressed by Equation (1) shown below, and the respective relative positions are as indicated in FIG. 2A to 2C.

[Expression 1]

$$\Delta r = \begin{bmatrix} \Delta x \\ \Delta y \\ \Delta z \\ \Delta \alpha \\ \Delta \beta \\ \Delta \gamma \end{bmatrix} \quad \text{Equation (1)}$$

As shown in FIGS. 2A to 2C, the relative position sensors 104 are incorporated in the end effector 102, and more specifically, gap sensors are adopted as the relative position sensors 104. In more detail, a gap sensor $s_{x1}$ in a round bar shape is located in the vicinity of the front surface portion 102a of the end effector 102 so as to be located in parallel with the front surface portion 102a and along the x axis. The gap sensor $s_{x1}$ has one end exposed to the side surface portion 102b of the end effector 102, and measures the width Δx of the gap 90 in the x axis direction. A gap sensor $s_{z3}$ in a round bar shape is located in the vicinity of the side surface portion 102b of the end effector 102 so as to be located in parallel with the side surface portion 102b and along the z axis. The gap sensor $s_{z3}$ has one end exposed to the bottom surface portion 102c of the end effector 102, and measures the width Δz of the gap 90 in the z axis direction. A pair of gap sensors $s_{y1}$ and $s_{y2}$ each in a round bar shape are located in the vicinity of the rear surface portion 102e of the end effector 102 so as to be located in parallel with the side surface portion 102b and along the y axis. Each of the pair of gap sensors $s_{y1}$ and $s_{y2}$ has one end exposed to the rear surface portion 102e of the end effector 102, and measures the width Δy of the gap 90 in the y axis direction. Another pair of gap sensors $s_{z2}$ and $s_{z3}$ each in a round bar shape are located in the vicinity of the rear surface portion 102e of the end effector 102 so as to be located in parallel with the side surface portion 102b and along the z axis. Each of the pair of gap sensors $s_{z2}$ and $s_{z3}$ has one end exposed to the bottom surface portion 102c of the end effector 102, and measures the width Δz of the gap 90 in the z axis direction.

In the above configuration, the width Δy of the gap 90 in the y axis direction is obtained by calculation, at a relative positional information acquisition unit 607 to be described later, of an average value between at least two measurement values $y_1$ and $y_2$ measured by the two gap sensors $s_{y1}$ and $s_{y2}$. The width Δz of the gap 90 in the z axis direction is obtained by calculation, at the relative positional information acquisition unit 607 to be described later, of an average value among at least three measurement values $z_1$, $z_2$, and $z_3$ measured by the three gap sensors $s_{z1}$, $s_{z2}$, and $s_{z3}$. The width Δx of the gap 90 in the x axis direction is obtained as at least one measurement value $x_1$ measured by the single gap sensor $s_x$, or by measuring for a plurality of times with use of the single gap sensor $s_x$ and calculating an average value thereamong at the relative positional information acquisition unit 607 to be described later. Similarly, the width Δy and the width Δz may be obtained by measuring for a plurality of times with use of the corresponding gap sensors and calculating average values $y_1$, $y_2$, $z_1$, $z_2$, and $z_3$ of the respective gap sensors, to be followed by calculation of the average value. Therefore, the widths Δx to Δγ are obtained by the calculation of the respective measurement values $x_1$, $y_1$, $y_2$, $z_1$, $z_2$, and $z_3$.

However, the method of detecting the relative position Δr of the grip portion 103 with respect to the end effector 102 is not limited to such detection with use of the gap sensors. Alternatively, it is possible to adopt a different method such as capturing an image of the grip portion 103 with respect to the end effector 102 with use of a camera to detect the relative position Δr.

Described below is a method with use of six gap sensors shown in FIGS. 2A to 2C. The six gap sensors $s_{x1}$, $s_{y1}$, $s_{y2}$, $s_{z1}$, $s_{z2}$, and $s_{z3}$ are located as shown in FIGS. 2A to 2C, to measure gaps g along the x, y, and z axes between the end effector 102 and the grip portion 103 (the method of obtaining the relative position Δr from the measurement values (gauged values) g of the respective gap sensors $s_{x1}$, $s_{y1}$, $s_{y2}$, $s_{z1}$, $s_{z2}$, and $s_{z3}$ is to be described later). The gaps g collectively indicate the measurement values $x_1$, $y_1$, $y_2$, $z_1$, $z_2$, and $z_3$ of the respective gap sensors $s_{x1}$, $s_{y1}$, $s_{y2}$, $s_{z1}$, $s_{z2}$, and $s_{z3}$. The gaps g are expressed by Equation (2) shown below, indicative of the measurement values $x_1$, $y_1$, $y''_2$, $z_1$, $z_2$, and $z_3$ of the respective gap sensors $s_{x1}$, $s_{y1}$, $s_{y2}$, $s_{z1}$, $s_{z2}$, and $s_{z3}$. The gaps g are formed as shown in FIGS. 2A to 2C. It is noted that the measurement values $x_1$, $y_1$, $y_2$, $z_1$, $z_2$, and $z_3$ do not express the direction of rotation by themselves. The values Δx to Δγ correspond to results of obtaining the translational and rotational directions from the respective measurement values $x_1$, $y_1$, $y_2$, $z_1$, $z_2$, and $z_3$. Accordingly, the respective measurement values $x_1$, $y_1$, $y_2$, $z_1$, $z_2$, and $z_3$ simply express the measurement values of the gap sensors $s_{x1}$, $s_{y1}$, $s_{y2}$, $s_{z1}$, $s_{z2}$, and $s_{z3}$. To the contrary, the values Δx to Δγ are obtained as a result of calculation of relative positions in the translational direction and in the rotational direction from the respective measurement values.

[Expression 2]

$$g = \begin{bmatrix} x_1 \\ y_1 \\ y_2 \\ z_1 \\ z_2 \\ z_3 \end{bmatrix} \quad \text{Equation (2)}$$

As shown in FIGS. 2A to 2C, a distance $p_{y12}$ between the gap sensors $s_{y1}$ and $s_{y2}$ in the y axis direction, a distance $p_{z12}$ between the gap sensors $s_{z1}$ and $s_{z2}$ in the z axis direction, and a distance $p_{z23}$ between the gap sensors $s_{z2}$ and $s_{z3}$ in the z axis direction are set to 100 mm, respectively.

Figure 6:
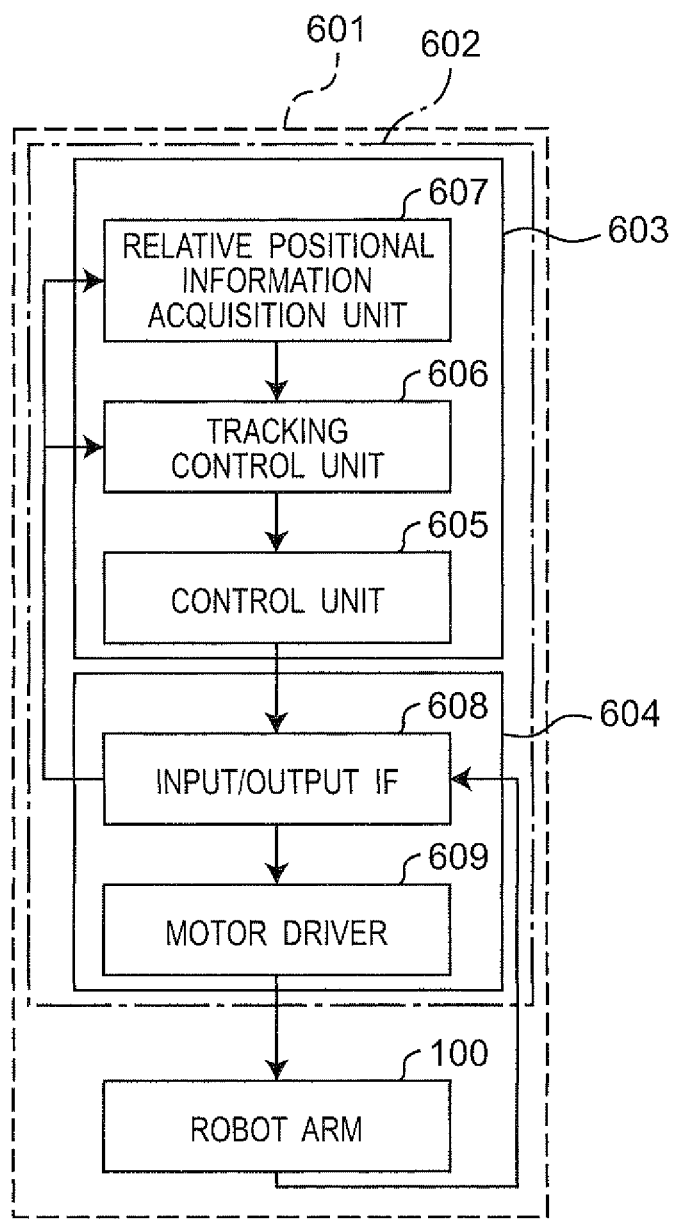
FIG. 6 is a block diagram of a robot arm in the robot according to the first embodiment of the present invention.

FIG. 6 is a block diagram of the robot arm 100 in the robot 601 according to the first embodiment of the present invention. In FIG. 6, the robot arm 100 is configured by the manipulator 101 and the control apparatus 602 for the robot arm 100.

The control apparatus 602 for the robot arm 100 is configured by a control apparatus main body 603 and a peripheral device 604. The control apparatus main body 603 is configured by a control unit 605, a tracking control unit 606, and the relative positional information acquisition unit 607. The peripheral device 604 is configured by an input/output IF 608, and a motor driver 609. The input/output IF 608 includes an ON/OFF switch for control operations of the control apparatus 602. Described below are functions of the respective unit or devices.

The relative positional information acquisition unit 607 obtains the relative position Δr of the grip portion 103 with respect to the end effector 102 based on the respective measurement values g of the gap sensors $s_{x1}$, $s_{y1}$, $s_{y2}$, $s_{z1}$, $s_{z2}$, and $s_{z3}$, which are acquired from the input/output IF 608. The relative positional information, i.e. the relative position Δr thus obtained, is transmitted from the relative positional information acquisition unit 607 to the tracking control unit 606. When the distance between the gap sensors $s_{y1}$ and $s_{y2}$, the distance between the gap sensors $s_{z1}$ and $s_{z2}$, and the distance between the gap sensors $s_{z2}$ and $s_{z3}$ are expressed as p, respectively, the measurement values of the gap sensors $s_{x1}$, $s_{y1}$, $s_{y2}$, $s_{z1}$, $s_{z2}$, and $s_{z3}$ are expressed as $x_1$, $y_1$, $y_2$, $z_1$, $z_2$, and $z_3$, and the relative position of the grip portion 103 with respect to the end effector 102 is expressed as Δr, the relative position Δr is obtained by Equation (3) shown below by the relative positional information acquisition unit 607.

[Expression 3]

$$\Delta r = \begin{bmatrix} \Delta x \\ \Delta y \\ \Delta z \\ \Delta \alpha \\ \Delta \beta \\ \Delta \gamma \end{bmatrix} = \begin{bmatrix} 1 & 0 & 0 & 0 & 0 & 0 \\ 0 & \frac{1}{2} & \frac{1}{2} & 0 & 0 & 0 \\ 0 & 0 & 0 & \frac{1}{3} & \frac{1}{3} & \frac{1}{3} \\ 0 & 0 & 0 & \frac{1}{2p} & \frac{1}{2p} & -\frac{1}{p} \\ 0 & 0 & 0 & \frac{1}{p} & -\frac{1}{2p} & \frac{1}{2p} \\ 0 & \frac{1}{p} & -\frac{1}{p} & 0 & 0 & 0 \end{bmatrix} \begin{bmatrix} x_1 \\ y_1 \\ y_2 \\ z_1 \\ z_2 \\ z_3 \end{bmatrix} \quad \text{Equation (3)}$$

The tracking control unit 606 obtains, from the relative positional information on the grip portion 103 with respect to the end effector 102 acquired from the relative positional information acquisition unit 607, a shift amount such that the relative positional information is within a range of a predetermined threshold. The information on the shift amount thus obtained is transmitted from the tracking control unit 606 to the control unit 605. When the distance between the gap sensors $s_{y1}$ and $s_{y2}$, the distance between the gap sensors $s_{z1}$ and $s_{z2}$, and the distance between the gap sensors $s_{z2}$ and $s_{z3}$ are expressed as p, respectively, the range of the predetermined threshold is defined by multiplying the distance p by a constant (such as 0.1), namely, the range (−0.1p to 0.1p).

Described below is how to obtain the shift amount at the tracking control unit 606. When the relative position of the grip portion 103 with respect to the end effector 102 is expressed as Δr (see Equation (3)), a desired value of the relative position is expressed as $\Delta r_d$, and the shift amount to be obtained is expressed as y, the shift amount y is obtained by y=k($\Delta r_d$−Δr) (where reference sign k denotes a constant (such as 1.0)) at the tracking control unit 606. The shift amount y is set to zero in a case where the relative position Δr of the grip portion 103 with respect to the end effector 102 is within the threshold. The value of the constant k is determined by a value that is inputted by a person with use of an input device 608d such as a keyboard, a mouse, or a touch panel and is received from the input/output IF 608. The desired value $\Delta r_d$ of the relative position is expressed by Equation (4) shown below. In a case where the value g of each of the gap sensors is 3 mm, this desired value is set as $\Delta r_d$=0. In this case, the desired value $\Delta r_d$ of the relative position is set to zero. Described next are the values $\Delta x_d$, $\Delta y_d$, $\Delta z_d$, $\Delta \alpha_d$, $\Delta \beta_d$, and $\Delta \gamma_d$, which appear in Equation (4). The value $\Delta x_d$ indicates a desired value of a relative position Δx in the shift direction in parallel with the x axis in FIG. 2A. The value $\Delta y_d$ indicates a desired value of a relative position Δy in the shift direction in parallel with the y axis in FIG. 2A. The value $\Delta z_d$ indicates a desired value of a relative position Δz in the shift direction in parallel with the z axis in FIG. 2A. The value $\Delta \alpha_d$ indicates a desired value of a relative position Δα in the rotational direction with respect to the x axis in FIG. 2A. The value $\Delta \beta_d$ indicates a desired value of a relative position Δβ in the rotational direction with respect to the y axis in FIG. 2A. The value $\Delta\gamma_d$ indicates a desired value of a relative position $\Delta\gamma$ in the rotational direction with respect to the z axis in FIG. 2A. In a case where the desired value $\Delta r_d$ of the relative position is equal to zero, the values $\Delta x_d, \Delta y_d, \Delta z_d, \Delta\alpha_d, \Delta\beta_d$, and $\Delta\gamma_d$ are all equal to zero.

[Expression 4]

$$\Delta r_d = \begin{bmatrix} \Delta x_d \\ \Delta y_d \\ \Delta z_d \\ \Delta \alpha_d \\ \Delta \beta_d \\ \Delta \gamma_d \end{bmatrix} \quad \text{Equation (4)}$$

The control unit 605 transmits, to the input/output IF 608, shift amount information that is transmitted from the tracking control unit 606 to the control unit 605 at a constant time interval (such as every 1 ms) with use of a timer incorporated in the input/output IF 608.

The input/output IF 608 transmits, to the relative positional information acquisition unit 607, the measurement values g of the gap sensors $s_{x1}$, $s_{y1}$, $s_{y2}$, $s_{z1}$, $s_{z2}$, and $s_{z3}$ acquired from the manipulator 101 and time information received from the timer incorporated in the input/output IF 608. The input/output IF 608 also transmits the shift amount information acquired from the control unit 605 to the motor driver 609. The value of the constant used at the tracking control unit 606 can be inputted to the input/output IF 608 by a person with use of the input device 608d such as a keyboard, a mouse, or a touch panel. The value inputted to the input/output IF 608 is transmitted from the input/output IF 608 to the tracking control unit 606.

The motor driver 609 transmits, to the manipulator 101, a command value directed to each motor 713 of the manipulator 101 in order to control the manipulator 101, on the basis of the shift amount information acquired from the input/output IF 608.

The manipulator 101 transmits, from each encoder 714 of the manipulator 101 to the input/output IF 608, positional information on the manipulator 101 at a constant time interval (such as every 1 ms) with use of the timer incorporated in the input/output IF 608. Similarly, the relative position sensors 104 (namely, the gap sensors $s_{x1}$, $s_{y1}$, $s_{y2}$, $s_{z2}$, and $s_{z3}$) transmit the measurement values g thereof to the input/output IF 608 at a constant time interval (such as every 1 ms) with use of the timer incorporated in the input/output IF 608. The manipulator 101 is controlled in accordance with the command value from the motor driver 609. Details thereof are given with reference to FIG. 7. The manipulator 101 is configured as a multiple link manipulator of six degrees of freedom, which is rotatable about six shafts in total.

Figure 7:
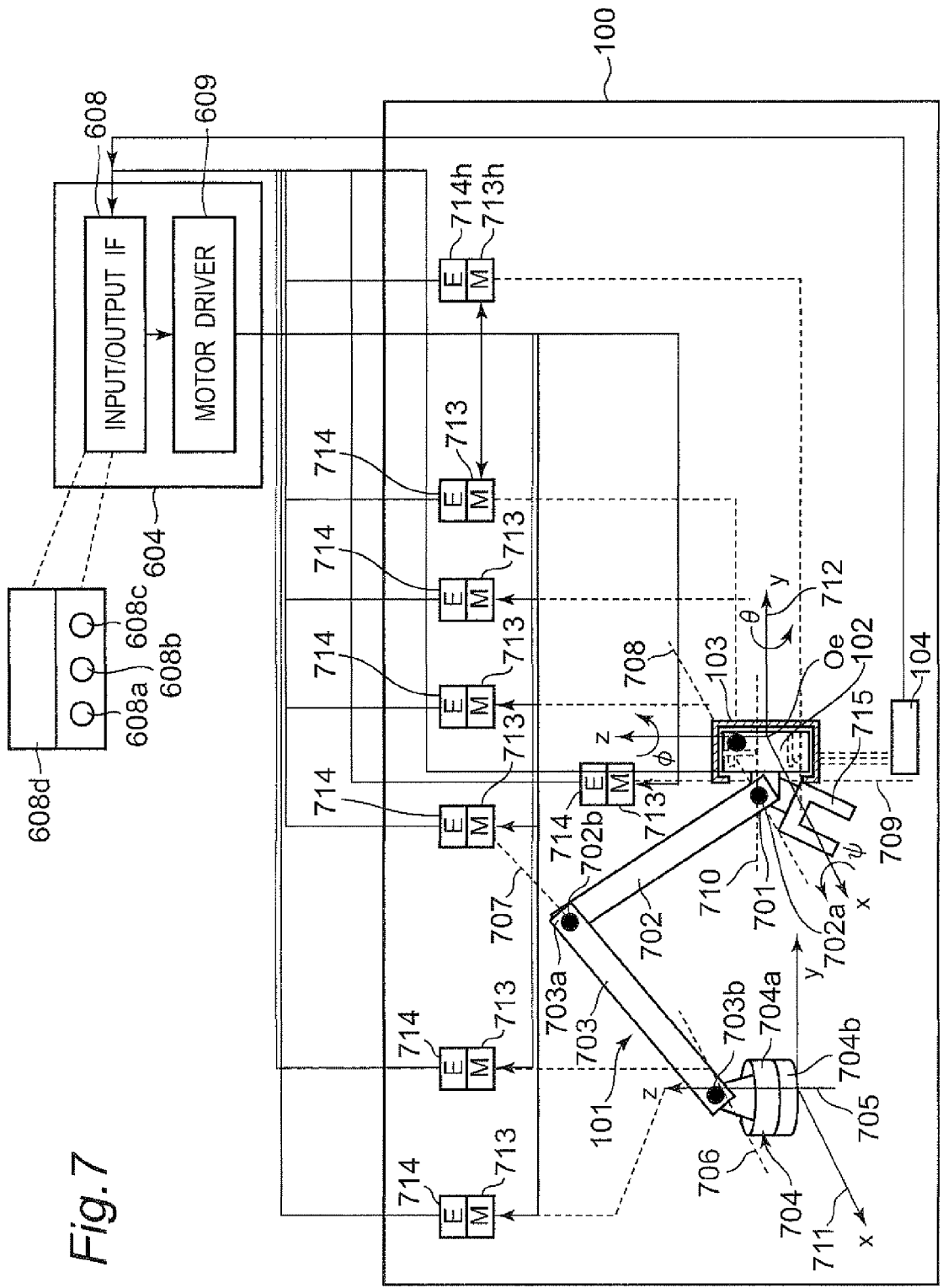
FIG. 7 is an explanatory view of the robot arm in the robot according to the first embodiment of the present invention.

As shown in FIG. 7, the manipulator 101 is exemplified as a multijoint robot arm, more specifically, the multiple link manipulator of six degrees of freedom. The manipulator 101 includes the end effector 102, a front arm link 702, an upper arm link 703, and a pedestal 704. The front arm link 702 is provided, at a distal end 702a thereof, with a wrist 701 to which the end effector 102 is attached. The upper arm link 703 has a distal end 703a that is rotatably coupled to a proximal end 702b of the front arm link 702. The pedestal 704 is rotatably coupled with a proximal end 703b of the upper arm link 703 so as to support the proximal end 703b. The pedestal 704 is fixed at a constant position. Alternatively, the pedestal 704 may be coupled to a rail (not shown) so as to be shiftable.

The wrist 701 has three rotary shafts at a fourth joint 708, a fifth joint 709, and a sixth joint 710, so that the relative posture (orientation) of the end effector 102 can be varied with respect to the front arm link 702. More specifically, in FIG. 7, the fourth joint 708 is capable of varying the relative posture of the end effector 102 with respect to the wrist 701, around the transverse axis. The fifth joint 709 is capable of varying the relative posture of the end effector 102 with respect to the wrist 701, around the ordinate axis perpendicular to the transverse axis of the fourth joint 708. The sixth joint 710 is capable of varying the relative posture of the end effector 102 with respect to the wrist 701, around the transverse axis perpendicular to the transverse axis of the fourth joint 708 as well as perpendicular to the ordinate axis of the fifth joint 709.

The proximal end 702b of the front arm link 702 is made rotatable about a third joint 707 with respect to the distal end 703a of the upper arm link 703, in other words, about the transverse axis in parallel with the transverse axis of the fourth joint 708. The proximal end of the upper arm link 703 is made rotatable about a second joint 706 with respect to the pedestal 704, in other words, the transverse axis in parallel with the transverse axis of the fourth joint 708. Furthermore, the pedestal 704 has an upper movable portion 704a, which is made rotatable about a first joint 705 with respect to a lower fixed portion 704b of the pedestal 704, in other words, about the ordinate axis in parallel with the ordinate axis of the fifth joint 709.

As a result, the manipulator 101 is configured as the multiple link manipulator of six degrees of freedom, which is rotatable about the six shafts in total.

Each of the joints, which configure the rotary portions at the respective shafts of the manipulator 101, is provided with a rotation drive device such as the motor 713 for driving the corresponding joint, and the encoder 714 (actually located inside corresponding one of the joints of the manipulator 101) which detects a rotation phase angle (in other words, a joint angle) of the rotary shaft of the corresponding motor 713 to output positional information. The motor 713 (which is actually located inside the corresponding one of the joints of the manipulator 101) is driven and controlled by the motor driver 609 that is included in one of a pair of members configuring each of the joints (such as a rotary member and a support member supporting the rotary member). The rotary shaft of the motor 713 provided to the one of the members configuring each of the joints is coupled to another one of the members configuring the corresponding joint so as to rotate positively or negatively the rotary shaft. Accordingly, the other one of the members is made rotatable about corresponding one of the shafts with respect to the one of the members.

Furthermore, there is provided an absolute coordinate system 711 in which the relative positional relationship is fixed with respect to the lower fixed portion 704b of the pedestal 704. There is also provided an arm tip coordinate system 712 in which the relative positional relationship is fixed with respect to the end effector 102. Assume that an original position $O_e(x, y, z)$ of the arm tip coordinate system 712 viewed from the absolute coordinate system 711 corresponds to a position of the arm tip of the manipulator 101, and that the posture of the arm tip coordinate system 712 viewed from the absolute coordinate system 711 corresponds to a posture of the arm tip of the manipulator 101 expressed by a roll angle, a pitch angle, and a yaw angle ($\phi, \theta, \Psi$). Furthermore, the arm tip position and a posture vector are defined as a vector $r=[x, y, z, \phi, \theta, \Psi]^T$. Accordingly, as an example, the ordinate axis of the first joint 705 may be made in parallel with the z axis of the absolute coordinate system 711, and the transverse axis of the second joint 706 may be made in parallel with the x axis.

Moreover, the transverse axis of the sixth joint 710 may be made in parallel with the x axis of the arm tip coordinate system 712, the transverse axis of the fourth joint 708 may be made in parallel with the y axis, and the ordinate axis of the fifth joint 709 may be made in parallel with the z axis, respectively. It is assumed that the rotation angle of the arm tip coordinate system 712 about the x axis corresponds to the yaw angle $\Psi$, the rotation angle thereof about the y axis corresponds to the pitch angle $\theta$, and the rotation angle thereof about the z axis corresponds to the roll angle $\phi$.

In addition, a hand 715 can be attached to the arm tip (such as the distal end 702a) of the manipulator 101. The hand 715 is fixed with respect to the end effector 102 such that a constant angle is formed by the hand 715 and the end effector 102. The hand 715 is detachably fixed to the end effector 102. The hand 715 can be fixed to the end effector 102 at an optionally changeable angle between the hand 715 and the end effector 102, depending on the manner of fixing to the end effector 102. The hand 715 is also provided with a motor 713h for opening or closing the hand, and an encoder 714h. Similarly to the manipulator 101, it is possible to control opening and closing motions of the hand 715.

Figure 8A:
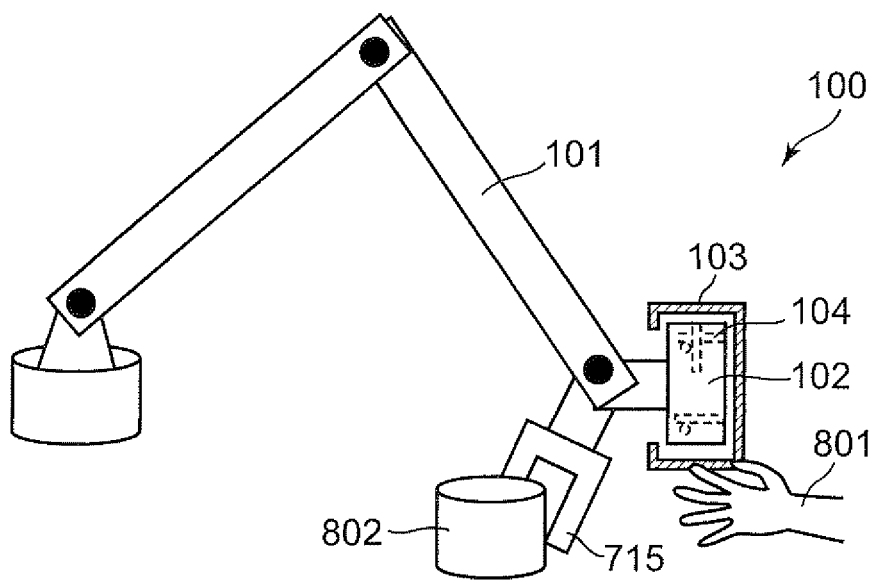
FIG. 8A is an explanatory view on cooperative conveyance by means of the robot arm in the robot according to the first embodiment of the present invention.
Figure 8B:
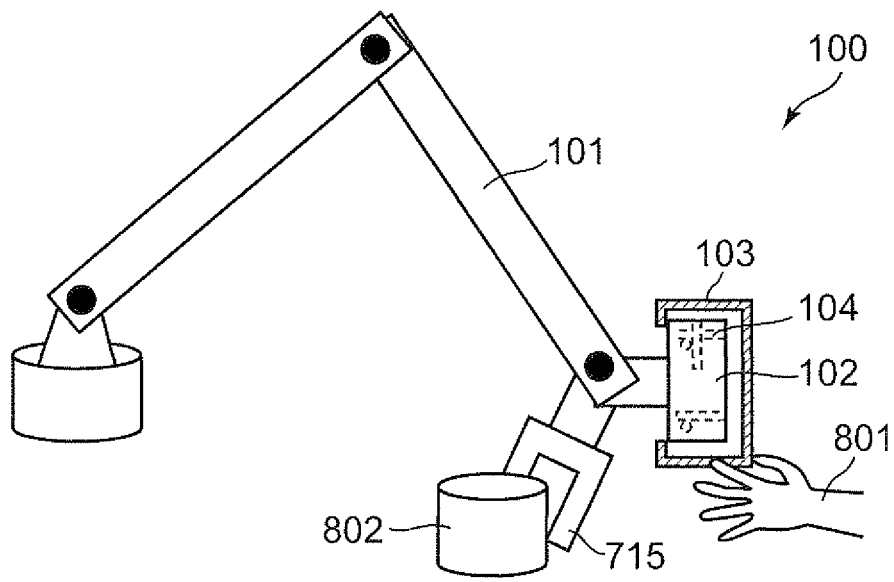
FIG. 8B is an explanatory view on cooperative conveyance by means of the robot arm in the robot according to the first embodiment of the present invention.
Figure 8C:
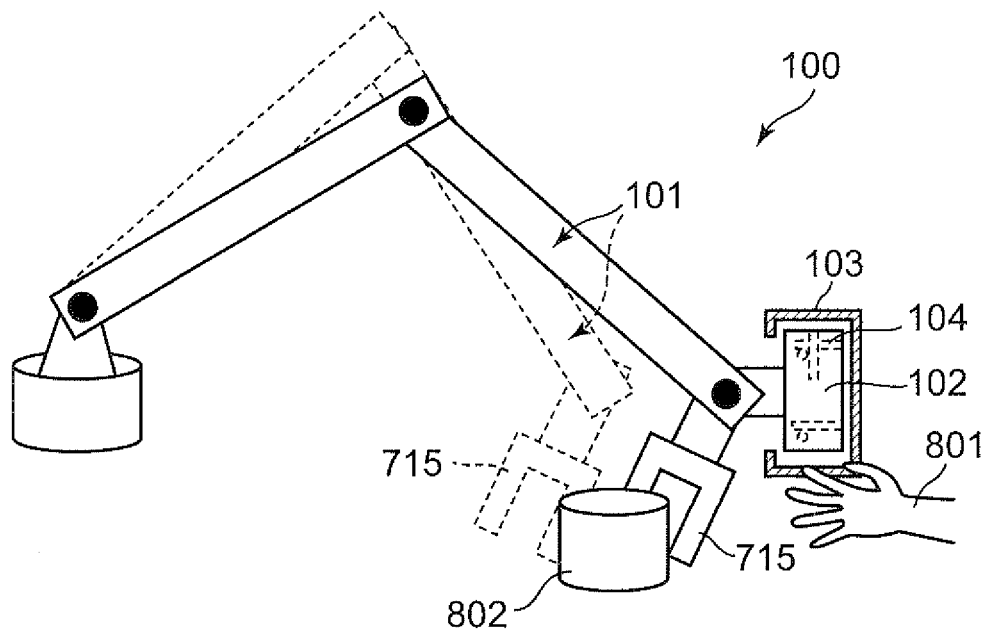
FIG. 8C is an explanatory view on cooperative conveyance by means of the robot arm in the robot according to the first embodiment of the present invention.

FIGS. 8A to 8C show the tracking process of the manipulator 101 in a case where the manipulator 101 and a person cooperatively convey a target object (object to be gripped) 802. The hand 715 is attached to the distal end 702a or the like at the arm tip of the manipulator 101, and the hand 715 is caused to grip the target object 802. Thereafter, the states change in the order of FIGS. 8A, 8B, and 8C.

FIG. 8A shows the state where a person's hand 801 grips the grip portion 103 and is stopped. When the person's hand 801 grips the grip portion 103 so as not to shift the grip portion 103, the relative position $\Delta r$ of the grip portion 103 with respect to the end effector 102 does not exceed the threshold. Accordingly, the manipulator 101 does not perform tracking control but is stopped.

FIG. 8B shows the subsequent state where the person's hand 801 shifts the grip portion 103 and the relative position $\Delta r$ of the grip portion 103 with respect to the end effector 102 exceeds the threshold. More specifically, in the state shown in FIG. 8B, the person's hand 801 shifts the grip portion 103 to the right in FIG. 8B (see the arrow in the figure) and the relative position $\Delta r$ (particularly the value $\Delta z$) of the grip portion 103 with respect to the end effector 102 exceeds the threshold.

FIG. 8C shows the state where the manipulator 101 performs tracking control by means of the control apparatus 602 so that the relative position $\Delta r$ of the grip portion 103 with respect to the end effector 102 is within the threshold. More specifically, In the state shown in FIG. 8C, the person's hand 801 shifts the grip portion 103 to the right in FIG. 8B (see the arrow). Thus, the manipulator 101 performs tracking control by means of the control apparatus 602 in the direction indicated by the arrow in FIG. 8C so that the relative position $\Delta r$ of the grip portion 103 with respect to the end effector 102 is within the threshold, and conveys the target object 802 from the position indicated by dotted lines to the position indicated by solid lines.

As described above, when the person's hand 801 grips and shifts the grip portion 103, the control apparatus 602 allows the manipulator 101 to track the grip portion 103 in accordance with the shift amount. Because the end effector 102 and the grip portion 103 are provided separately from each other, the person can shift the target object 802 with use of the manipulator 101 only by the force for shifting the grip portion 103.

Figure 9:
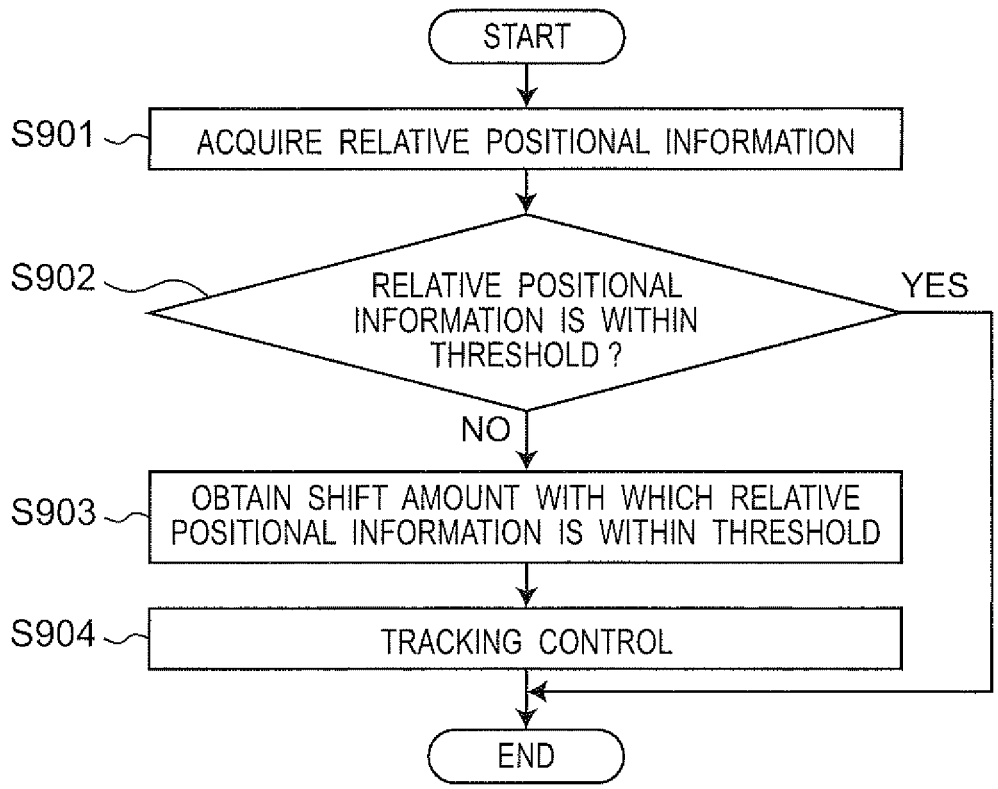
FIG. 9 is a flowchart showing a flow of the process steps from acquiring relative positional information to performing tracking control in the robot according to the first embodiment of the present invention.

Described below with reference to the flowchart shown in FIG. 9 is the operation process of the control apparatus 602 for the robot arm 100 in the robot 601 according to the first embodiment.

In step S901, the relative positional information acquisition unit 607 acquires relative positional information on the grip portion 103 with respect to the end effector 102.

In step S902, the tracking control unit 606 determines whether or not the relative positional information acquired by the relative positional information acquisition unit 607 is within the range of the predetermined threshold. If the tracking control unit 606 determines that the relative positional information is within the range of the threshold, this flow is ended. If the tracking control unit 606 determines that the relative positional information is not within the range of the threshold, the process proceeds to step S903.

In step S903, the tracking control unit 606 obtains a shift amount with which the relative positional information exceeding the range of the threshold is modified to be within the threshold. The shift amount obtained by the tracking control unit 606 is transmitted from the tracking control unit 606 to the control unit 605, and then the process proceeds to step S904.

In step S904, the control unit 605 performs tracking control on the manipulator 101 in accordance with the shift amount received from the tracking control unit 606, and then this flow is ended.

In the configuration according to the first embodiment, the grip portion 103 to be gripped by a person is provided separately from the end effector 102, and the manipulator 101 tracks the grip portion 103 being shifted. Thus, the person can easily shift by small force the robot arm 100 even if the robot arm 100 exerts poor operability upon performing cooperative conveyance, direct teaching, or the like. Therefore, this configuration can reduce the load to the person. As a result, the operability of the robot arm 100 can be improved.

(Second Embodiment)

Figure 10A:
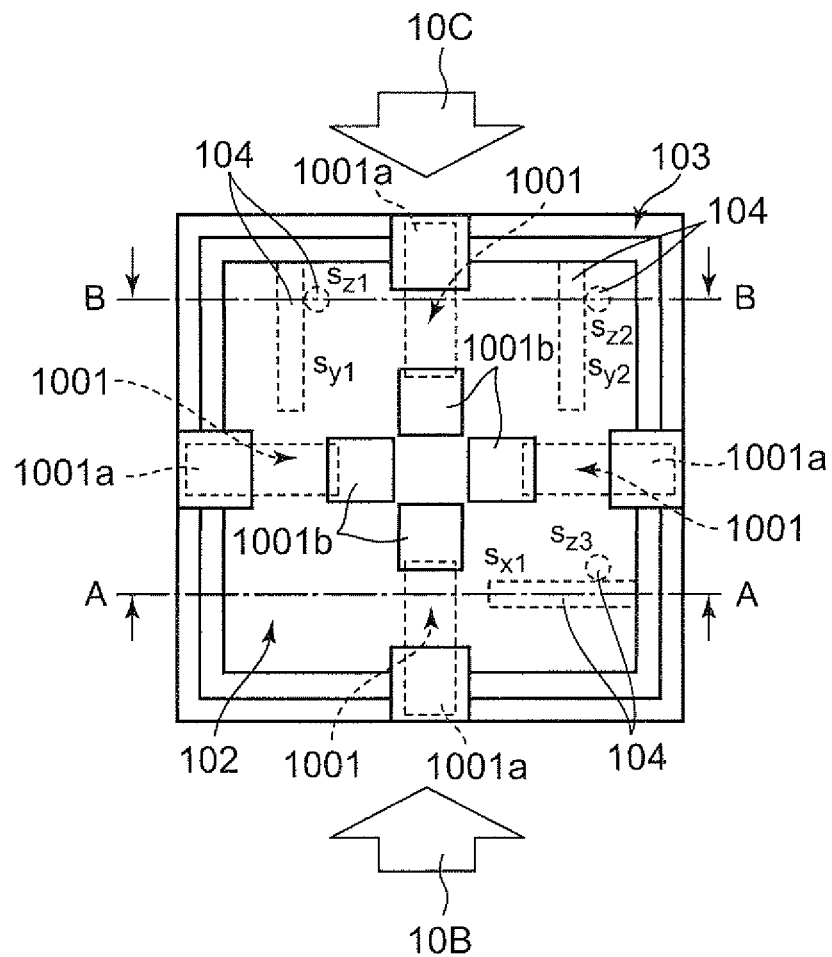
FIG. 10A is a plan view showing an end effector, a grip portion, relative position sensors, and fixing portions that are located respectively at fixed positions, in a robot according to a second embodiment of the present invention.
Figure 10B:
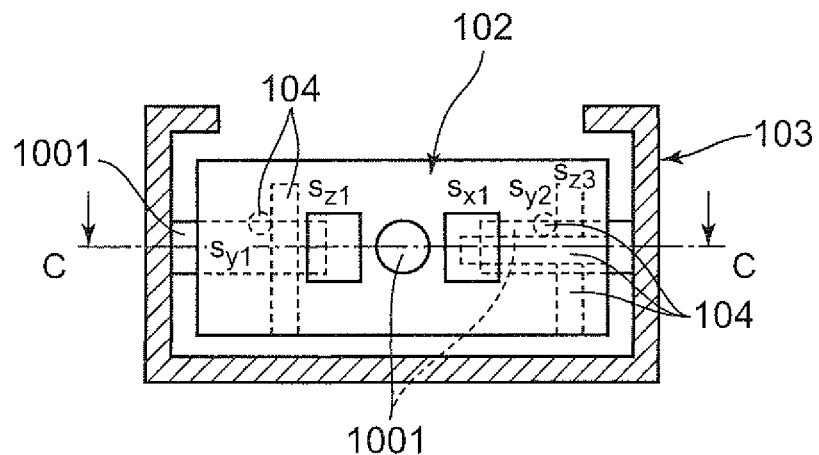
FIG. 10B is a sectional view taken along line A-A indicated in FIG. 10A, showing the end effector, the grip portion, the relative position sensors, and the fixing portions that are located respectively at the fixed positions, in the robot according to the second embodiment of the present invention.
Figure 10C:
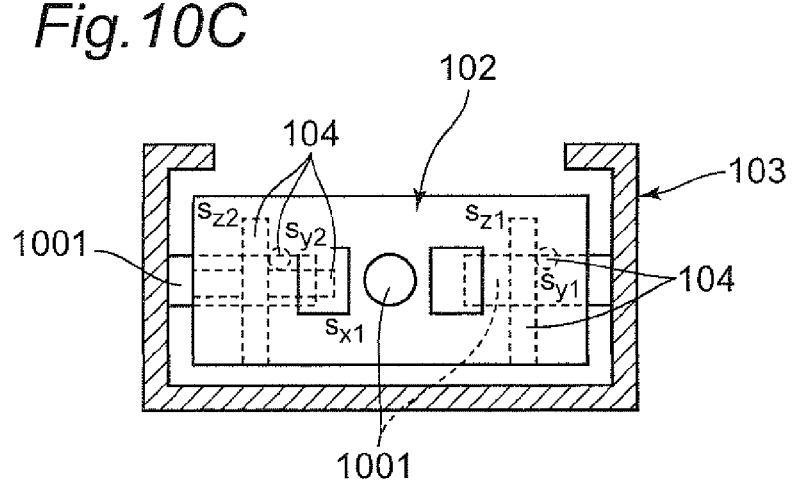
FIG. 10C is a sectional view taken along line B-B indicated in FIG. 10A, showing the end effector, the grip portion, the relative position sensors, and the fixing portions that are located respectively at the fixed positions, in the robot according to the second embodiment of the present invention.

FIG. 10A is a plan view showing an end effector 102 in a rectangular parallelepiped shape having a square plane, a grip portion 103 in a quadrilateral box shape, relative position sensors 104, and four fixing portions 1001 in a robot arm 100 of a robot according to a second embodiment of the present invention. FIG. 10B is a sectional view showing the end effector 102, the grip portion 103, the relative position sensors 104, and the fixing portions 1001. This sectional view is taken along line A-A indicated in FIG. 10A and seen in the direction indicated by an arrow 10B. FIG. 10C is a sectional view showing the end effector 102, the grip portion 103, the relative position sensors 104, and the fixing portions 1001. This sectional view is taken along line B-B indicated in FIG. 10A and seen in the direction indicated by an arrow 10C. In the robot according to the second embodiment of the present invention, the end effector 102, the grip portion 103, and the relative position sensors 104 are configured similarly to those of the first embodiment, respectively. Therefore, these portions in common are denoted by the same reference signs and will not be described repeatedly, and only the portions not in common (the fixing portions 1001) are to be described in the present embodiment.

The fixing portions 1001 are provided substantially at the centers of a pair of side surface portions 102b, a front surface portion 102a, and a rear surface portion 102e of the end effector 102, respectively. The fixing portions 1001 are provided so as to be shiftable outward from the end effector 102 in directions perpendicular to the corresponding surfaces, and each shift between a fixed position where an exposed end is in contact with the grip portion 103 and an accommodated position where the exposed end is away from the grip portion 103 and is accommodated in the end effector 102. More specifically, the fixing portions 1001 each include a columnar fixing member 1001a and a drive unit 1001b (such as an air cylinder) for shifting the corresponding fixing member 1001a. When the drive unit 1001b is caused to drive under the control of a fixing switch unit 1202 that functions as a fixing member drive control unit of the control apparatus 602, the fixing portion 1001 shifts between the fixed position where an end (the exposed end) of the fixing member 1001a projects from the end effector 102 to be in contact with the grip portion 103 and the accommodated position where the end is accommodated in the end effector 102. The drive unit 1001b may not be provided as the cylinder but may be configured by a spring and a solenoid combined with each other.

Figure 10D:
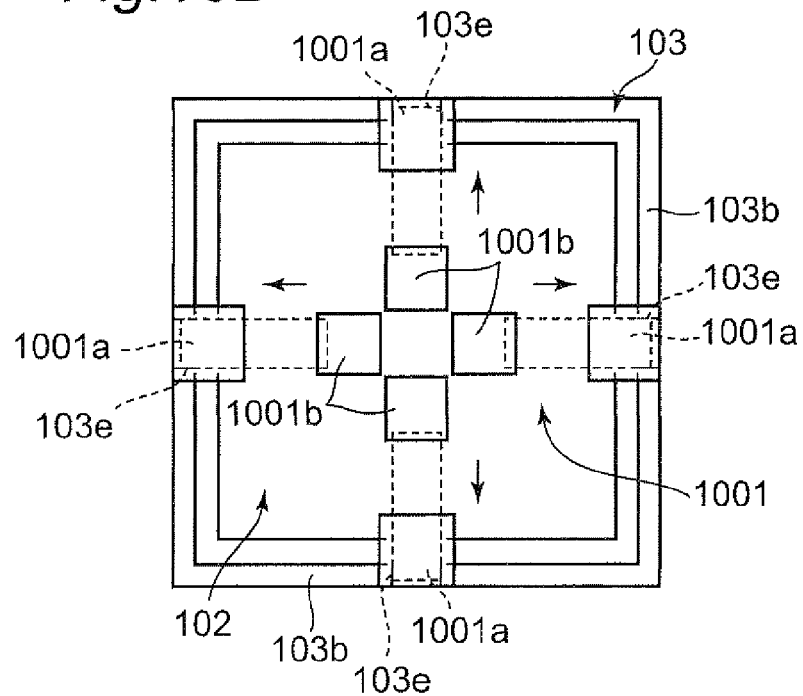
FIG. 10D is a sectional view taken along line C-C indicated in FIG. 10B, showing the end effector, the grip portion, and the fixing portions that are located respectively at the fixed positions, in the robot according to the second embodiment of the present invention.
Figure 10E:
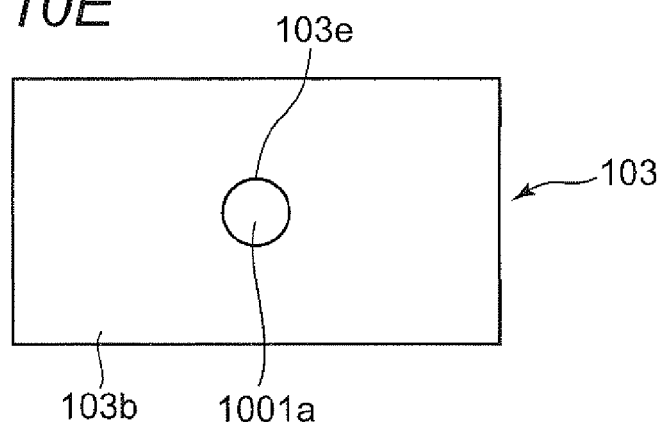
FIG. 10E is a side view showing the grip portion and the fixing portions that are located respectively at the fixed positions, in the robot according to the second embodiment of the present invention.
Figure 10F:
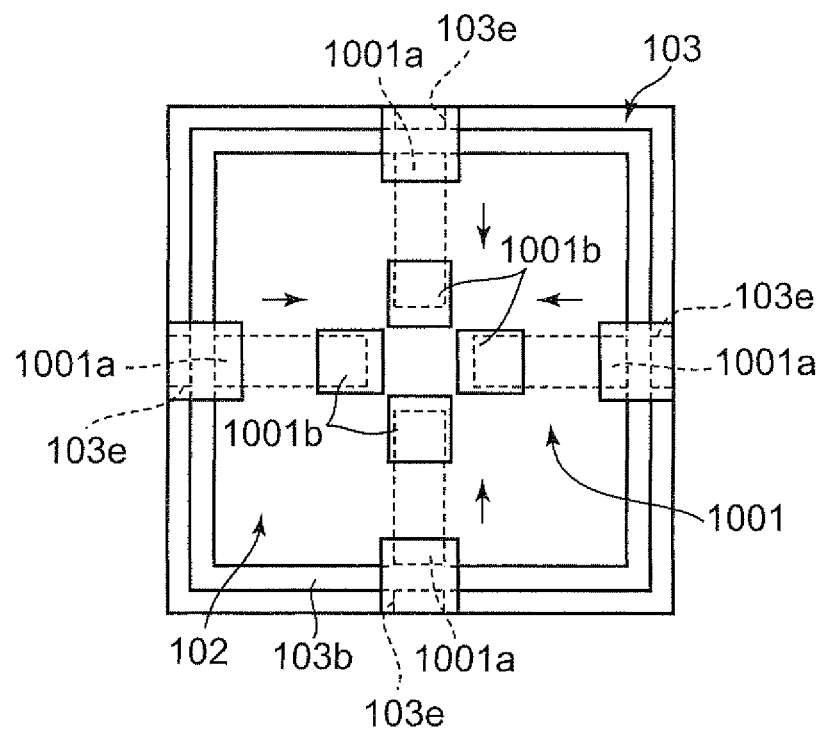
FIG. 10F is a sectional view showing the end effector, the grip portion, and the fixing portions that are located respectively at accommodated positions, in the robot according to the second embodiment of the present invention.
Figure 10G:
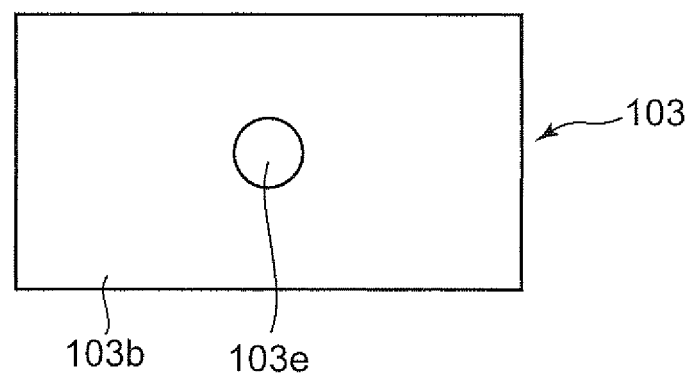
FIG. 10G is a side view showing the grip portion and the fixing portions that are located respectively at the accommodated positions, in the robot according to the second embodiment of the present invention.

FIGS. 10D to 10G show the states where the fixing members 1001a shift between the fixed positions and the accommodated positions, respectively. FIG. 10D is a sectional view taken along line C-C in FIG. 10B, showing the state where the respective fixing members 1001a shift from the accommodated positions to the fixed positions. FIG. 10E shows one of the side surface portions 103b of the grip portion 103 in the state shown in FIG. 10D, where the exposed end of each of the fixing members 1001a is inserted into a through hole 103e provided at the center of each of the side surface portions 103b. FIG. 10F is a sectional view taken along line C-C in FIG. 10B, showing the state where the respective fixing members 1001a shift from the fixed positions to the accommodated positions. FIG. 10G shows one of the side surface portions 103b of the grip portion 103 in the state shown in FIG. 10F, where the exposed end of each of the fixing members 1001a is extracted from the through hole 103e in the side surface portion 103b and is located outside the through hole 103e.

Figure 11A:
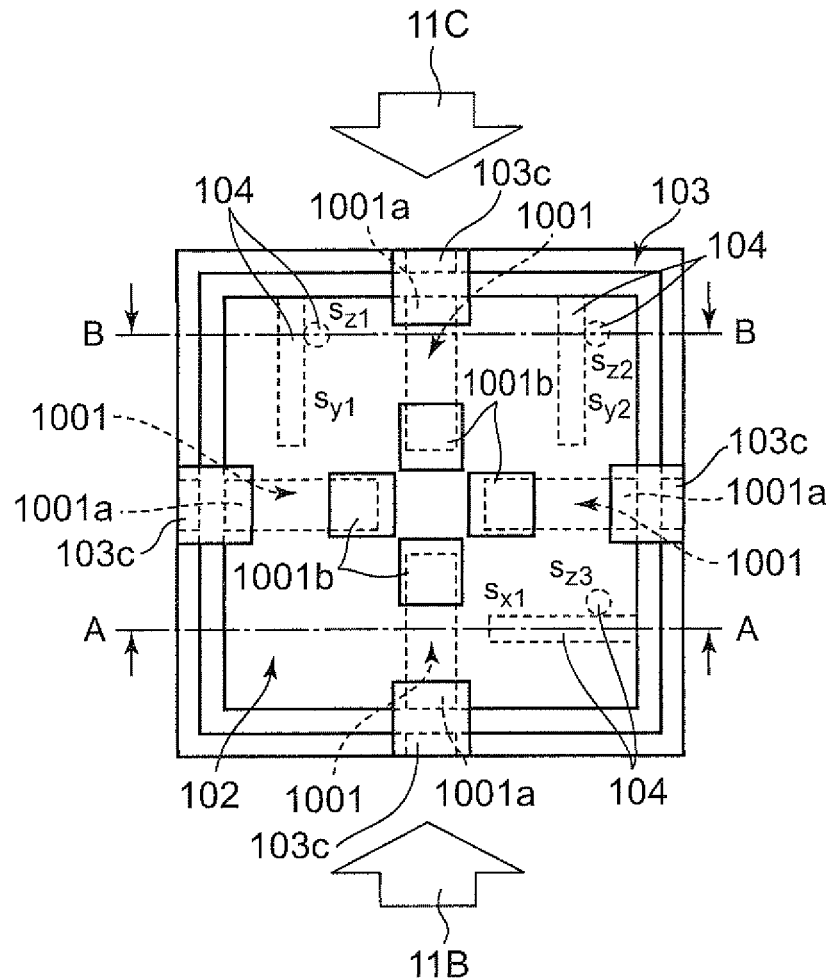
FIG. 11A is a plan view showing the end effector, the grip portion, the relative position sensors, and the fixing portions that are located respectively at the accommodated positions, in the robot according to the second embodiment of the present invention.
Figure 11B:
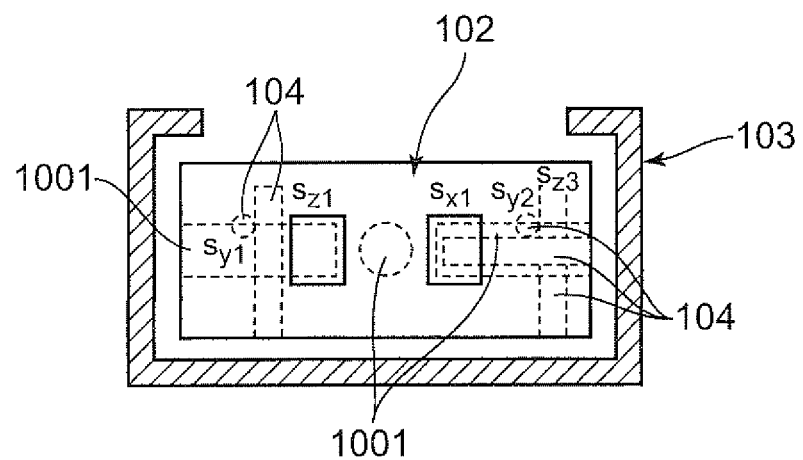
FIG. 11B is a sectional view showing the end effector, the grip portion, the relative position sensors, and the fixing portions that are located respectively at the accommodated positions, in the robot according to the second embodiment of the present invention.
Figure 11C:
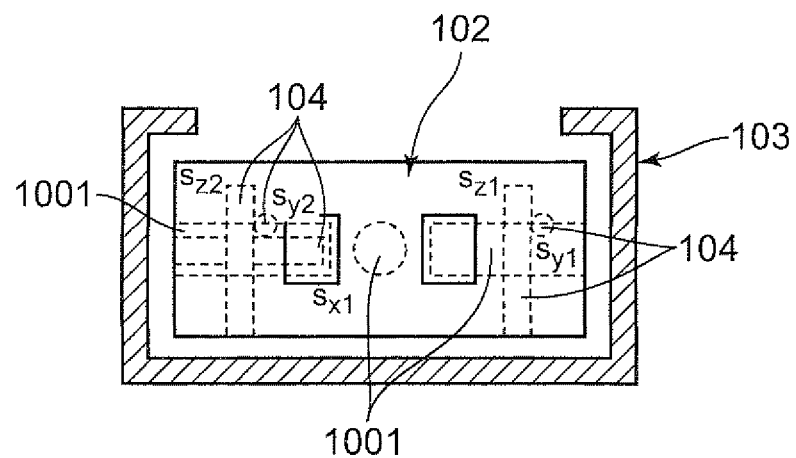
FIG. 11C is a sectional view showing the end effector, the grip portion, the relative position sensors, and the fixing portions that are located respectively at the accommodated positions, in the robot according to the second embodiment of the present invention.

As shown in FIGS. 10A to 10C, the fixing portions 1001 are provided to fix the end effector 102 and the grip portion 103 at the same positions (where the end effector 102 and the grip portion 103 are not displaced from each other (where measurement values g of gap sensors $s_{x1}$, $s_{y1}$, $s_{y2}$, $s_{z1}$, $s_{z2}$, and $s_{z3}$ are the same and constant (3 mm in a specific example))). As shown in FIGS. 11A to 11C, in the case where the end effector 102 and the grip portion 103 are not fixed by the fixing portions 1001, the fixing members 1001a of the fixing portions 1001 are located at the accommodated positions so as to be incorporated in the end effector 102. When the exposed end of each of the fixing members 1001a of the fixing portions 1001 is inserted into the through hole 103e provided at the center of corresponding one of the side surface portions 103b of the grip portion 103, the fixing member 1001a is fixed at the same fixed position with respect to the grip portion 103. The fixing switch unit 1202 shown in FIG. 12 can drive and control the drive units 1001b such that the fixing switch unit 1202 switches between the states where the fixing portions 1001 fix and do not fix the end effector 102 and the grip portion 103 (to be detailed later). The fixing switch unit 1202 is located in the control apparatus main body 603, receives information from each of the input/output IF 608 and a mode switch unit 1201, and transmits information on switching of the fixed state of the fixing portions 1001 to the control unit 605.

In FIGS. 10A to 10C, the fixing portions 1001 are located at the four positions so as to face the four side surface portions 103b of the grip portion 103. However, the locations of the fixing portions 1001 are not necessarily limited to this configuration shown in FIGS. 10A to 10C. Still alternatively, no limitation is provided to the number of the fixing portions 1001.

The fixing portions 1001 are located so as not to be in contact with the relative position sensors 104 that are incorporated in the end effector 102.

Figure 12:
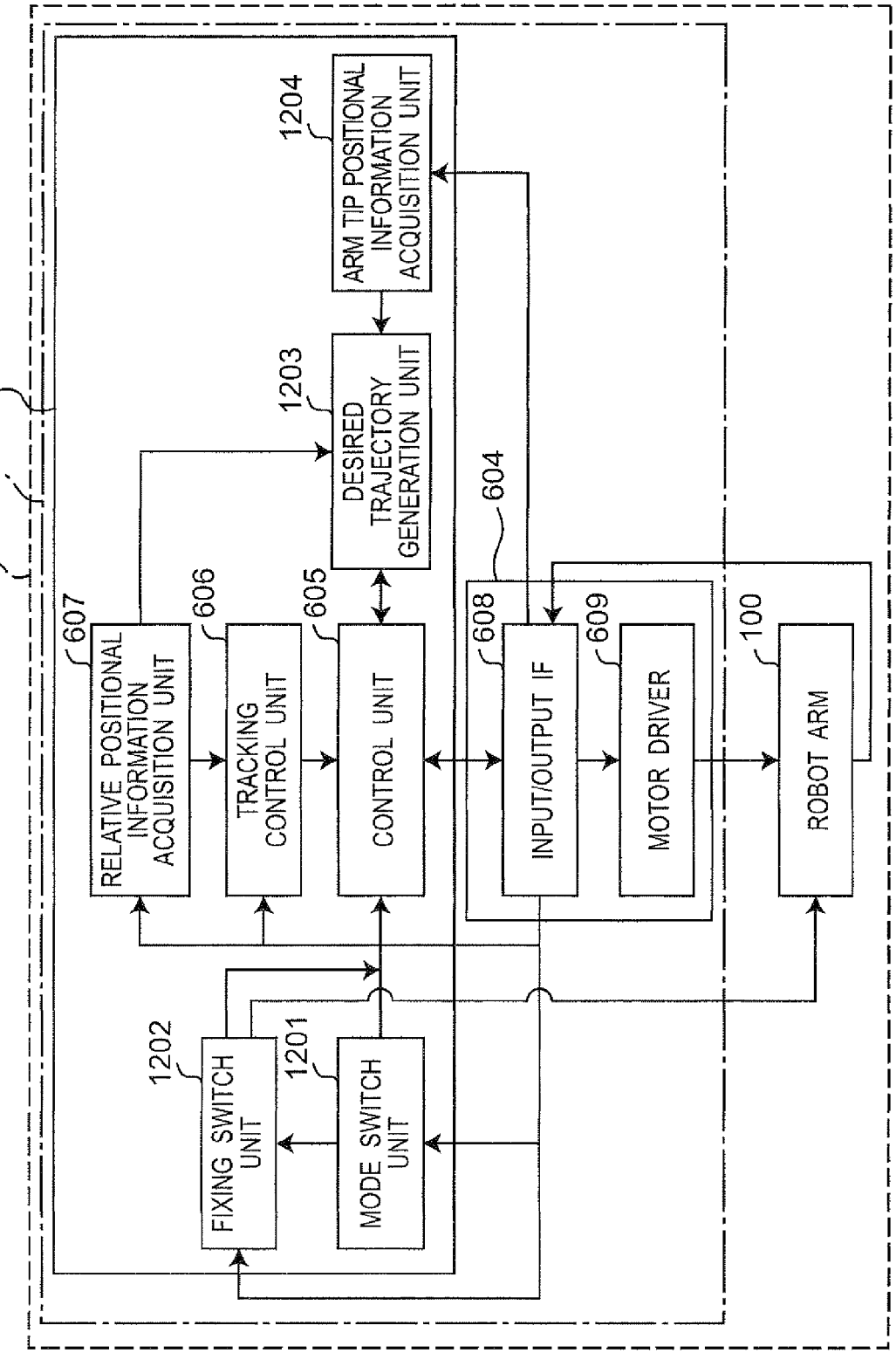
FIG. 12 is a block diagram of a robot arm in the robot according to the second embodiment of the present invention.

FIG. 12 is a block diagram of the robot arm 100 in the robot 601 according to the second embodiment of the present invention. In the robot according to the second embodiment of the present invention, the manipulator 101, the control unit 605, the tracking control unit 606, the relative positional information acquisition unit 607, and the motor driver 609 are configured similarly to those of the first embodiment, respectively. Therefore, these portions in common are denoted by the same reference signs and will not be described repeatedly, and only the portions not in common are to be described in detail below.

The mode switch unit 1201 is included in the control apparatus main body 603, and switches control modes of the manipulator 101 in accordance with signals received from the input/output IF 608, so as to transmit the switched mode to the control unit 605 and the fixing switch unit 1202. The control mode is any one of a "stopped mode", a "teaching mode", and a "playback mode". The control modes are switched with use of a changeover switch 608a that is provided to the input/output IF 608. When the person operates the changeover switch 608a, a corresponding signal is transmitted to the mode switch unit 1201 by way of the input/output IF 608, so that the mode switch unit 1201 switches to one of the control modes of the "stopped mode", the "teaching mode", and the "playback mode". Similarly, the mode switch unit 1201 determines start and end time points of the teaching motion (the teaching motion in accordance with the teaching operation by the person) as well as those of the playback motion. The start and end time points are determined with use of a start button 608b and a finish button 608c that are provided to the input/output IF 608. The period of each of the teaching motion and the playback motion is set from a time point when the person presses the start button 608b and a start button pressed signal is received by the mode switch unit 1201 by way of the input/output IF 608 to a time point when the person presses the finish button 608c and a finish button pressed signal is received by the mode switch unit 1201 by way of the input/output IF 608. Alternatively, the start button 608b and the finish button 608c may be replaced with a single button that has both the function of the start button 608b and the function of the finish button 608c. During the period except for the period in motion, the motion similar to that in the "stopped mode" is performed even in a case where the "teaching mode" or the "playback mode" is selected. The motion in each of the modes of the "stopped mode", the "teaching mode", and the "playback mode" is to be described later. Depending on the selected one of the modes, the mode switch unit 1201 determines whether a "fixing" state (where the respective fixing portions 1001 are located at the fixed positions and the end effector 102 and the grip portion 103 are fixed at the same positions so as not to be relatively displaced from each other) or a "not fixing" state (where the respective fixing portions 1001 are located at the accommodated positions and are incorporated in the end effector 102). Such fixing switch information (whether the "fixing" state or the "not fixing" state) thus determined by the mode switch unit 1201 is transmitted from the mode switch unit 1201 to the fixing switch unit 1202. The fixing switch information in each of the modes is described below, and these pieces of information are stored in an internal storage unit in the mode switch unit 1201. The mode switch unit 1201 automatically selects the "not fixing" state in the "stopped mode", the "not fixing" state in the "teaching mode", and the "fixing" state in the "playback mode", respectively. Exceptionally, in the case where the motion similar to that in the "stopped mode" is performed in the "playback mode", the mode switch unit 1201 selects the "fixing" state.

Figure 13A:
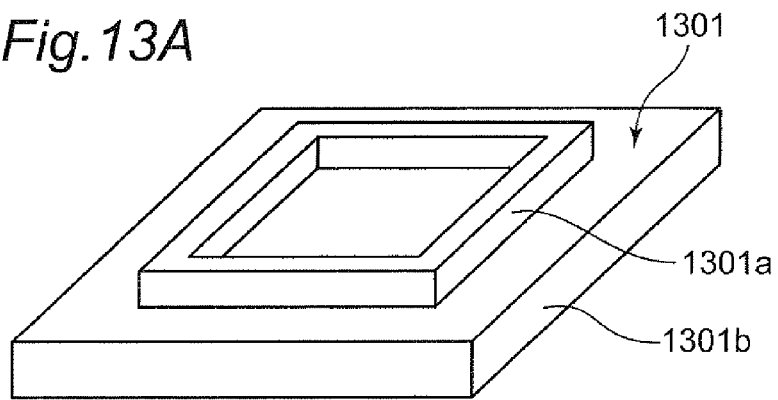
FIG. 13A is an explanatory view of a mount base in the robot according to the second embodiment of the present invention.
Figure 13B:
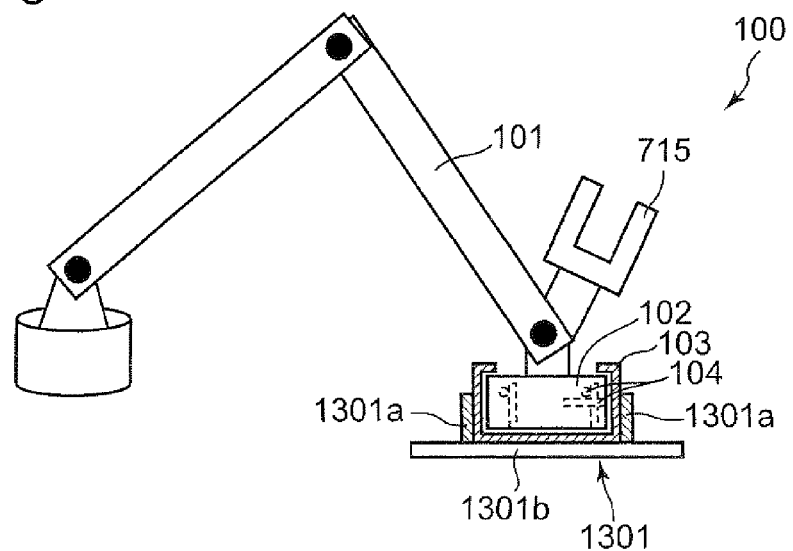
FIG. 13B is an explanatory view of the mount base in the robot according to the second embodiment of the present invention.

The fixing switch unit 1202 switches the fixing portions 1001 between the case where the respective fixing members 1001*a* of the fixing portions 1001 are located at the fixed positions to fix the end effector 102 and the grip portion 103 at the same positions (the "fixing" state) and the case where the respective fixing members 1001*a* of the fixing portions 1001 are located at the accommodated positions and are incorporated in the end effector 102 (the "not fixing" state). The fixing switch unit 1202 automatically switches in accordance with the fixing switch information that is transmitted from the mode switch unit 1201 to the fixing switch unit 1202. In a case where the fixing switch unit 1202 switches the fixing state of the fixing portions 1001, the person's hand 801 can switch the fixing state of the fixing portions 1001 while gripping the grip portion 103. However, because the cross section of the exposed end of each of the fixing members 1001*a* of the fixing portions 1001 is sized identically with the hole 103*e* provided in the grip portion 103, it is quite difficult to shift the fixing members 1001*a* to the fixed positions or to shift the fixing members 1001*a* from the fixed positions to the accommodated positions in the state where the cross sections of the exposed ends of the fixing members 1001*a* are matched with the holes 103*e*. Alternatively, as shown in FIGS. 13A and 13B, there may be provided a mount base 1301 that restricts to locate the grip portion 103 at a certain position. The mount base 1301 has a projection 1301*a* that has a low quadrilateral frame shape slightly larger than the outer shape of the grip portion 103, and a quadrilateral board 1301*b*. The projection 1301*a* is provided on the quadrilateral board 1301*b*. When the grip portion 103 is placed inside the projection 1301*a* on this mount base 1301 as shown in FIG. 13B, positional restriction on the grip portion 103 can be easily achieved in the state where the cross sections of the exposed ends of the fixing members 1001*a* of the fixing portions 1001 are matched with the holes 103*e* provided in the grip portion 103, respectively. In this manner, when the fixing state of the fixing portions 1001 is switched in the state where the grip portion 103 is mounted on the mount base 1301 and is positionally restricted, the switching motion can be performed smoothly and easily.

Figure 13C:
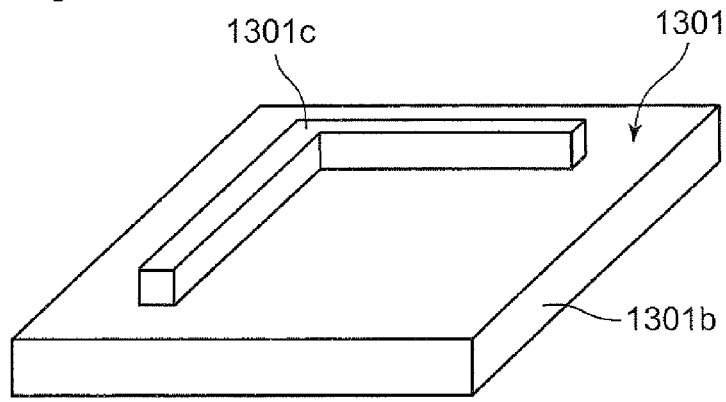
FIG. 13C is an explanatory view of the mount base in the robot according to the second embodiment of the present invention.
Figure 13D:
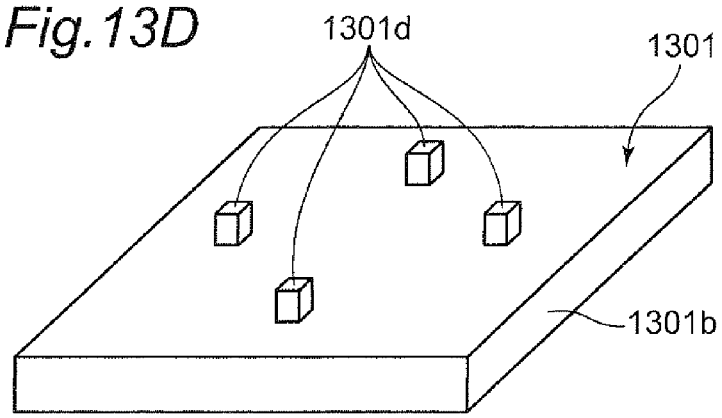
FIG. 13D is an explanatory view of the mount base in the robot according to the second embodiment of the present invention.

The projection 1301*a* of the mount base 1301 has the quadrilateral frame shape as shown in FIG. 13A. Alternatively, the projection 1301*a* may be replaced with a projection 1301*c* having an L-letter shape as shown in FIG. 13C. In this case, the two adjacent side surface portions 103*b* of the quadrilateral grip portion 103 are positionally restricted by the projection 1301*c* so as to restrict the position of the grip portion 103. Still alternatively, as shown in FIG. 13D, there may be provided four pins 1301*d* to restrict the respective positions of the four side surface portions 103*b* of the quadrilateral grip portion 103 in order to restrict the position of the grip portion 103.

Described below with reference to FIGS. 14A to 14D is the process of fixing the fixing portions 1001 by means of the mount base 1301. The states change in the order of FIGS. 14A, 14B, 140, and 14D.

Figure 14A:
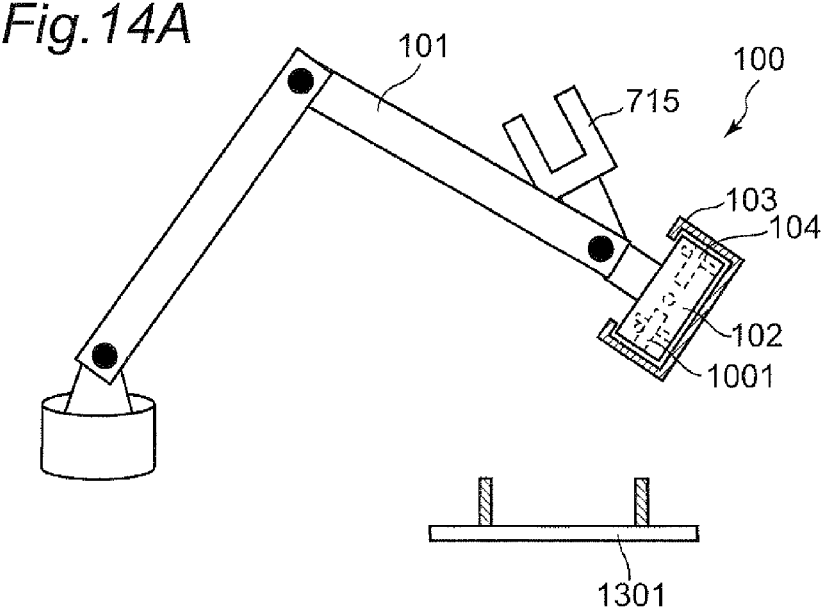
FIG. 14A is an explanatory view on switching of the fixing portions with use of the mount base in the robot according to the second embodiment of the present invention.

FIG. 14A shows the state where the manipulator 101 is stopped. In this state, the fixing members 1001*a* are located at the accommodated positions, respectively, and the fixing portions 1001 do not fix the grip portion or the end effector (in other words, the "not fixing" state).

Figure 14B:
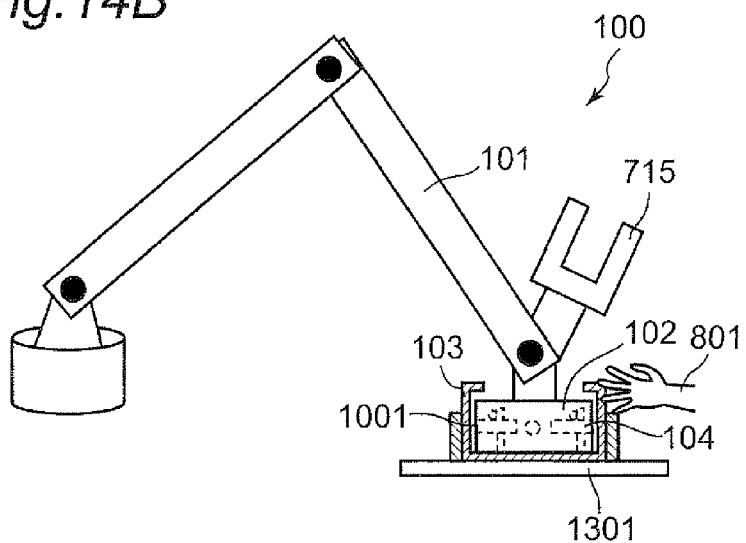
FIG. 14B is an explanatory view on switching of the fixing portions with use of the mount base in the robot according to the second embodiment of the present invention.

FIG. 14B shows the state where the person's hand 801 operates the grip portion 103 to perform tracking control on the manipulator 101, and the grip portion 103 is located so as to be fitted in the mount base 1301. Also in this state, the fixing members 1001*a* are located at the accommodated positions, respectively, and the fixing portions 1001 do not fix the grip portion or the end effector (in other words, the "not fixing" state).

Figure 14C:
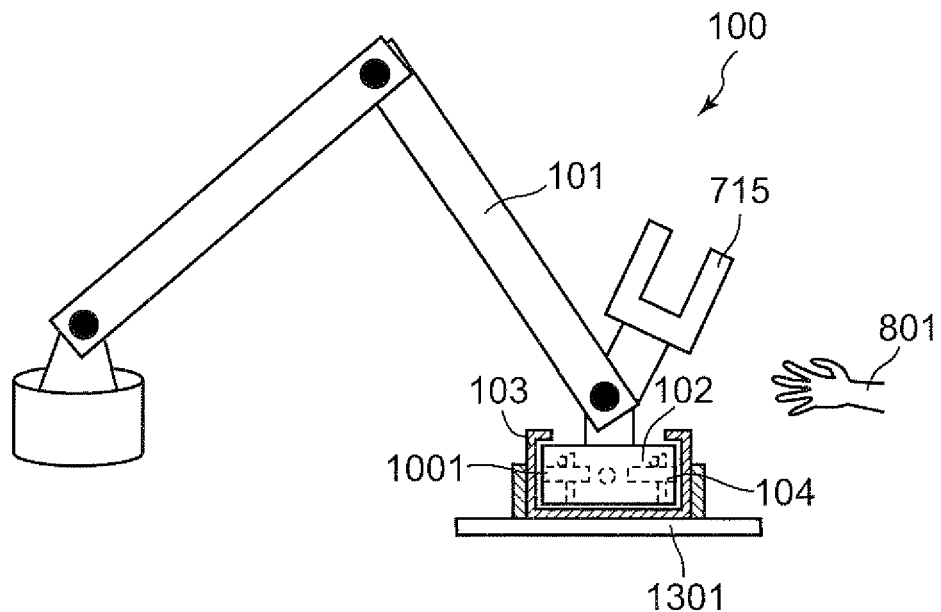
FIG. 14C is an explanatory view on switching of the fixing portions with use of the mount base in the robot according to the second embodiment of the present invention.

FIG. 14C shows the state where the person's hand 801 releases the grip portion 103 after the grip portion 103 is mounted on the mount base 1301, and the manipulator 101 is tracking controlled and stopped at the position where the values g of the gap sensors $s_{x1}$, $s_{y1}$, $s_{y2}$, $s_{z1}$, $s_{z2}$, and $s_{z3}$ are constant (such as 3 mm). Also in this state, the fixing members 1001*a* are located at the accommodated positions, respectively, and the fixing portions 1001 do not fix the grip portion or the end effector (in other words, the "not fixing" state).

Figure 14D:
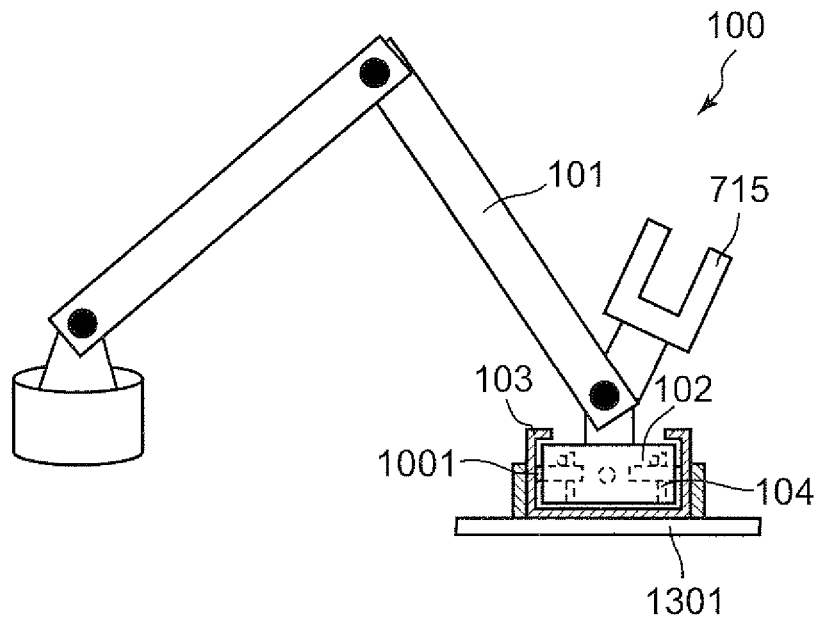
FIG. 14D is an explanatory view on switching of the fixing portions with use of the mount base in the robot according to the second embodiment of the present invention.

FIG. 14D shows the state where the fixing switch unit 1202 switches the respective fixing portions 1001 into the "fixing" state and the respective fixing portions 1001 fix the end effector 102 and the grip portion 103. In this state, the fixing members 1001*a* shift from the accommodated positions to the fixed positions, and the fixing portions 1001 fix the end effector 102 and the grip portion 103, respectively (in other words, the "fixing" state).

In the second embodiment, there are further provided an arm tip positional information acquisition unit 1204 and a desired trajectory generation unit 1203 in the control apparatus main body 603.

The arm tip positional information acquisition unit 1204 receives positional information on the manipulator 101 from the input/output IF 608 and time information from a timer incorporated in the input/output IF 608. The arm tip positional information acquisition unit 1204 sets the received positional information on the manipulator 101 as arm tip positional information $r_0$, and transmits the arm tip positional information $r_0$ to the desired trajectory generation unit 1203. The arm tip positional information acquisition unit 1204 also transmits the time information to the desired trajectory generation unit 1203.

The desired trajectory generation unit 1203 acquires relative positional information $\Delta r$ from the relative positional information acquisition unit 607, and acquires the arm tip positional information $r_0$ and the time information from the arm tip positional information acquisition unit 1204. The desired trajectory generation unit 1203 obtains grip portion positional information r based on these pieces of information thus acquired and stores the same, and during the playback motion, the desired trajectory generation unit 1203 transmits the stored grip portion positional information r to the control unit 605 at a constant time interval (such as every 1 ms) in the order of the acquisition. The desired trajectory generation unit 1203 distinguishes the control mode in accordance with a control mode information signal received from the control unit 605. The grip portion positional information is obtained in the following manner. When the grip portion positional information is expressed as r, the arm tip positional information is expressed as $r_0$, and the relative positional information is expressed as $\Delta r$, the desired trajectory generation unit 1203 obtains grip portion positional information by the equation $r = r_0 + \Delta r$.

The input/output IF 608 is provided with the control mode changeover switch 608*a* in addition to the functions according to the first embodiment, and transmits, to the mode switch unit 1201, the selected control mode as control mode information. The input/output IF 608 is also provided with the start button 608*b* and the finish button 608*c*, and transmits start information or end information to the mode switch unit 1201 when the person (working person) presses the start button 608*b* or the finish button 608*c*. The input/output IF 608 also transmits, to the arm tip positional information acquisition unit 1204, the arm tip positional information acquired by the input/output IF 608 from the manipulator 101 and the time information acquired from the timer incorporated in the input/output IF 608.

Described below are the control modes switched by the mode switch unit 1201 in conjunction with a specific task. The specific task is exemplified by a task of stirring in a pot in this case. FIGS. 15A to 15D show the task of stirring ingredients in a pot 1502 with a stirring rod 1501 that is gripped by a hand 715.

In the "stopped mode" among the control modes, the manipulator 101 or the control apparatus 602 for the robot arm is stopped. In this case, the respective fixing portions 1001 are in the "not fixing" state.

Described with reference to FIGS. 15A to 15D is a motion of teaching the task of stirring in the pot 1502 in the "teaching mode" among the control modes. The states change in the order of FIGS. 15A, 15B, 15C, and 15D. In this case, the teaching motion is performed in the manner of direct teaching.

Figure 15A:
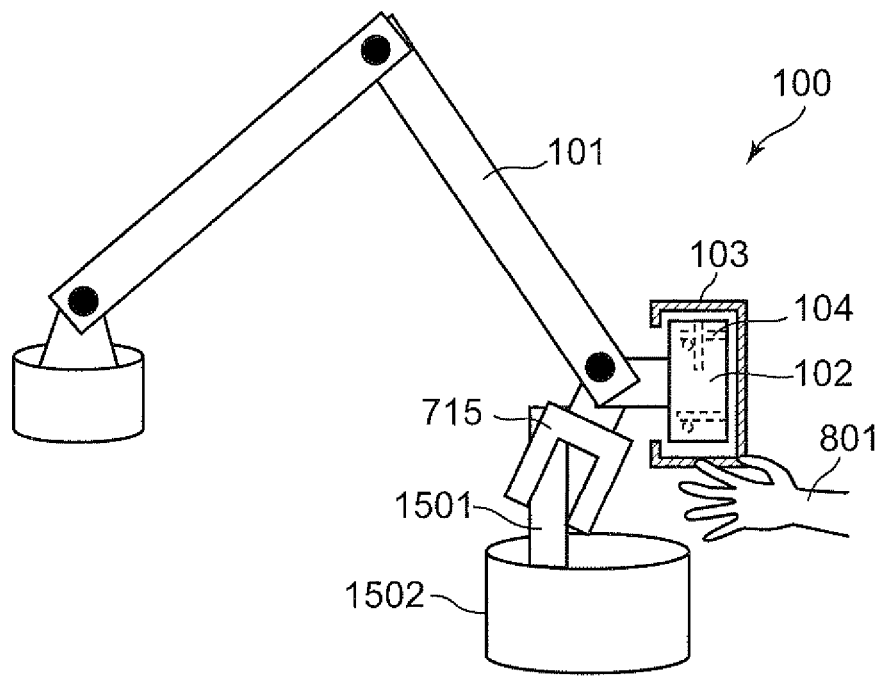
FIG. 15A is an explanatory view on a motion of teaching a task of stirring in a pot with the robot according to the second embodiment of the present invention.

FIG. 15A shows the state where the person presses the start button 608b of the input/output IF 608, the manipulator 101 starts the teaching motion, the person's hand 801 grips the grip portion 103, and the manipulator 101 is stopped. When the person's hand 801 grips the grip portion 103 so as not to shift the grip portion 103, the relative position Δr of the grip portion 103 with respect to the end effector 102 does not exceed the threshold. Accordingly, the manipulator 101 does not perform tracking control but is stopped. In the "teaching mode", the fixing switch unit 1202 acquires fixing switch information from the mode switch unit 1201, and the fixing switch unit 1202 automatically switches into the "not fixing" state.

Figure 15B:
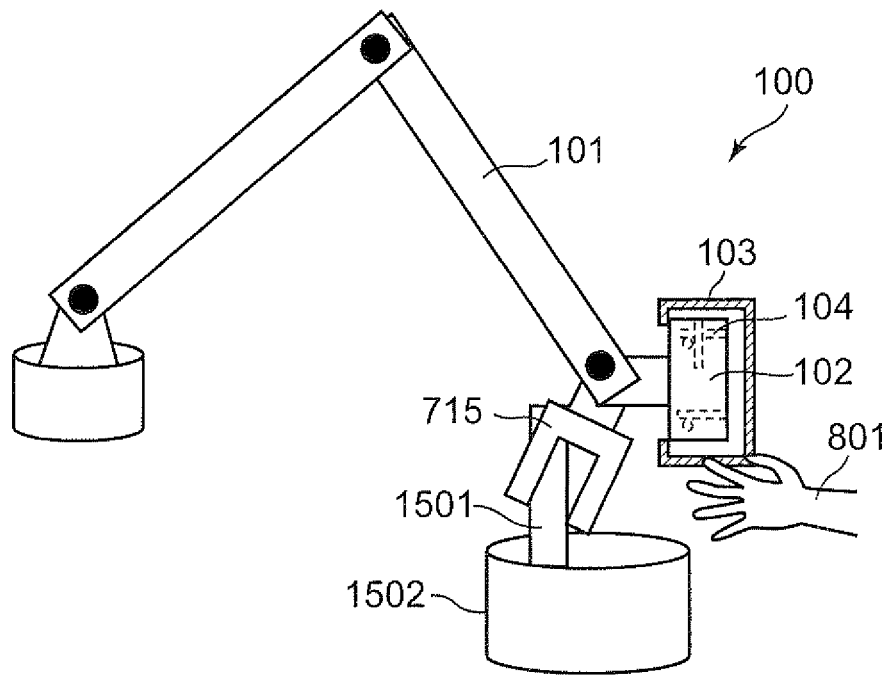
FIG. 15B is an explanatory view on the motion of teaching the task of stirring in the pot with the robot according to the second embodiment of the present invention.

FIG. 15B shows the state where the person's hand 801 grips and shifts the grip portion 103 and the relative position Δr of the grip portion 103 with respect to the end effector 102 exceeds the threshold. In this state, the arm tip positional information acquisition unit 1204 acquires arm tip positional information $r_0$ on the manipulator 101, and the relative positional information acquisition unit 607 acquires relative positional information Δr. The desired trajectory generation unit 1203 obtains grip portion positional information r ($=r_0+\Delta r$) based on the arm tip positional information $r_0$ acquired from the arm tip positional information acquisition unit 1204 and the relative positional information Δr acquired from the relative positional information acquisition unit 607. The grip portion positional information r and the time information are stored in the internal storage unit of the desired trajectory generation unit 1203.

Figure 15C:
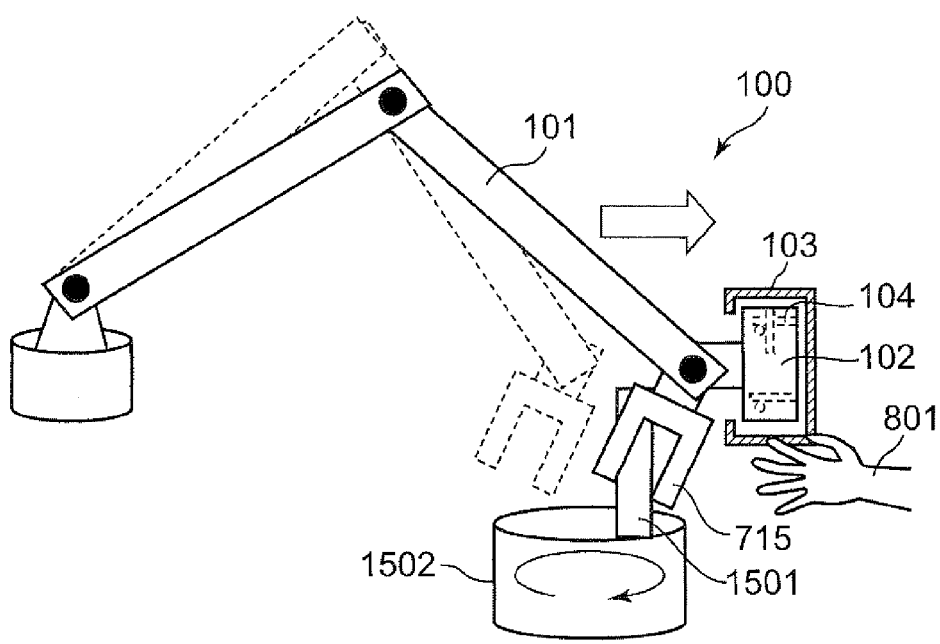
FIG. 15C is an explanatory view on the motion of teaching the task of stirring in the pot with the robot according to the second embodiment of the present invention.

FIG. 15C shows the state where the manipulator 101 performs tracking control so that the relative position Δr of the grip portion 103 with respect to the end effector 102 is within the threshold. In this state, the grip portion 103 gripped by the person's hand 801 is shifted to perform a circular motion so as to perform the task of stirring the ingredients in the pot 1502 with the stirring rod 1501 gripped by the hand 715 of the manipulator 101. Also in this case, the desired trajectory generation unit 1203 acquires the arm tip positional information $r_0$ on the manipulator 101 from the arm tip positional information acquisition unit 1204 and the relative positional information Δr from the relative positional information acquisition unit 607, and generates grip portion positional information r. The grip portion positional information r thus generated and the time information are stored in the internal storage unit of the desired trajectory generation unit 1203.

Figure 15D:
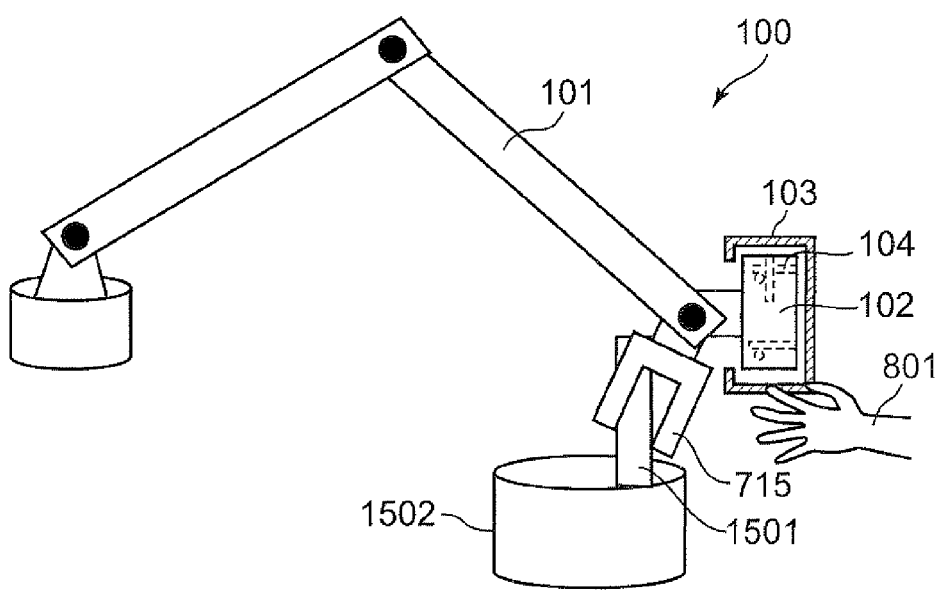
FIG. 15D is an explanatory view on the motion of teaching the task of stirring in the pot with the robot according to the second embodiment of the present invention.

FIG. 15D shows the state where the person presses the finish button 608c of the input/output IF 608 and ends the teaching motion.

Figure 16A:
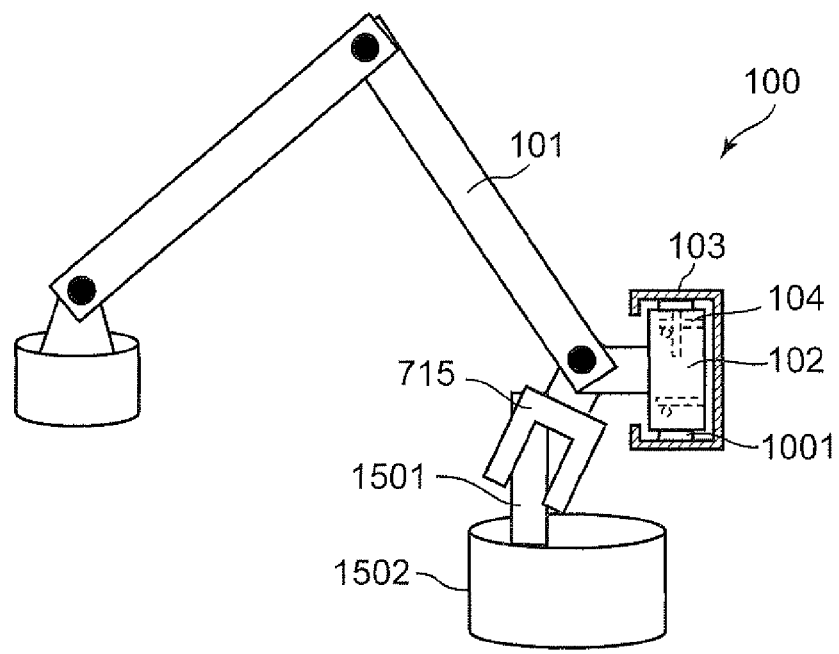
FIG. 16A is an explanatory view on a motion of playing back the task of stirring in the pot with the robot according to the second embodiment of the present invention.
Figure 16B:
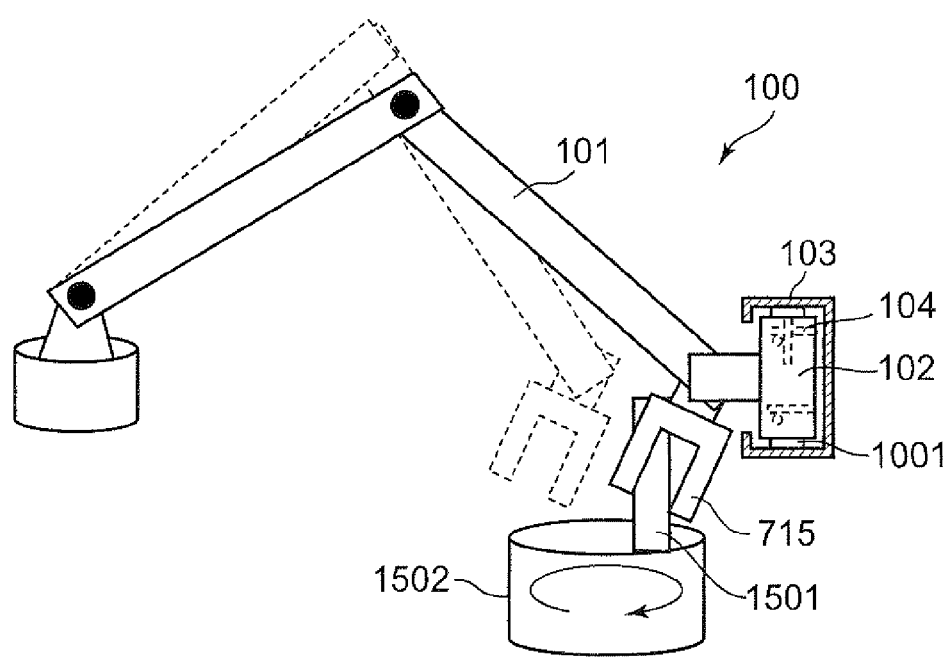
FIG. 16B is an explanatory view on the motion of playing back the task of stirring in the pot with the robot according to the second embodiment of the present invention.
Figure 16C:
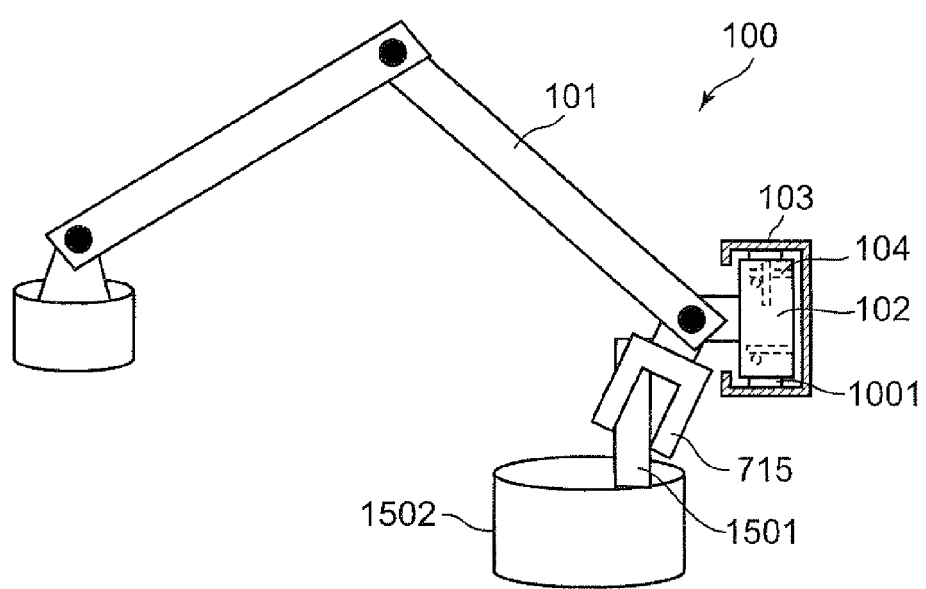
FIG. 16C is an explanatory view on the motion of playing back the task of stirring in the pot with the robot according to the second embodiment of the present invention.

Described next with reference to FIGS. 16A to 16C is the playback motion of the task of stirring in the pot 1502 as an example of a specific task in the "playback mode". The states change in the order of FIGS. 16A, 16B, and 16C.

Initially, the person operates the changeover switch 608a to switch the control mode into the "playback mode". In this case, information on the "playback mode" is transmitted to the mode switch unit 1201 by way of the input/output IF 608, and the mode switch unit 1201 switches the control mode into the "playback mode". FIG. 16A shows the state where, after the control mode is switched into the "playback mode", the start button 608b of the input/output IF 608 is pressed by the person, and a start signal is transmitted to the control unit 605, which starts the playback motion.

In the "playback mode", the fixing switch unit 1202 acquires fixing switch information from the mode switch unit 1201, and the fixing switch unit 1202 automatically switches into the "fixing" state.

FIG. 16B shows the state where the motion taught in the "teaching mode" is played back by the control unit 605. The grip portion positional information r that is generated during the teaching motion and is stored in the desired trajectory generation unit 1203 is transmitted from the desired trajectory generation unit 1203 to the control unit 605, and the manipulator 101 follows the trajectory thus taught under the control of the control unit 605.

FIG. 16C shows the state where the person presses the finish button 608c of the input/output IF 608 and ends the playback motion.

Figure 17:
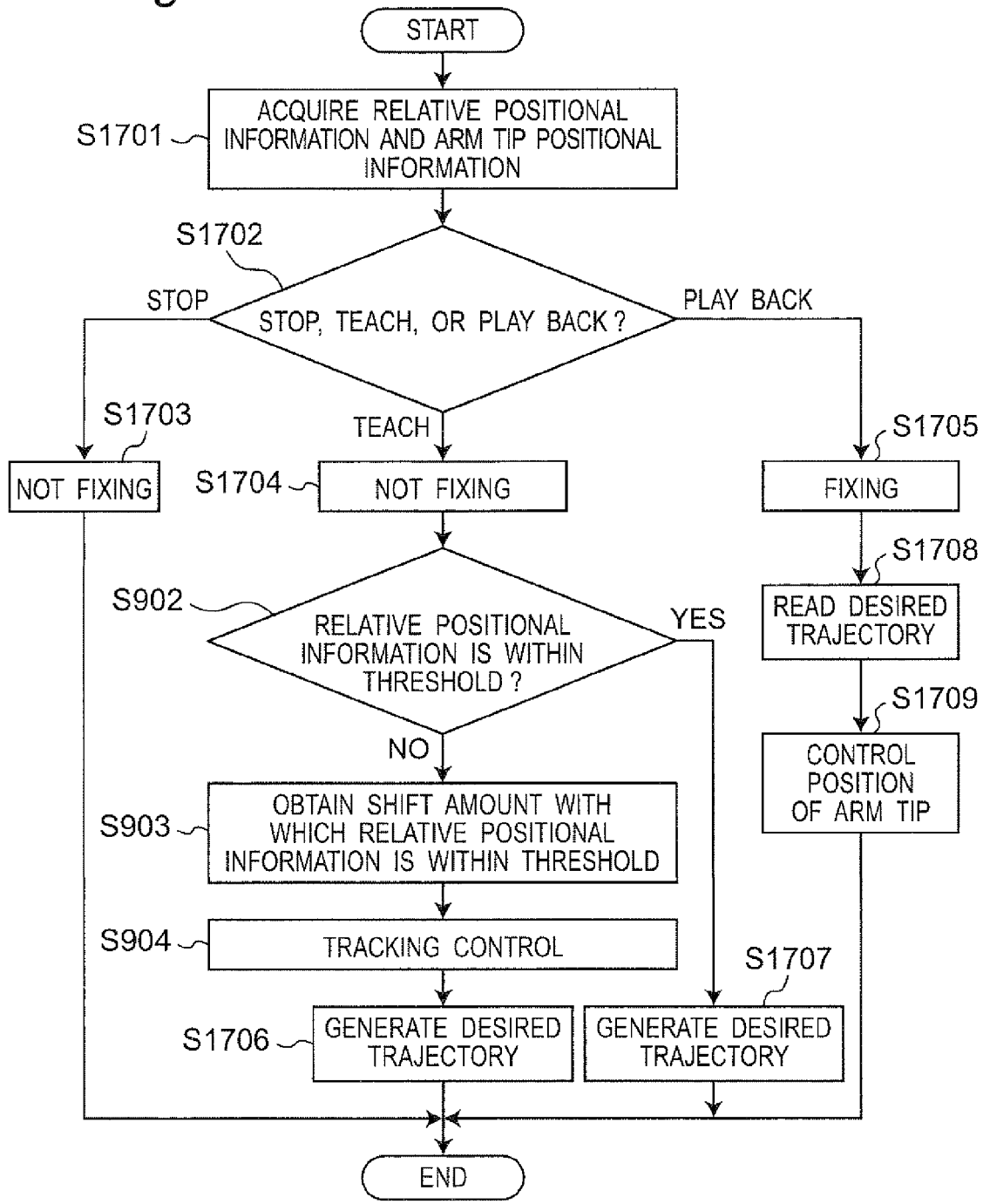
FIG. 17 is a flowchart showing a flow of process steps from acquiring relative positional information and arm tip positional information to performing tracking control and arm tip positional control in the robot according to the second embodiment of the present invention.

Described below with reference to the flowchart shown in FIG. 17 is the operation process of the control apparatus 602 for the robot arm in the robot according to the second embodiment.

In step S1701, the relative positional information acquisition unit 607 acquires, by way of the input/output IF 608, relative positional information on the grip portion 103 with respect to the end effector 102, and the arm tip positional information acquisition unit 1204 acquires arm tip positional information on the manipulator 101 by way of the input/output IF 608.

Then in step S1702, the mode switch unit 1201 switches the control mode of the manipulator 101 into one of the "stopped mode", the "teaching mode", and the "playback mode" in accordance with a signal received from the input/output IF 608. In the switching motion of the control mode by the mode switch unit 1201 by means of the operation of the changeover switch 608a of the input/output IF 608, the process proceeds to step S1703 if the "stopped mode" is selected. The process proceeds to step S1704 if the "teaching mode" is selected. The process proceeds to step S1705 if the "playback mode" is selected.

In step S1703, the fixing switch unit 1202 drives and controls the fixing portions 1001 in accordance with the fixing switch information received from the mode switch unit 1201 so that the fixing portions 1001 are located at the accommodated positions and the end effector 102 and the grip portion 103 are mechanically separated from each other (the "not fixing" state), and this flow is ended.

In step S1704, the fixing switch unit 1202 drives and controls the fixing portions 1001 in accordance with the fixing switch information received from the mode switch unit 1201 so that the fixing portions 1001 are located at the accommodated positions and the end effector 102 and the grip portion 103 are mechanically separated from each other (the "not fixing" state), and the process proceeds to step S902.

Then in step S902, the tracking control unit 606 determines whether or not the relative positional information acquired from the relative positional information acquisition unit 607 is within the range of the predetermined threshold. If the tracking control unit 606 determines that the relative positional information is within the range of the threshold, the process proceeds to step S1707. If the tracking control unit 606 determines that the relative positional information is not within the range of the threshold, the process proceeds to step S903.

Subsequently in step S903, the tracking control unit 606 obtains a shift amount with which the relative positional information exceeding the range of the threshold is modified to be within the threshold, as described earlier. The shift amount obtained by the tracking control unit 606 is transmitted from the tracking control unit 606 to the control unit 605, and then the process proceeds to step S904.

Then in step S904, the control unit 605 performs tracking control on the manipulator 101 in accordance with the shift amount acquired from the tracking control unit 606, and then the process proceeds to step S1706.

Subsequently in step S1706, the desired trajectory generation unit 1203 obtains grip portion positional information r based on the relative positional information Δr acquired by the relative positional information acquisition unit 607 and the arm tip positional information $r_0$ acquired by the arm tip positional information acquisition unit 1204, and generates a desired trajectory. Information on the desired trajectory thus generated is stored in the internal storage unit of the desired trajectory generation unit 1203, and this flow is ended.

On the other hand, in step S 1707, the desired trajectory generation unit 1203 obtains grip portion positional information r based on the relative positional information Δr acquired by the relative positional information acquisition unit 607 and the arm tip positional information $r_0$ acquired by the arm tip positional information acquisition unit 1204, and generates a desired trajectory. Information on the desired trajectory thus generated is stored in the internal storage unit of the desired trajectory generation unit 1203, and this flow is ended.

In step S1705, the fixing switch unit 1202 drives and controls the fixing portions 1001 in accordance with the fixing switch information received from the mode switch unit 1201 so that the fixing portions 1001 are located at the fixed positions and the end effector 102 and the grip portion 103 are fixed by the fixing portions 1001 (the "fixing" state), and the process proceeds to step S1708.

Then in step S1708, the control unit 605 reads the desired trajectory thus generated by the desired trajectory generation unit 1203, and the process proceeds to step S1709.

Subsequently in step S1709, the control unit 605 controls the manipulator 101 so that the position of the grip portion follows the desired trajectory read into the control unit 605, and this flow is ended.

In the above second embodiment, in addition to the functions and effects exerted in the first embodiment, the end effector 102 and the grip portion 103 are fixed by the respective fixing portions 1001 on beginning the playback motion, so that the control unit 605 can accurately play back the motion previously taught. Furthermore, the fixing switch unit 1202 switches into the "not fixing" state on beginning the teaching motion, so that high operability can be ensured during the teaching motion.

(Third Embodiment)

In the second embodiment, the fixing switch unit 1202 switches between the "fixing" state and the "not fixing" state during the teaching motion and the playback motion, respectively. However, in such a configuration, there may arise a problem that the movable range in the "fixing" state during the teaching motion differs from the movable range in the "not fixing" state during the playback motion. A robot according to a third embodiment of the present invention has a solution to such a problem. The difference of the movable ranges mentioned above are detailed with reference to (a)-(c) of FIG. 18.

Figure 18:
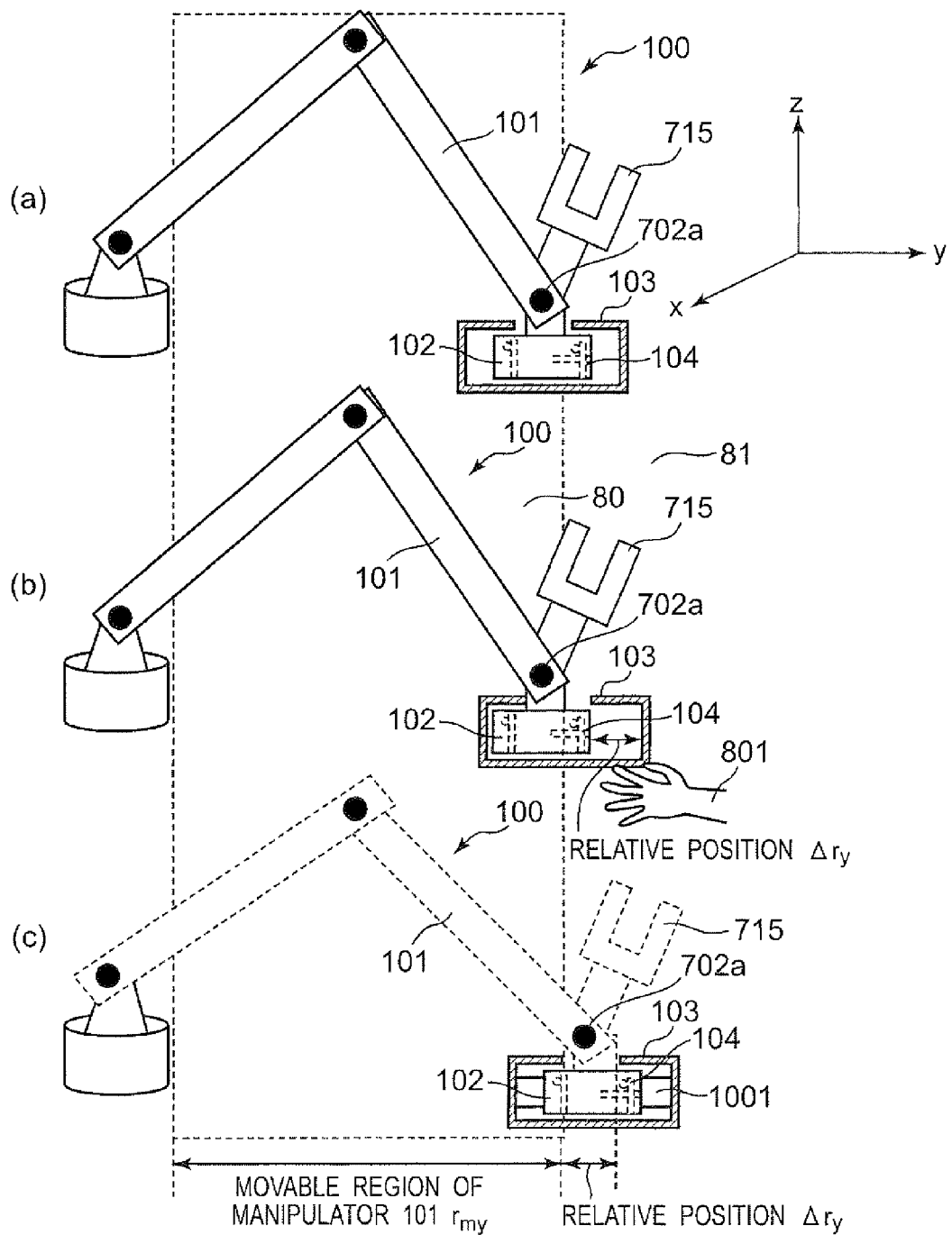

The views (a)-(c) of FIG. 18 show the manipulator 101 and a movable range of the manipulator 101 in the y axis direction (see FIG. 7). The region surrounded by a dotted line corresponds to a movable region 80 of the manipulator 101. The movable region 80 means a region where the manipulator 101 is operable.

Firstly, the view (a) of FIG. 18 shows the state where a distal end 702a of the manipulator 101 is located at an end of the movable region 80. In this state, the manipulator 101 cannot be shifted further toward a region 81 on the right side of the movable region 80.

The view (b) of FIG. 18 shows the state where the teaching motion is performed in the "not fixing" state. In this state, the manipulator 101 is located at the end of the movable region 80, and cannot be shifted further to the region 81 on the right side. Because the grip portion 103 is not fixed relatively to the end effector 102, as shown in FIG. 18 (b), the grip portion 103 can move to the right beyond the movable region 80. When the length of the movable region 80 in the y axis direction is expressed as $r_{my}$ and the relative position of the grip portion 103 with respect to the end effector 102 is expressed as $\Delta r_y$, grip portion positional information r taught in this case is expressed as $r = r_{my} + \Delta r_y$. In the state shown in FIG. 18 (b), the information r on the position of the above-described grip portion is stored in the internal storage unit of the desired trajectory generation unit 1203 as taught information.

The view (c) of FIG. 18 shows the state where the positions taught in the state of FIG. 18 (b) are played back in the "fixing" state. In the "fixing" state, the grip portion can be shifted only within the movable region 80 of the manipulator 101, and the manipulator 101 cannot be shifted to the right beyond the length $r_{my}$ of the movable region 80 in the y axis direction. Because the manipulator 101 cannot be shifted beyond the length $r_{my}$ of the movable region 80, it is impossible to play back the motion taught in the state shown in FIG. 18 (b).

As described with reference to (a)-(c) of FIG. 18, the movable region 80 during the teaching motion is different from the movable region 80 during the playback motion. Accordingly, in the third embodiment, the movable region 80 is limited during the teaching motion. Described below is how to limit the movable region 80.

Figure 19:
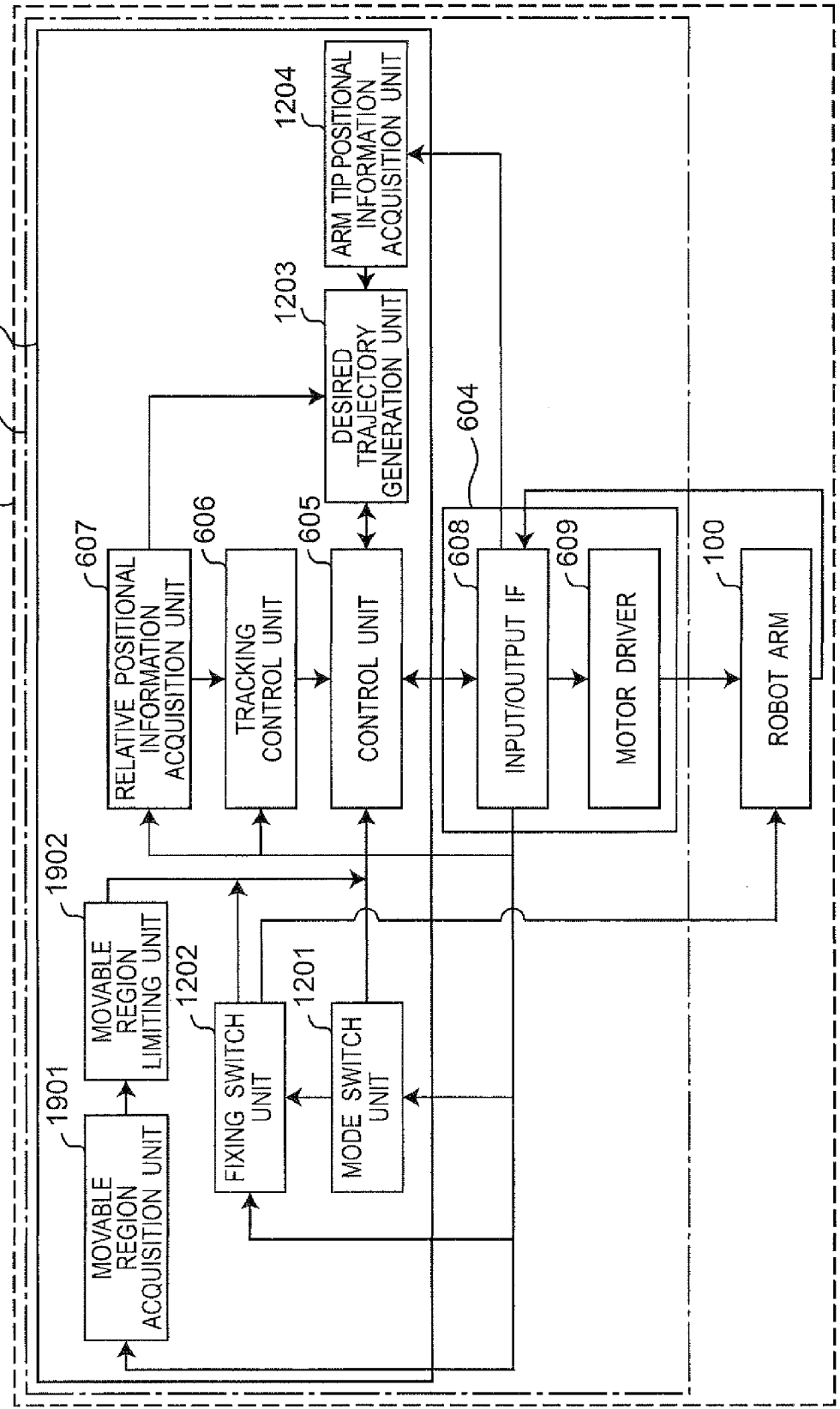
FIG. 19 is a block diagram of the robot arm in the robot according to the third embodiment of the present invention.

FIG. 19 is a block diagram of a robot arm 100 in a robot 601 according to the third embodiment of the present invention. In the robot according to the third embodiment of the present invention, the manipulator 101, the tracking control unit 606, the relative positional information acquisition unit 607, the motor driver 609, the mode switch unit 1201, the fixing switch unit 1202, the desired trajectory generation unit 1203, and the arm tip positional information acquisition unit 1204 are configured similarly to those of the second embodiment, respectively. Therefore, these portions in common are denoted by the same reference signs and will not be described repeatedly, and only the portions not in common (such as a movable region acquisition unit 1901 and a movable region limiting unit 1902) are to be described in detail below.

The movable region acquisition unit 1901 is provided in the control apparatus main body 603. The movable region acquisition unit 1901 acquires, by way of the input/output IF 608, a range $r_m$ of the movable region 80 of the manipulator 101 and transmits the range $r_m$ of the movable region 80 thus received to the movable region limiting unit 1902. The range $r_m$ of the movable region 80 of the manipulator 101 is expressed by Equation (5) shown below. In Equation (5), the length in the x axis direction of the movable region 80 is expressed as $r_{mx}$, the length in the y axis direction of the movable region 80 is expressed as $r_{my}$, the length in the z axis direction of the movable region 80 is expressed as $r_{maz}$, the length in the α direction of the movable region 80 is expressed as $r_{m\alpha}$, the length in the β direction of the movable region 80 is expressed as $r_{m\beta}$, and the length in the γ direction of the movable region 80 is expressed as $r_{m\gamma}$.

[Expression 5]

$$r_m = \begin{bmatrix} r_{mx} \\ r_{my} \\ r_{mz} \\ r_{m\alpha} \\ r_{m\beta} \\ r_{m\gamma} \end{bmatrix} \quad \text{Equation (5)}$$

Upon inputting the range $r_m$ of the movable region 80, the person inputs to the movable region acquisition unit 1901 by way of the input/output IF 608, with use of the input device 608d such as a keyboard, a mouse, or a touch panel, information on the range $r_m$ of the movable region 80, which is provided by a manufacturer of the manipulator 101.

The movable region limiting unit 1902 obtains a range $r_1$ of a limited region 82 that is smaller than the range $r_m$ of the movable region 80, based on the range $r_m$ of the movable region 80 acquired from the movable region acquisition unit 1901, and provides limitation during the teaching motion so as to shift the manipulator 101 only within the range $r_1$ of the limited region 82 thus obtained. The movable region limiting unit 1902 transmits to the control unit 605 the obtained range $r_1$ of the limited region 82.

Figure 20:
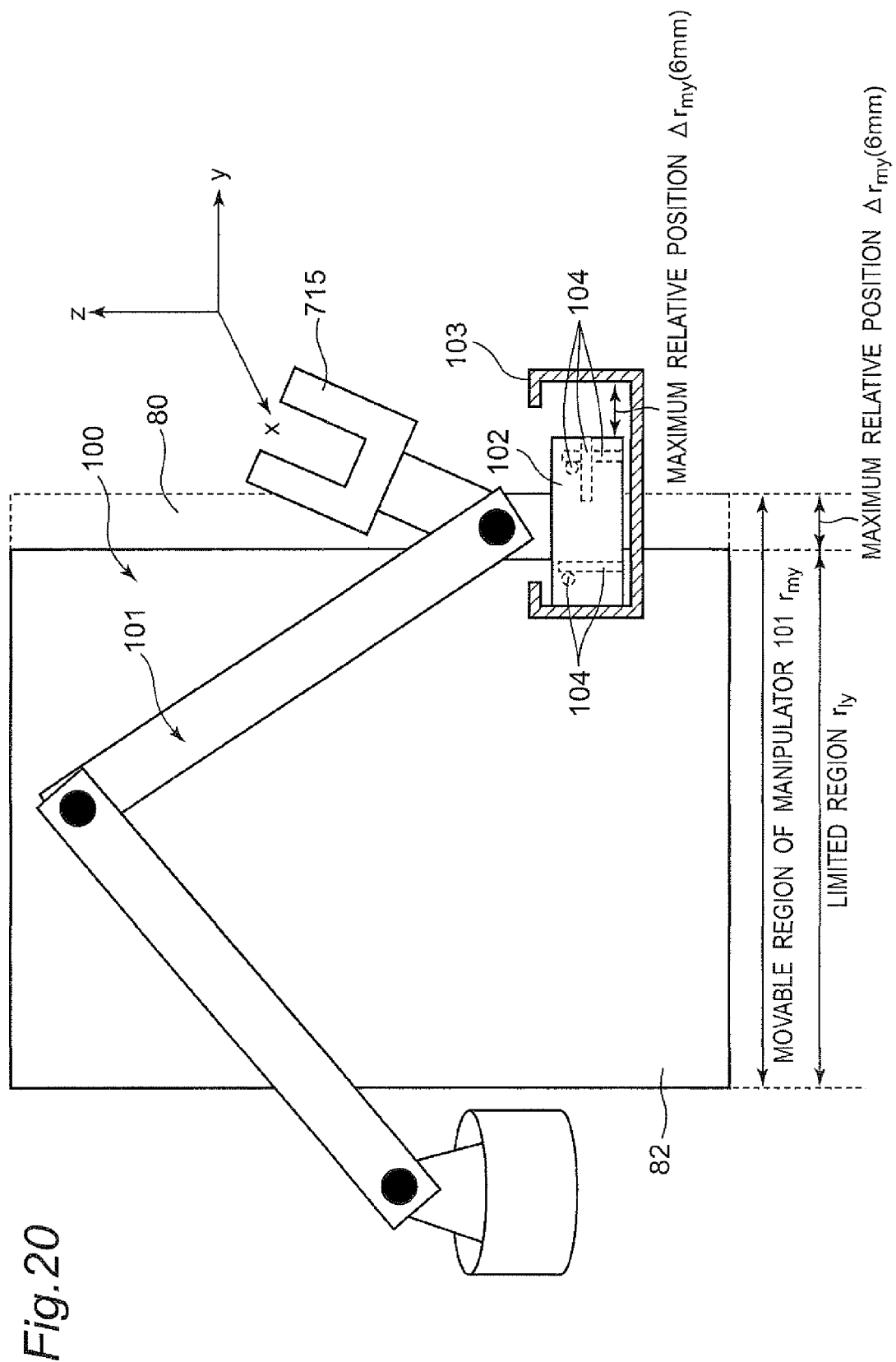
FIG. 20 is an explanatory view on obtaining a limited region of the robot arm in the robot according to the third embodiment of the present invention.

Described below with reference to FIG. 20 is how to obtain the range $r_1$ of the limited region 82. From the length $r_{my}$ of the movable region 80 in the y axis direction of the manipulator 101 and a maximum relative position $\Delta r_{my}$ in the y axis direction of the grip portion 103 with respect to the end effector 102 (for example, in the earlier specific example of the configuration shown in FIGS. 2A to 2C, the sum of the two gaps 90 in the y axis direction: 3 mm+3 mm=6 mm), the movable region limiting unit 1902 obtains a limited region $r_{1y}$ in the y axis direction by the equation $r_{1y} = r_{my} - \Delta r_{my}$.

The control unit 605 has a function, in addition to the functions according to the second embodiment, of limiting the movable range of the manipulator 101 to a limited region $r_1$ in the "teaching mode" in accordance with the limited region $r_1$ acquired from the movable region limiting unit 1902. When the control unit 605 determines that a shift amount y exceeding the limited region $r_1$ is received from the tracking control unit 606, the control unit 605 controls the manipulator 101 so as to stop shifting beyond the limited region $r_1$. The control unit 605 performs determination by obtaining a position coordinate of the distal end of the manipulator 101 after being shifted, from the current position coordinate thereof and the shift amount y, and comparing the position coordinate after being shifted and the position coordinates inside the limited region $r_1$.

The input/output IF 608 has a function, in addition to the functions according to the second embodiment, of receiving the range $r_m$ of the movable region 80, and transmits the received range $r_m$ of the movable region 80 to the movable region acquisition unit 1901.

Figure 21:
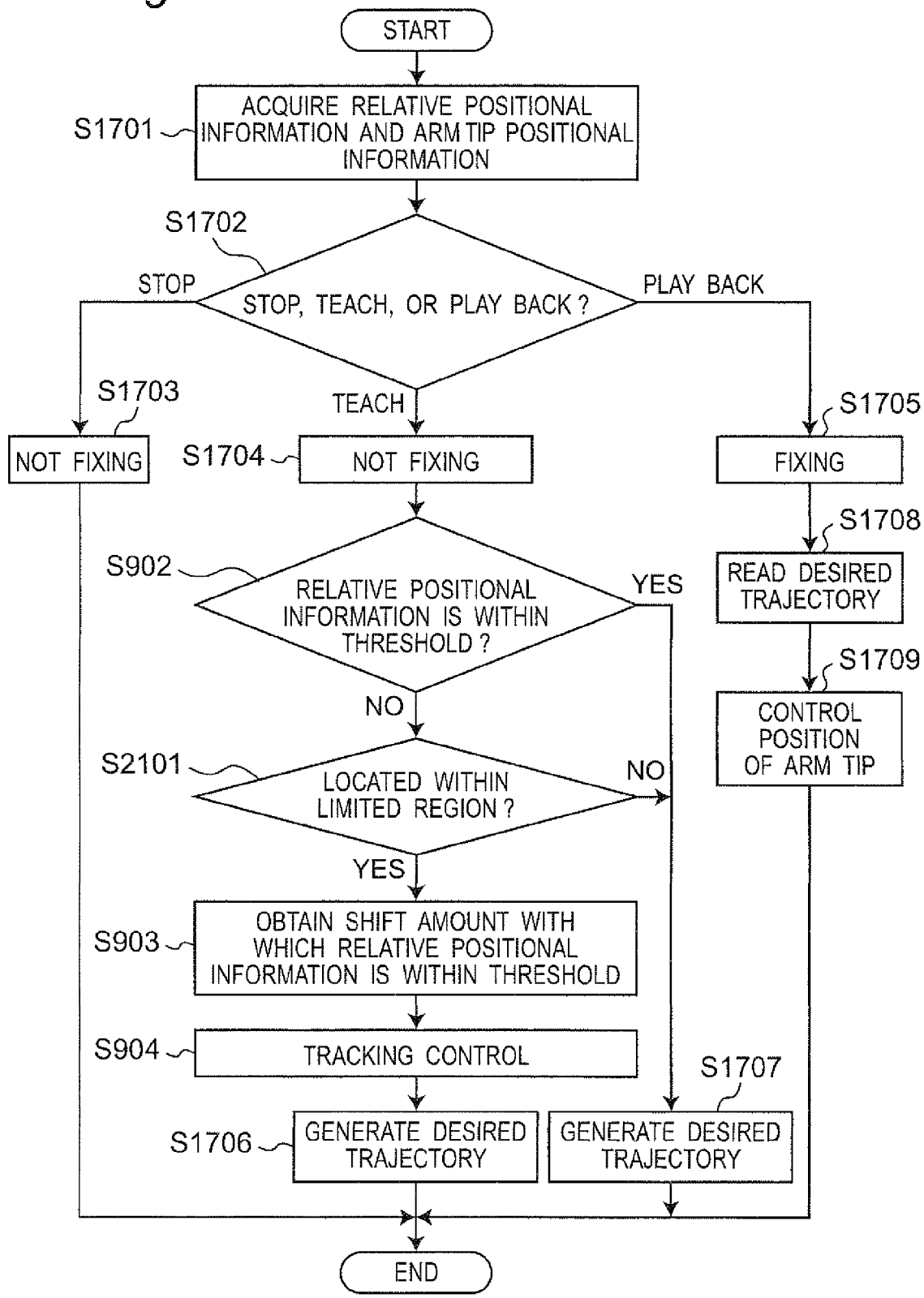
FIG. 21 is a flowchart showing a flow of process steps from acquiring relative positional information and arm tip positional information to performing tracking control and arm tip positional control in the robot according to the third embodiment of the present invention.

Described below with reference to the flowchart shown in FIG. 21 is the operation process of the control apparatus 602 having the above configuration, for the robot arm in the robot according to the third embodiment.

In step S1701, the relative positional information acquisition unit 607 acquires, by way of the input/output IF 608, relative positional information on the grip portion 103 with respect to the end effector 102. Furthermore, the arm tip positional information acquisition unit 1204 acquires arm tip positional information on the manipulator 101 by way of the input/output IF 608.

Then in step 21702, the mode switch unit 1201 switches the control mode of the manipulator 101 among the "stopped mode", the "teaching mode", and the "playback mode" in accordance with a signal received from the input/output IF 608. In the switching motion of the control mode by the mode switch unit 1201 by means of the operation of the changeover switch 608a of the input/output IF 608, the process proceeds to step S1703 if the "stopped mode" is selected. The process proceeds to step S1704 if the "teaching mode" is selected. The process proceeds to step S1705 if the "playback mode" is selected.

In step S1703, the fixing switch unit 1202 drives and controls the fixing portions 1001 in accordance with the fixing switch information received from the mode switch unit 1201 so that the fixing portions 1001 are located at the accommodated positions and the end effector 102 and the grip portion 103 are mechanically separated from each other (the "not fixing" state), and this flow is ended.

In step S1704, the fixing switch unit 1202 drives and controls the fixing portions 1001 in accordance with the fixing switch information received from the mode switch unit 1201 so that the fixing portions 1001 are located at the accommodated positions and the end effector 102 and the grip portion 103 are mechanically separated from each other (the "not fixing" state), and the process proceeds to step S902.

Then in step S902, the tracking control unit 606 determines whether or not the relative positional information acquired from the relative positional information acquisition unit 607 is within the range of the predetermined threshold. If the tracking control unit 606 determines that the relative positional information is within the range of the threshold, the process proceeds to step S1707. If the tracking control unit 606 determines that the relative positional information is not within the range of the threshold, the process proceeds to step S2101.

In step S2101, the movable region limiting unit 1902 determines whether or not the manipulator 101 is located within the limited region $r_1$. If the movable region limiting unit 1902 determines that the manipulator 101 is located within the limited region $r_1$, the process proceeds to step S903. If the movable region limiting unit 1902 determines that the manipulator 101 is not located within the limited region $r_1$, the process proceeds to step S1707.

In step S903, the tracking control unit 606 obtains a shift amount with which the relative positional information exceeding the range of the threshold is modified to be within the range of the threshold, as described earlier. The shift amount obtained by the tracking control unit 606 is transmitted from the tracking control unit 606 to the control unit 605, and then the process proceeds to step S904.

Then in step S904, the control unit 605 performs tracking control on the manipulator 101 in accordance with the shift amount acquired from the tracking control unit 606, and then the process proceeds to step S1706.

Subsequently in step S1706, the desired trajectory generation unit 1203 obtains grip portion positional information r based on the relative positional information Δr acquired by the relative positional information acquisition unit 607 and the arm tip positional information $r_0$ acquired by the arm tip positional information acquisition unit 1204, and generates a desired trajectory. Information on the desired trajectory thus generated is stored in the internal storage unit of the desired trajectory generation unit 1203, and this flow is ended.

On the other hand, in step S1707, the desired trajectory generation unit 1203 obtains grip portion positional information r based on the relative positional information Δr acquired by the relative positional information acquisition unit 607 and the arm tip positional information $r_0$ acquired by the arm tip positional information acquisition unit 1204, and generates a desired trajectory. Information on the desired trajectory thus generated is stored in the internal storage unit of the desired trajectory generation unit 1203, and this flow is ended.

In step S1705, the fixing switch unit 1202 drives and controls the fixing portions 1001 in accordance with the fixing switch information received from the mode switch unit 1201 so that the fixing portions 1001 are located at the fixed positions and the end effector 102 and the grip portion 103 are fixed by the fixing portions 1001 (the "fixing" state), and the process proceeds to step S1708.

Then in step S1708, the control unit 605 reads the desired trajectory thus generated by the desired trajectory generation unit 1203, and the process proceeds to step S1709.

Subsequently in step S1709, the control unit 605 controls the manipulator 101 so that the position of the grip portion follows the desired trajectory read into the control unit 605, and this flow is ended.

According to the third embodiment, the movable region limiting unit 1902 provides limitation to the movable range of the manipulator 101 so that the movable region during the teaching motion are made the same as the movable region during the playback motion. As a result, it is possible to accurately play back the operation taught previously.

(Fourth Embodiment)

Figure 22:
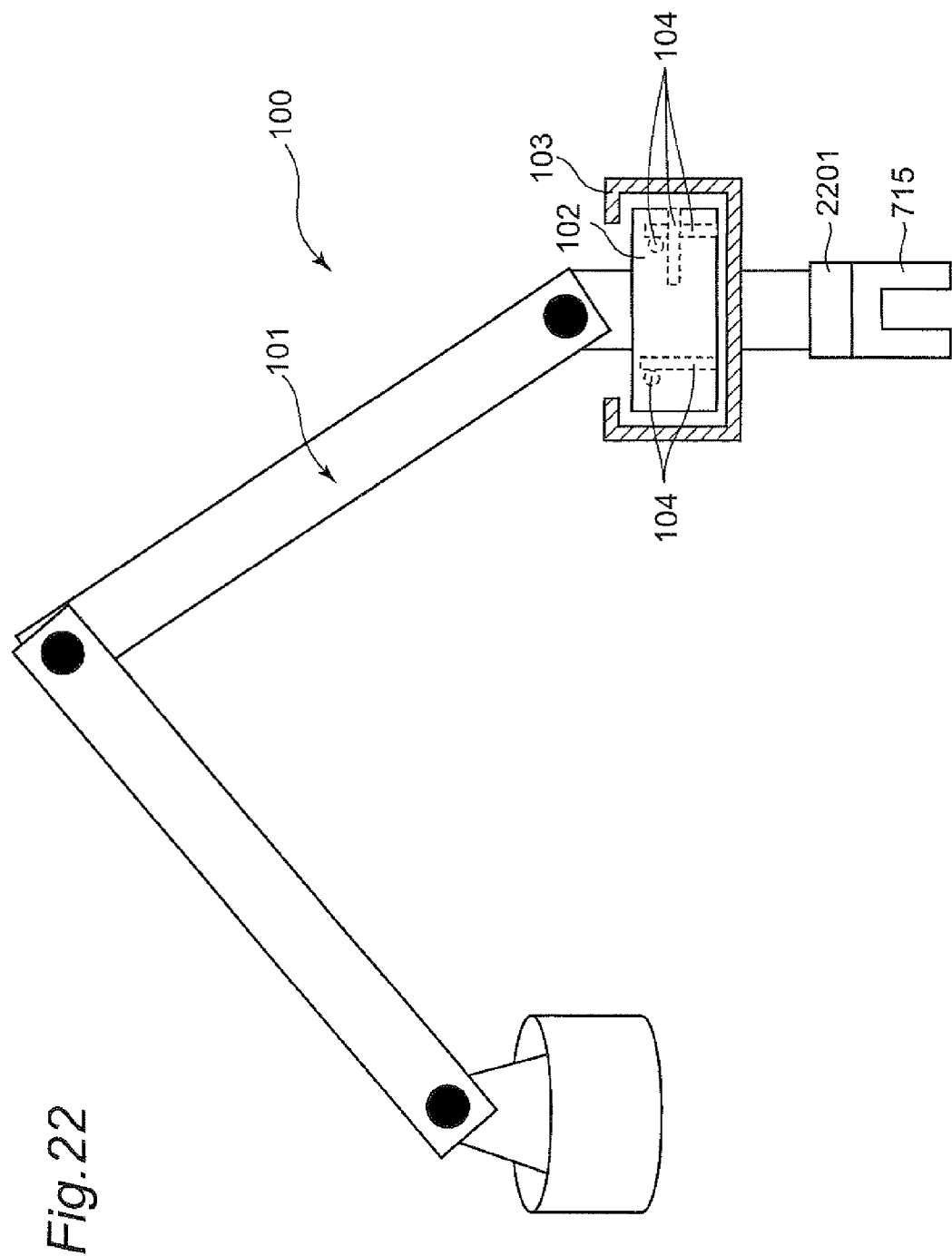
FIG. 22 is a configuration view showing an end effector, a grip portion, relative position sensors, a hand, and a force sensor in a robot according to a fourth embodiment of the present invention.

FIG. 22 is a configuration view showing a manipulator 101, an end effector 102, a grip portion 103, relative position sensors 104, a hand 715, and a force sensor 2201 in a robot according to a fourth embodiment of the present invention. In the robot according to the fourth embodiment of the present invention, the manipulator 101, the end effector 102, the grip portion 103, the relative position sensors 104, and the hand 715 are configured similarly to those of the second embodiment, respectively. Therefore, these portions in common are denoted by the same reference signs and will not be described repeatedly, and only the portions not in common (such as a force sensor 2201 and a force information acquisition unit 2301) are to be described in the present embodiment.

The force sensor 2201 is provided between the grip portion 103 and the hand 715, and detects the magnitude of force applied to the hand 715. A measurement value g of the magnitude of the detected force is transmitted to the input/output IF 608. The magnitude of the force detected by the force sensor 2201 indicates the magnitude of reactive force generated when the hand 715 or a target object (object to be gripped) 802 gripped by the hand 715 is in contact with a target article (operation target).

Figure 23:
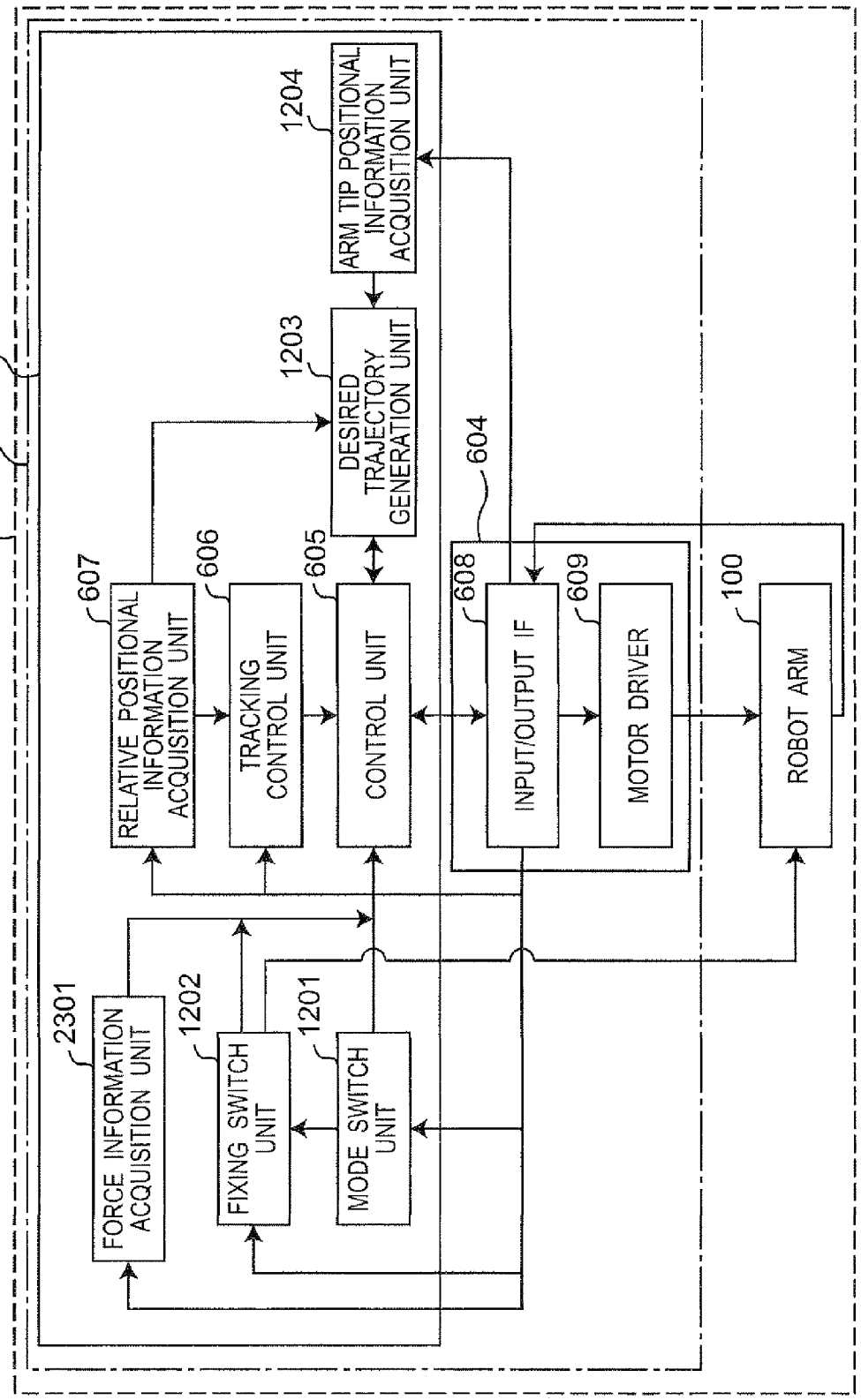
FIG. 23 is a block diagram of a robot arm in the robot according to the fourth embodiment of the present invention.

FIG. 23 is a block diagram of the robot arm 100 in the robot 601 according to the fourth embodiment of the present invention. In the robot according to the fourth embodiment of the present invention, the manipulator 101, the tracking control unit 606, the relative positional information acquisition unit 607, the motor driver 609, the mode switch unit 1201, the fixing switch unit 1202, the desired trajectory generation unit 1203, and the arm tip positional information acquisition unit 1204 are configured similarly to those of the second embodiment, respectively. Therefore, these portions in common are denoted by the same reference signs and will not be described repeatedly, and only the portions not in common (such as a force sensor 2201 and a force information acquisition unit 2301) are to be described in detail below.

The force information acquisition unit 2301 receives the measurement value of the force sensor 2201 from the input/output IF 608 and time information from a timer incorporated in the input/output IF 608. The received measurement value of the force sensor 2201 is transmitted to the control unit 605 as force information.

The control unit 605 has a function, in addition to the functions according to the third embodiment, of acquiring the force information from the force information acquisition unit 2301, generates a sensor feedback rule on the basis of the force information thus acquired, and performs sensor feedback in the "playback mode" (sensor feedback is to be detailed later). A coefficient used for generating a sensor feedback rule is determined by a value acquired from the input/output IF 608 (the coefficient is to be detailed later).

The input/output IF 608 has a function, in addition to the functions according to the third embodiment, of acquiring a measurement value from the force sensor 2201, and transmits, to the force information acquisition unit 2301, the acquired measurement value of the force sensor 2201 and the time information received from the timer incorporated in the input/output IF 608. The person can input to the input/output IF 608 with use of the input device 608d such as a keyboard, a mouse, or a touch panel, the coefficient used for generating the sensor feedback rule. The input/output IF 608 transmits the value thus received to the control unit 605.

FIGS. 24A to 24G show the process performed by a person who grips the robot arm 100 and teaches a desired task such as a task of inserting, into a connector 2402 as one example of the operation target, a flexible board 2401 as one example of the object to be gripped, in a state where the mode switch unit 1201 switches into the "teaching mode", the fixing switch unit 1202 drives and controls the fixing portions 1001 in accordance with fixing switch information received from the mode switch unit 1201 so that the fixing portions 1001 are located at the accommodated positions and the end effector 102 and the grip portion 103 are mechanically separated from each other (the "not fixing" state). Is used as the flexible board 2401 as a specific example, a flexible board that is 5.5 mm wide and 0.3 mm thick, and has ten contact pins for the connector 2402. Furthermore, the connector 2402 is adaptable to the flexible board 2401. More specifically, the connector 2402 has an insert port of 5.57 mm wide and 0.35 mm thick. The grip portion is sized, for example, to be 65 mm wide in the x axis direction, 65 mm wide in the y axis direction, and mm wide in the z axis direction in FIG. 2A. The flexible board used in this example is very thin and highly flexible. Accordingly, in many cases, the flexible board may not be successfully inserted into the connector 2402 due to folded pins or the like if the teaching motion is performed with use of a robot according to the conventional art. This task is quite complicated and difficult to achieve.

Described below is the process performed by the person teaching the robot arm 100 in the order of FIGS. 24A, 24C, 24E, and 24G. The states of the flexible board 2401 and the connector 2402 in the respective steps are illustrated in the order of FIGS. 24B, 24D, 24F, and 24H.

Figure 24A:
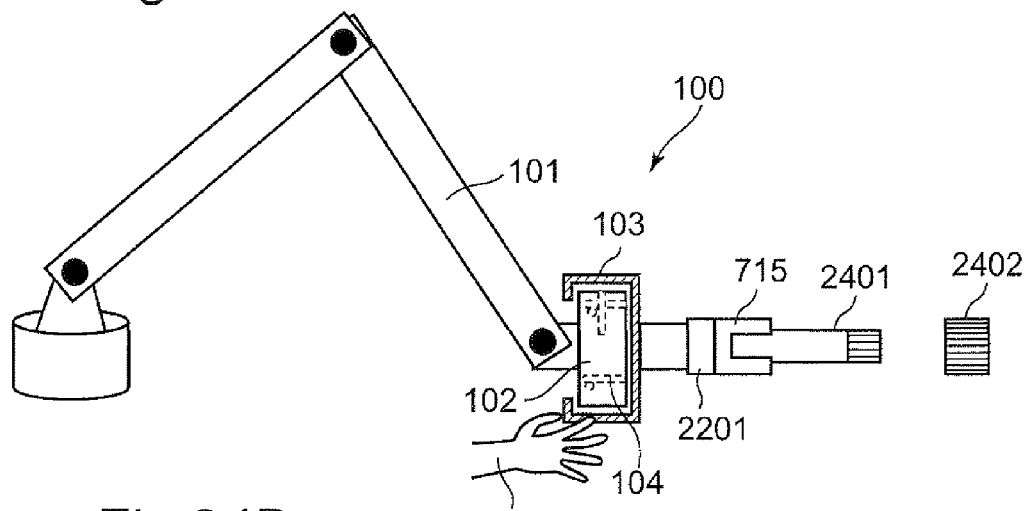
FIG. 24A is an explanatory view on a motion of teaching a task of inserting a flexible board with the robot arm in the robot according to the fourth embodiment of the present invention.
Figure 24B:
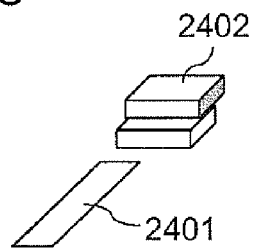
FIG. 24B is an explanatory view on the motion of teaching the task of inserting the flexible board with the robot arm in the robot according to the fourth embodiment of the present invention.
Figure 24C:
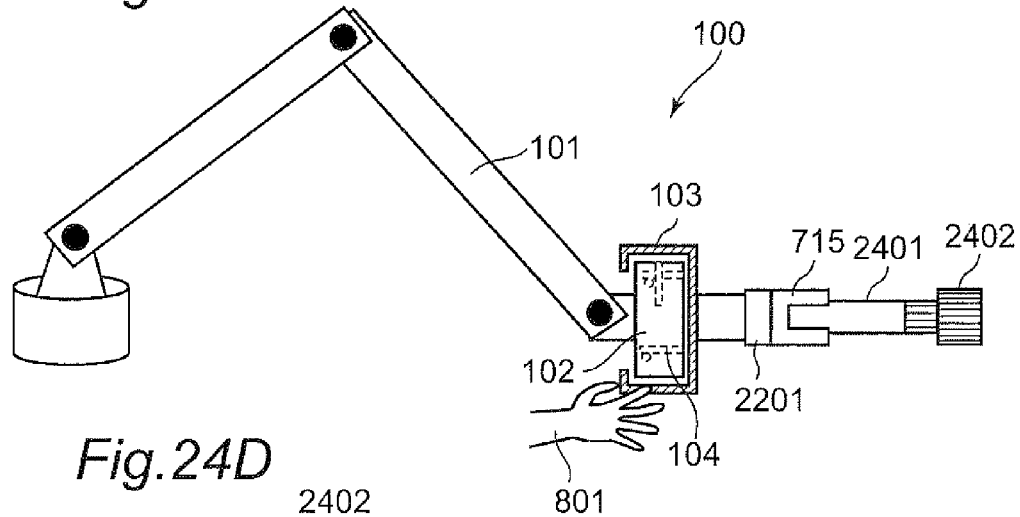
FIG. 24C is an explanatory view on the motion of teaching the task of inserting the flexible board with the robot arm in the robot according to the fourth embodiment of the present invention.
Figure 24D:
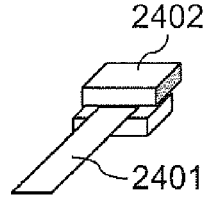
FIG. 24D is an explanatory view on the motion of teaching the task of inserting the flexible board with the robot arm in the robot according to the fourth embodiment of the present invention.
Figure 24E:
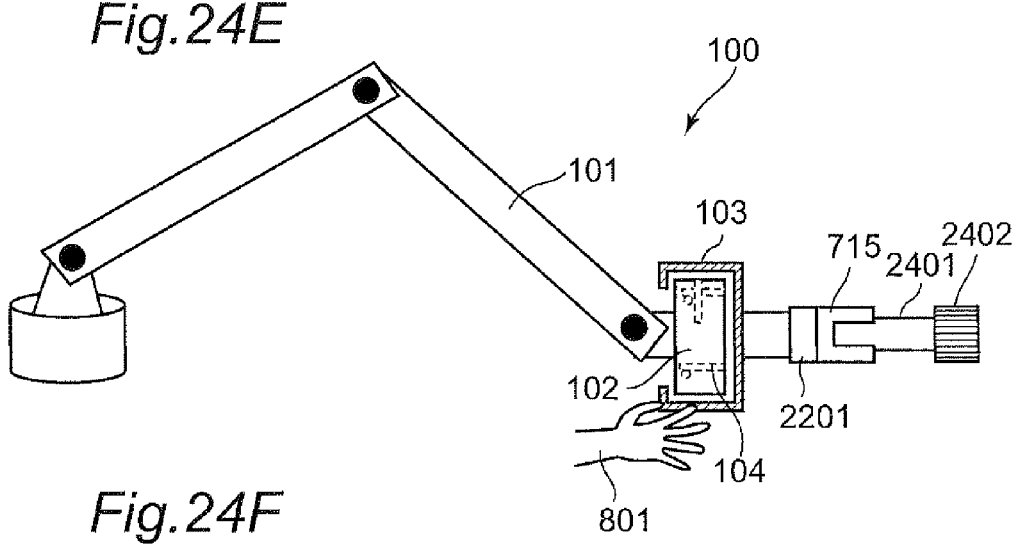
FIG. 24E is an explanatory view on the motion of teaching the task of inserting the flexible board with the robot arm in the robot according to the fourth embodiment of the present invention.
Figure 24F:
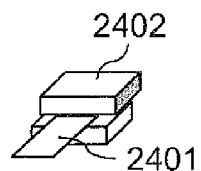
FIG. 24F is an explanatory view on the motion of teaching the task of inserting the flexible board with the robot arm in the robot according to the fourth embodiment of the present invention.
Figure 24G:
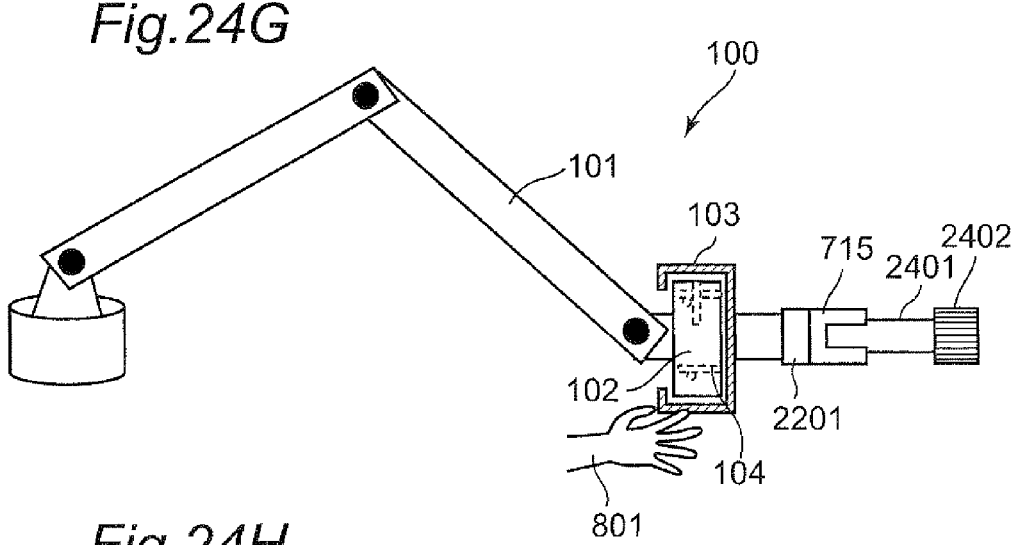
FIG. 24G is an explanatory view on the motion of teaching the task of inserting the flexible board with the robot arm in the robot according to the fourth embodiment of the present invention.
Figure 24H:
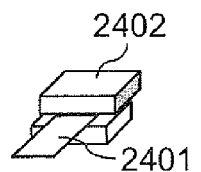
FIG. 24H is an explanatory view on the motion of teaching the task of inserting the flexible board with the robot arm in the robot according to the fourth embodiment of the present invention.
Figure 25:
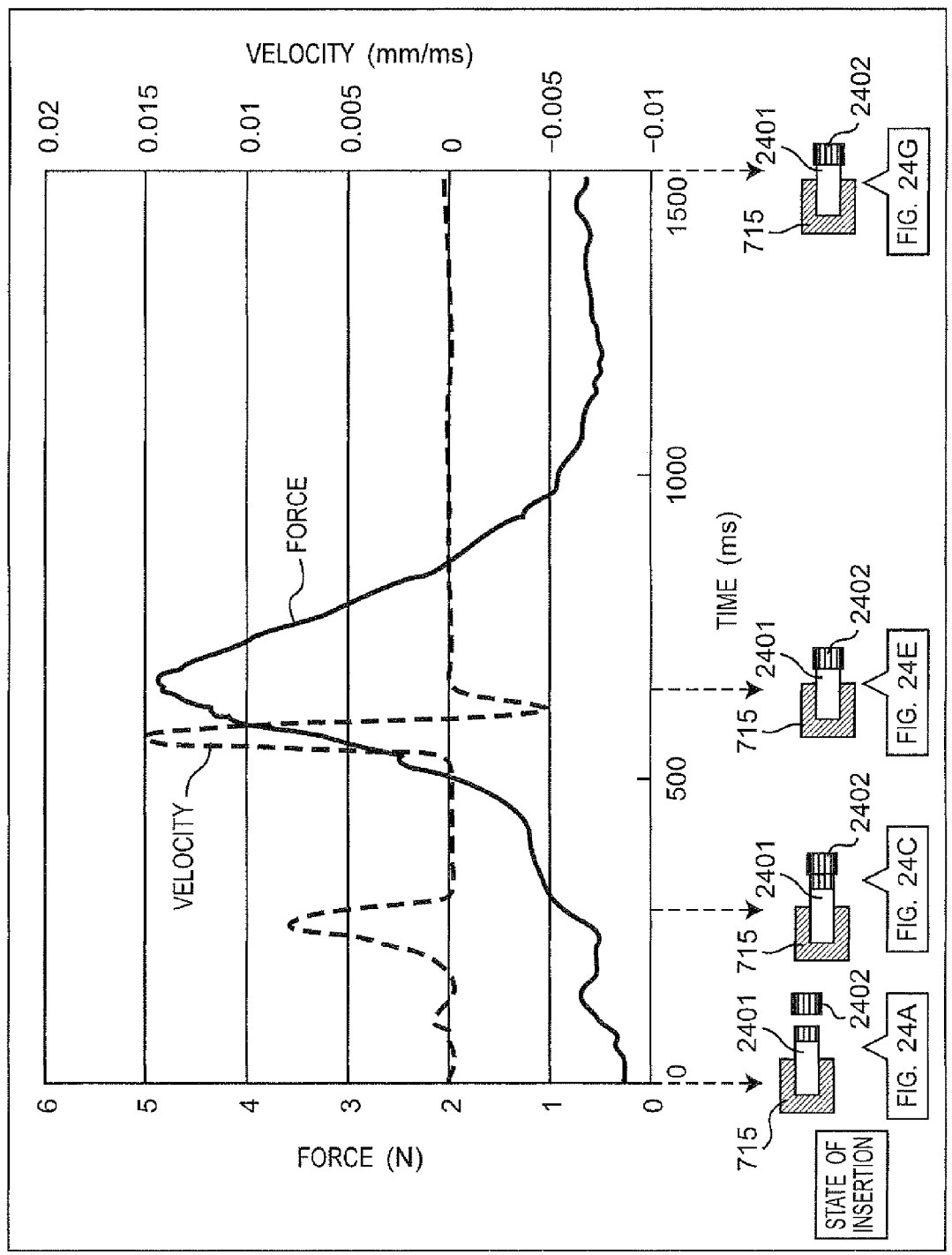
FIG. 25 is a view indicating force information and velocity information during the motion of teaching the task of inserting the flexible board with the robot arm in the robot according to the fourth embodiment of the present invention.

FIG. 25 indicates the value of the force sensor 2201 and velocity information at the position of the arm tip of the manipulator 101 during the teaching motion illustrated in FIGS. 24A to 24H. The control unit 605 acquires the velocity information by differentiating the arm tip positional information acquired by the arm tip positional information acquisition unit 1204. The velocity information acquired by the control unit 605 is used as original data in a case where the control unit 605 obtains a sensor feedback rule. The solid line in the graph of FIG. 25 indicates the values detected by the force sensor 2201, and the dashed line indicates the velocities at the positions of the arm tip of the manipulator 101. The transverse axis in FIG. 25 indicates the test period (ms), and by setting the start time of the test at 0 ms, indicates the period from the start time to the end time of the test. The left ordinate axis in FIG. 25 indicates the values (N) detected by the force sensor 2201. The right ordinate axis in FIG. 25 indicates the velocities (mm/ms) at the arm tip of the manipulator 101. The illustrations below the graph in FIG. 25 show the states of the flexible board 2401 to be inserted into the connector 2402, in other words, the relationships between the flexible board 2401 and the connector 2402 at respective time points in the test period indicated by the transverse axis of the graph.

FIG. 24A shows the state where the person's hand 801 grips the grip portion 103 and the person starts teaching the robot. In this state, the flexible board 2401 and the connector 2402 do not yet come into contact with each other. Accordingly, reactive force to be generated upon contact between the flexible board 2401 and the connector 2402 is not applied to the person's hand 801. Moreover, the value of the force sensor 2201 is slightly varied in a range less than 1 N, and thus such variation can be regarded as being within the range of errors (see FIG. 25).

Also in the state shown in FIG. 24B, the flexible board 2401 does not yet come into contact with the connector 2402. In this state, the person presses the start button 608b of the input/output IF 608.

FIG. 24C shows the state where the flexible board 2401 is in contact with the port of the connector 2402. In this state, the reactive force generated upon the contact therebetween is applied to the person's hand 801, and the value of the force sensor 2201 is varied in the range exceeding 1 N (see FIG. 25). In this state, the person's hand 801 starts to feel the reactive force generated when the flexible board 2401 is in contact with the connector 2402. The person changes force applied to the flexible board 2401 or the direction of inserting the flexible board 2401 to insert the flexible board 2401 into the connector 2402, while estimating the degree of warp or the position of the flexible board 2401 on the basis of the magnitude of the reactive force felt with the hand 801. The force sensor 2201 detects the magnitude of the reactive force during this inserting operation.

FIG. 24E shows the state where the distal end of the flexible board 2401 is in contact with the inner bottom of the connector 2402 and the insertion task is completed. In this state, applied to the person's hand 801 is the reactive force generated when the distal end of the flexible board 2401 is in contact with the inner bottom of the connector 2402 (see FIG. 25). The person checks the completion of the operation of inserting the flexible board 2401 into the connector 2402 by feeling the reactive force at this time with the person's hand 801.

FIG. 24G shows the state where the person presses the finish button 608c of the input/output IF 608 and ends the teaching operation. In the state shown in FIG. 24E, the teaching motion is ended such that the connector 2402 is not pressed against the flexible board 2401 from the time point when the person's hand 801 feels the reactive force at the completion of the inserting task to the time point at the end of the teaching motion.

As described above, the task of inserting the flexible board 2401 into the connector 2402 is taught to the robot.

During the teaching motion, the force sensor 2201 acquires the magnitude of the reactive force felt by the person's hand 801. Accordingly, sensor feedback (to be detailed later) can be performed with use of the value of the force sensor 2201 upon analysis of the force information on the taught data or upon the playback motion.

Described next is the motion of playing back the task of inserting the flexible board 2401 into the connector 2402 as taught in the process shown in FIGS. 24A to 24H, in a state where the mode switch unit 1201 switches into the "playback mode", the fixing switch unit 1202 drives and controls the fixing portions 1001 in accordance with fixing switch information received from the mode switch unit 1201 so that the fixing portions 1001 are located at the accommodated positions and the end effector 102 and the grip portion 103 are mechanically separated from each other (the "not fixing" state). FIGS. 26A to 26G show the process of the task played back by the robot arm 100. These figures show the process of the playback motion performed by the robot arm 100 in the order of FIGS. 26A, 26C, 26E, and 26G. The states of the flexible board 2401 and the connector 2402 in the respective steps are illustrated in the order of FIGS. 26B, 26D, 26F, and 26H.

Figure 26A:
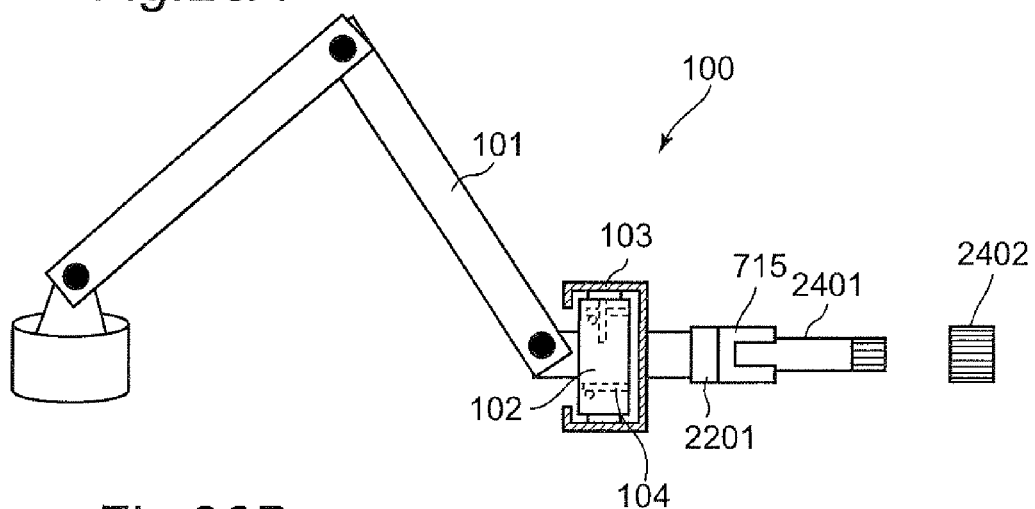
FIG. 26A is an explanatory view on a motion of playing back the task of inserting the flexible board with the robot arm in the robot according to the fourth embodiment of the present invention.

FIG. 26A shows the state where the hand 715 of the robot arm 100 grips the flexible board 2401 and the control unit 605 starts the playback motion. In this state, the flexible board 2401 and the connector 2402 do not yet come into contact with each other.

Figure 26B:
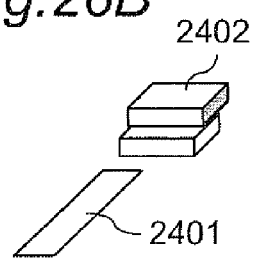
FIG. 26B is an explanatory view on the motion of playing back the task of inserting the flexible board with the robot arm in the robot according to the fourth embodiment of the present invention.

In the state shown in FIG. 26B, the flexible board 2401, which is gripped by the hand 715 of the robot arm 100, does not yet come into contact with the connector 2402.

Figure 26C:
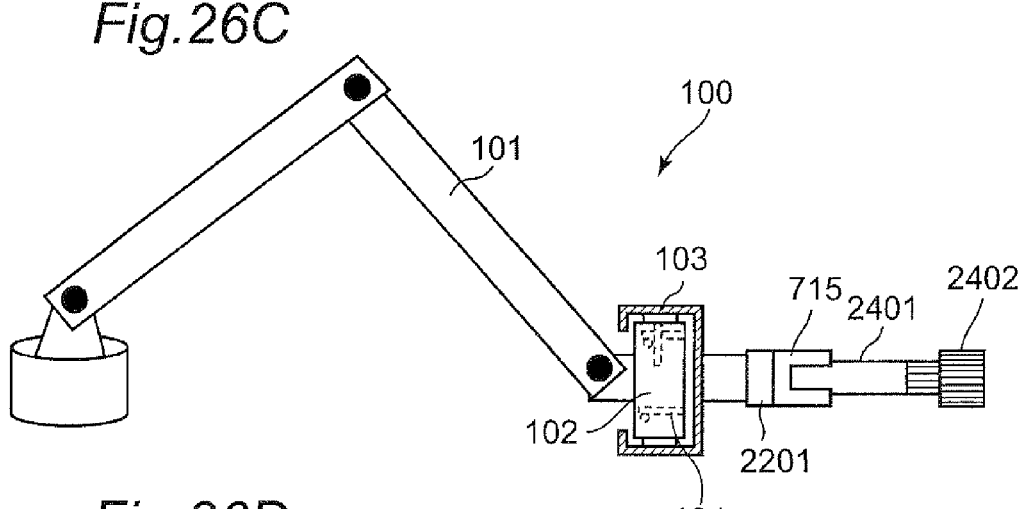
FIG. 26C is an explanatory view on the motion of playing back the task of inserting the flexible board with the robot arm in the robot according to the fourth embodiment of the present invention.
Figure 26D:
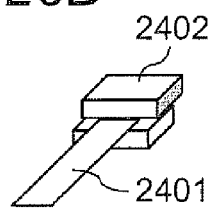
FIG. 26D is an explanatory view on the motion of playing back the task of inserting the flexible board with the robot arm in the robot according to the fourth embodiment of the present invention.

FIG. 26C shows the state where the flexible board 2401 gripped by the hand 715 comes into contact with the port of the connector 2402. From this time point, the robot arm changes force applied to the flexible board 2401 or the direction of inserting the flexible board 2401 to insert the flexible board 2401 into the connector 2402, while controlling the degree of warp or the position of the flexible board 2401 in accordance with the motion previously taught.

Figure 26E:
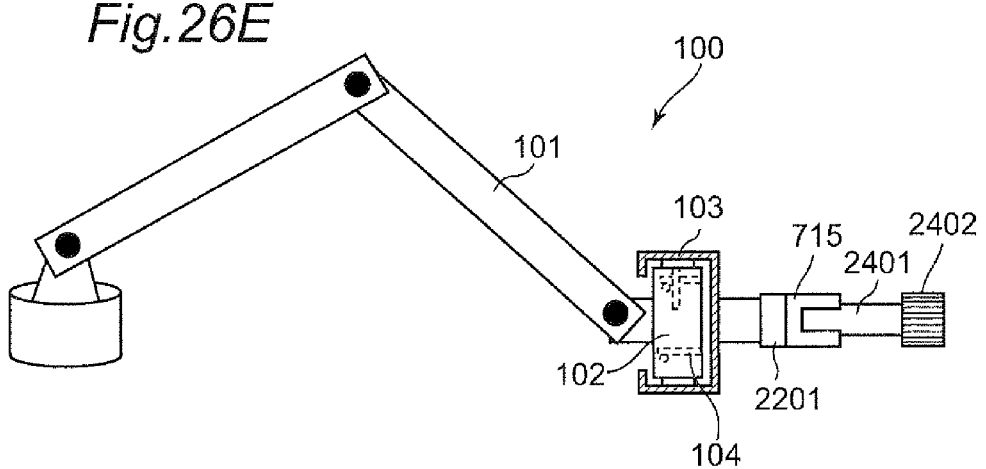
FIG. 26E is an explanatory view on the motion of playing back the task of inserting the flexible board with the robot arm in the robot according to the fourth embodiment of the present invention.
Figure 26F:
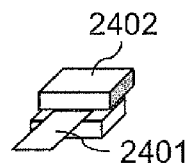
FIG. 26F is an explanatory view on the motion of playing back the task of inserting the flexible board with the robot arm in the robot according to the fourth embodiment of the present invention.

FIG. 26E shows the state where the distal end of the flexible board 2401 gripped by the hand 715 is in contact with the inner bottom of the connector 2402 and the insertion task is completed.

Figure 26G:
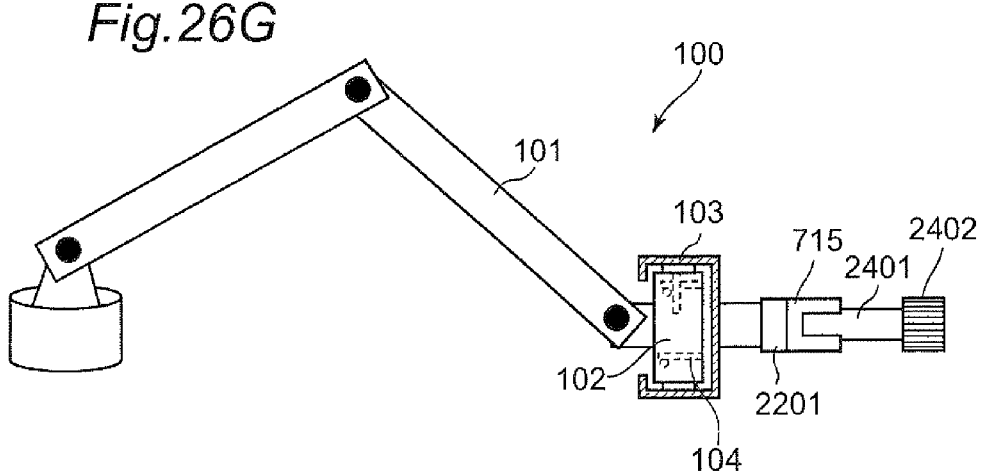
FIG. 26G is an explanatory view on the motion of playing back the task of inserting the flexible board with the robot arm in the robot according to the fourth embodiment of the present invention.
Figure 26H:
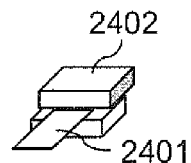
FIG. 26H is an explanatory view on the motion of playing back the task of inserting the flexible board with the robot arm in the robot according to the fourth embodiment of the present invention.

FIG. 26G shows the state where the playback motion is ended.

As shown in FIGS. 26A to 26H, it is recognized that the task is played back as taught in the process shown in FIGS. 24A to 24H.

Described next is sensor feedback with reference to FIGS. 27 and 28.

Figure 27:
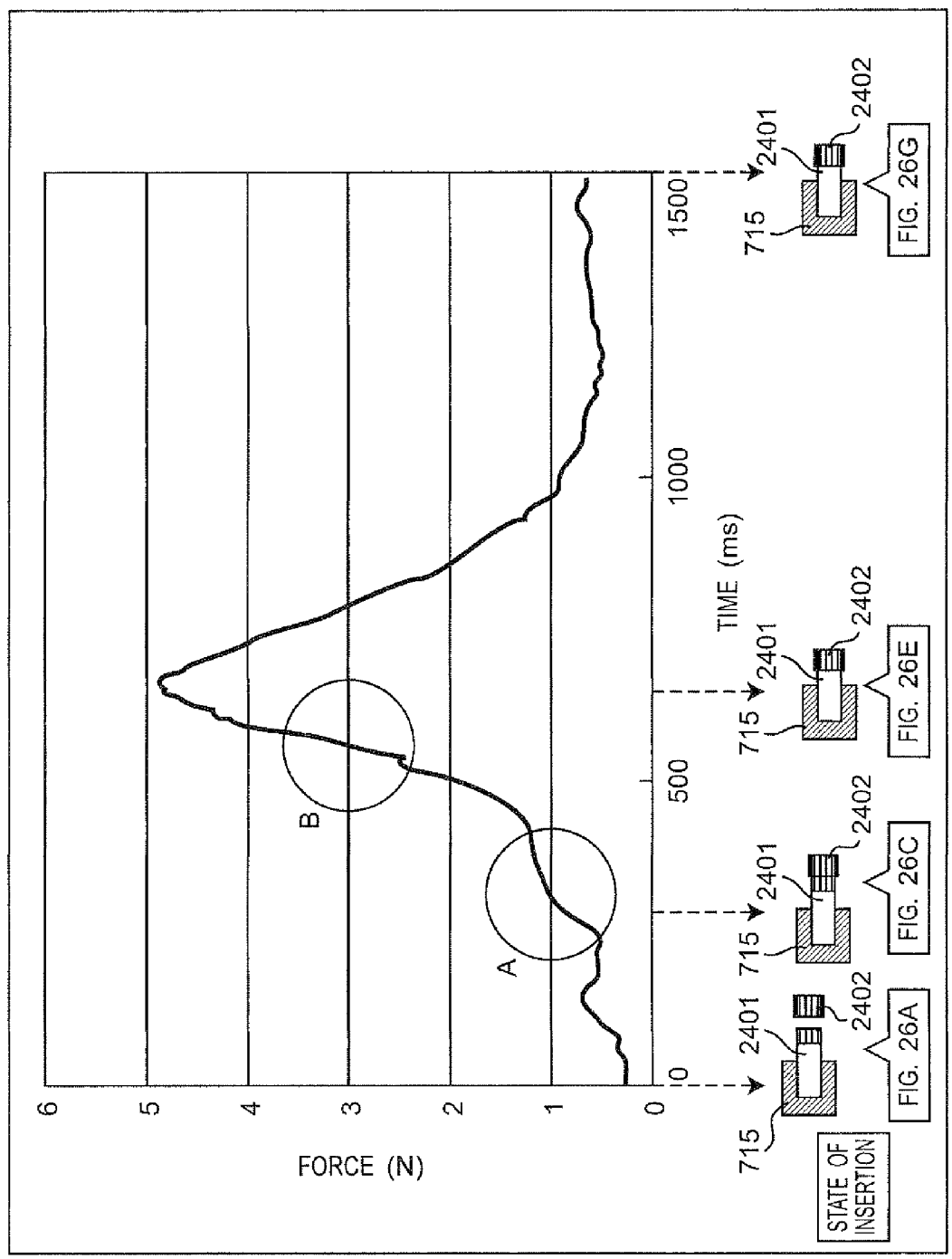
FIG. 27 is a view indicating force information during the motion of playing back the task of inserting the flexible board with the robot arm in the robot according to the fourth embodiment of the present invention.

FIG. 27 indicates the values of the force sensor 2201 during the playback motion shown in FIGS. 26A to 26H. In the graph of FIG. 27, the solid line indicates the values detected by the force sensor 2201. The transverse axis in FIG. 27 indicates the test times (ms), and by setting the start time of the test at 0 ms, indicates the period from the start time to the end time of the test. The ordinate axis in FIG. 27 indicates the values (N) detected by the force sensor 2201. The illustrations below the graph in FIG. 27 show the states of the flexible board 2401 to be inserted into the connector 2402, in other words, the relationships between the flexible board 2401 and the connector 2402 at respective time points in the test period indicated by the transverse axis of the graph.

FIG. 28 indicates which sensor feedback rule varies the velocity at the position of the arm tip of the manipulator 101. In FIG. 28, at the time point when the magnitude of the force information received from the force information acquisition unit 2301 exceeds 1.0 N, the control unit 605 varies the velocity at the position of the arm tip of the manipulator 101 to 0.008 mm/ms. The velocity can be varied by setting the shift amount per a constant period of time (every 1 ms, for example) to 0.008 mm. Similarly, at the time point when the magnitude of the force information received from the force information acquisition unit 2301 exceeds 3.0 N, the control unit 605 varies the velocity at the position of the arm tip of the manipulator 101 to 0.015 mm/ms. At the other time points, the control unit 605 plays back the trajectory acquired during the teaching motion. The magnitude of the force and the value of the velocity mentioned in FIG. 28 are determined by the person with reference to the values during the teaching motion (FIG. 25), and are inputted with use of the input device 608d by way of the input/output IF 608.

Sensor feedback is performed by the control unit 605 that varies the velocity at the position of the arm tip of the manipulator 101 during the playback motion in accordance with the force information received from the force information acquisition unit 2301. More specifically, the control unit 605 sequentially plays back the trajectory acquired during the teaching motion, and varies the velocity at the position of the arm tip to 0.008 mm/ms at the time point indicated by reference sign A in FIG. 27 (when the magnitude of the force exceeds 1.0 N), as well as varies the velocity at the position of the arm tip to 0.015 mm/ms at the time point indicated by reference sign B (when the magnitude of the force exceeds 3.0 N). By performing sensor feedback in this manner, it is possible to more accurately play back the motion previously taught during the playback motion, in comparison to the case of not performing sensor feedback.

Figure 29:
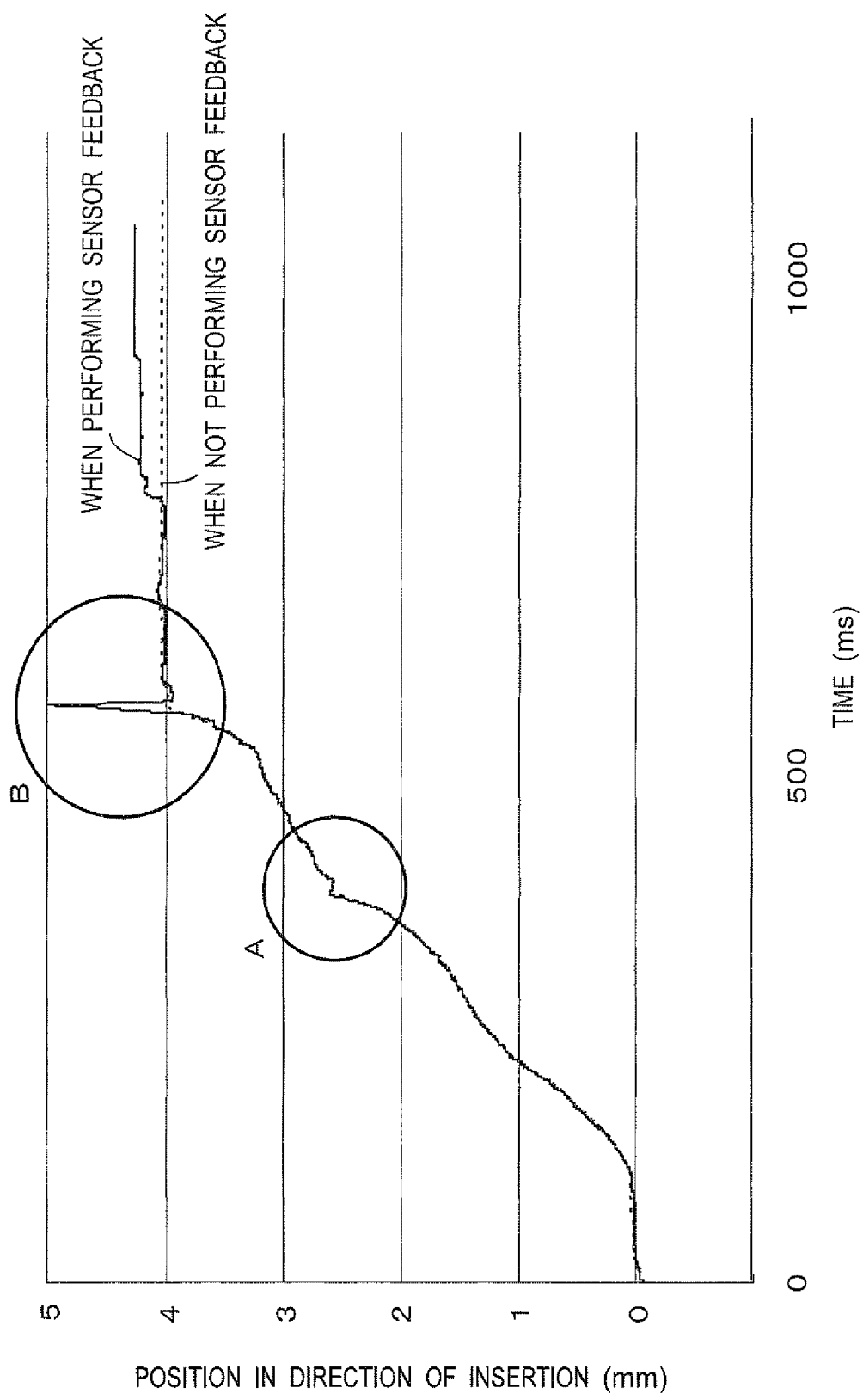
FIG. 29 is an explanatory view indicating a trajectory with use of sensor feedback in the robot according to the fourth embodiment of the present invention.

Described with reference to the test result indicated in FIG. 29 are differences between the trajectory during the playback motion in the case of performing sensor feedback and the trajectory during the playback motion in the case of not performing sensor feedback. FIG. 29 indicates temporal change at the position of the arm tip of the manipulator 101 in the direction of inserting the flexible board 2401 into the connector 2402. In the graph shown in FIG. 29, the solid line indicates the trajectory during the playback motion in the case of performing sensor feedback. The dashed line indicates the trajectory during the playback motion in the case of not performing sensor feedback. The transverse axis in FIG. 29 indicates the test times (ms), and by setting the start time of the test at 0 ms, indicates the period from the start time to the end time of the test. The ordinate axis indicates the positions (mm) of the arm tip of the manipulator 101 in the direction of inserting the flexible board 2401. It is recognized from the solid line in the graph of FIG. 29 that, by performing sensor feedback, the arm tip is shifted quickly at the time point indicated by reference sign A in FIG. 29 (when the magnitude of the force exceeds 1.0 N), and the arm tip is shifted more quickly at the time point indicated by reference sign B (when the magnitude of the force exceeds 3.0 N). In this test, on the trajectory obtained by performing sensor feedback, the flexible board 2401 is successfully inserted automatically into the connector 2402. To the contrary, on the trajectory obtained by not performing sensor feedback, the arm tip is not shifted quickly at the time point indicated by reference sign B and the insertion is therefore unsuccessful. These results show that the teaching motion can be played back accurately by performing sensor feedback.

Figure 30:
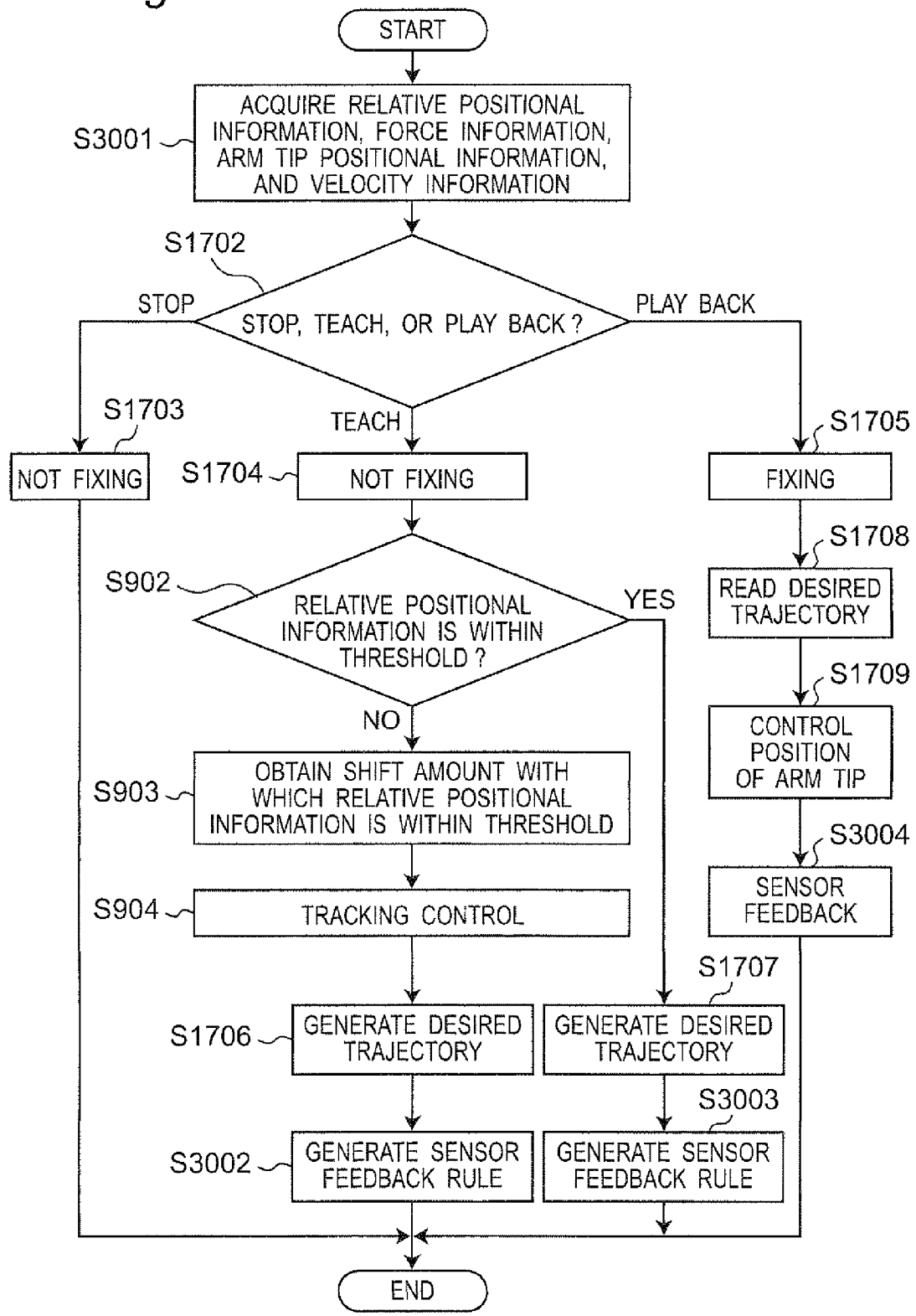
FIG. 30 is a flowchart showing a flow of process steps from acquiring relative positional information, force information, and arm tip positional information to performing tracking control and arm tip positional control in the robot according to the fourth embodiment of the present invention.

Described below with reference to the flowchart shown in FIG. 30 is the operation process of the control apparatus 602 for the robot arm in the robot according to the fourth embodiment.

In step S3001, the relative positional information acquisition unit 607 acquires, by way of the input/output IF 608, relative positional information on the grip portion 103 with respect to the end effector 102. The force information acquisition unit 2301 acquires externally by way of the input/output IF 608, force information applied to the grip portion 103. Furthermore, the arm tip positional information acquisition unit 1204 acquires arm tip positional information on the manipulator 101 by way of the input/output IF 608. Moreover, the control unit 605 acquires velocity information on the manipulator 101 in accordance with the arm tip positional information acquired by the arm tip positional information acquisition unit 1204.

In step S1702, the mode switch unit 1201 switches the control mode of the manipulator 101 among the "stopped mode", the "teaching mode", and the "playback mode" in accordance with a signal received from the input/output IF 608. In the switching motion of the control mode by the mode switch unit 1201 by means of the operation of the changeover switch 608a of the input/output IF 608, the process proceeds to step S1703 if the "stopped mode" is selected. The process proceeds to step S1704 if the "teaching mode" is selected. The process proceeds to step S1705 if the "playback mode" is selected.

In step S1703, the fixing switch unit 1202 drives and controls the fixing portions 1001 in accordance with the fixing switch information received from the mode switch unit 1201 so that the fixing portions 1001 are located at the accommodated positions and the end effector 102 and the grip portion 103 are mechanically separated from each other (the "not fixing" state), and this flow is ended.

In step S1704, the fixing switch unit 1202 drives and controls the fixing portions 1001 in accordance with the fixing switch information received from the mode switch unit 1201 so that the fixing portions 1001 are located at the accommodated positions and the end effector 102 and the grip portion 103 are mechanically separated from each other (the "not fixing" state), and the process proceeds to step S902.

Then in step S902, the tracking control unit 606 determines whether or not the relative positional information acquired from the relative positional information acquisition unit 607 is within the range of the predetermined threshold. If the tracking control unit 606 determines that the relative positional information is within the range of the threshold, the process proceeds to step S1707. If the tracking control unit 606 determines that the relative positional information is not within the range of the threshold, the process proceeds to step S903.

In step S903, the tracking control unit 606 obtains a shift amount with which the relative positional information exceeding the range of the threshold is modified to be within the range of the threshold, as described earlier. The shift amount obtained by the tracking control unit 606 is transmitted from the tracking control unit 606 to the control unit 605, and then the process proceeds to step S904.

Then in step S904, the control unit 605 performs tracking control on the manipulator 101 in accordance with the shift amount acquired from the tracking control unit 606, and then the process proceeds to step S1706.

Subsequently in step S1706, the desired trajectory generation unit 1203 obtains grip portion positional information r based on the relative positional information Δr acquired by the relative positional information acquisition unit 607 and the arm tip positional information $r_0$ acquired by the arm tip positional information acquisition unit 1204, and generates a desired trajectory. Information on the desired trajectory thus generated is stored in the internal storage unit of the desired trajectory generation unit 1203, and the process proceeds to step S3002.

Then in step S3002, the control unit 605 generates a sensor feedback rule on the basis of the velocity information acquired by the control unit 605, the force information acquired by the force information acquisition unit 2301, and the desired trajectory generated by the desired trajectory generation unit 1203. Subsequently, this flow is ended.

On the other hand, in step S 1707, the desired trajectory generation unit 1203 obtains grip portion positional information r based on the relative positional information Δr acquired by the relative positional information acquisition unit 607 and the arm tip positional information $r_0$ acquired by the arm tip positional information acquisition unit 1204, and generates a desired trajectory. Information on the desired trajectory thus generated is stored in the internal storage unit of the desired trajectory generation unit 1203, and the process proceeds to step S3003.

Then in step S3003, the control unit 605 generates a sensor feedback rule on the basis of the velocity information acquired by the control unit 605, the force information acquired by the force information acquisition unit 2301, and the desired trajectory generated by the desired trajectory generation unit 1203. Subsequently, this flow is ended.

In step S1705, the fixing switch unit 1202 drives and controls the fixing portions 1001 in accordance with the fixing switch information received from the mode switch unit 1201 so that the fixing portions 1001 are located at the fixed positions and the end effector 102 and the grip portion 103 are fixed by the fixing portions 1001 (the "fixing" state), and the process proceeds to step S1708.

Then in step S1708, the control unit 605 reads the desired trajectory thus generated by the desired trajectory generation unit 1203, and the process proceeds to step S1709.

Subsequently in step S1709, the control unit 605 controls the manipulator 101 so that the position of the grip portion follows the desired trajectory read into the control unit 605, and the process proceeds to step S3004.

Then in step S3004, the control unit 605 controls the position of the arm tip of the manipulator 101 on the basis of the sensor feedback rule thus generated in accordance with the force information acquired by the force information acquisition unit 2301, and this flow is ended.

In the fourth embodiment, there is further provided the force information acquisition unit 2301 for acquiring information on the force externally applied to the grip portion. Accordingly, force information can be acquired during the teaching motion or during the playback motion, and it is possible to teach a task performed while a person is feeling reactive force (such as a task of inserting a flexible board or a task of thread fastening). Furthermore, by performing sensor feedback during the playback motion, the motion can be modified in accordance with the force information acquired during the playback motion. Therefore, it is possible to more accurately play back the motion previously taught in accordance with the force information, in comparison to the case of not performing sensor feedback.

It is noted that the present invention is not limited to the embodiments having been described, but can be embodied in other various aspects. For example, in each of the above embodiments, the control apparatus is configured by an ordinary personal computer in terms of hardware, and the portions except for the input/output IF 608 can be realized in terms of software as a control program to be executed by the personal computer. Therefore, the control apparatus is caused to function by executing the control program used for controlling the motions of the robot by means of the personal computer.

Though the present invention has been described above based on the above first to fourth embodiments, the present invention should not be limited to the above-described first to fourth embodiments. For example, the present invention also includes the following cases.

Each of the above-described apparatuses is actually a computer system that includes, for example, a microprocessor, ROM, RAM, hard disk unit, display unit, keyboard, and mouse. A computer program is stored on the RAM or the hard disk unit. Functions of each of the apparatuses can be achieved by the microprocessor operating according to the computer program. The computer program mentioned here is a combination of a plurality of instruction codes that indicate commands to a computer for achieving predetermined functions.

In other words, in each of the above-mentioned embodiments, each component may be composed of dedicated hardware, or implemented by executing programs for components feasible with software. Each component can be implemented as a result that a program executing part such as a CPU reads and executes software programs recorded in a recording medium such as a hard disk or semiconductor memory. Here, software that implements an information-processing device according to each of the above-mentioned embodiments is a following program. That is to say, this program has a computer execute the units/steps defined in claims. The program has a computer execute the units/steps defined in claims. That is, such a program is a control program of a robot arm, for controlling a motion of the robot arm including: an end effector attached to a main body of the robot arm touched and operated by a person and caused to perform a task; and a grip portion attached to the main body of the robot arm so as to be separated from the end effector with a gap of a predetermined size being provided therebetween, the grip portion being relatively shiftable with respect to the end effector and being gripped by the person during the operation, the control program causing a computer to execute steps of:

acquiring, by a relative positional information acquisition unit, information on a relative position of the grip portion with respect to the end effector during the operation;

obtaining, by a tracking control unit, a shift amount of the robot arm in order to perform tracking control of shifting the robot arm in accordance with an amount of variation of a size of the gap between the end effector and the grip portion so that the information on the relative position acquired by the relative positional information acquisition unit is within a range of a predetermined threshold;

controlling, by a control unit, the robot arm so as to shift in accordance with the amount of variation of the size of the gap between the end effector and the grip portion, based on the shift amount of the robot arm obtained by the tracking control unit;

maintaining the size of the gap between the end effector and the grip portion, by a fixing portion including a fixing member shiftable between a fixed position where the fixing member is in contact with the end effector and the grip portion to fix the end effector and the grip portion and restrict relative shift between the end effector and the grip portion, and an accommodated position where the fixed member is accommodated in the end effector or in the grip portion and allows the end effector and the grip portion to shift relatively, when the fixing member is located at the fixed position;

switching, by a mode switch unit, between a "teaching mode" and a "playback mode" as a control mode of the robot arm;

switching, by a fixing switch unit, between a fixing state where, when the mode switch unit switches to the "playback mode", the fixing portion is located at the fixed position to fix the end effector and the grip portion and maintain the size of the gap between the end effector and the grip portion, and a relatively shiftable state where, when the mode switch unit switches to the "teaching mode", the fixing portion is located at the accommodated position and allows the end effector and the grip portion to shift relatively without maintaining the size of the gap between the end effector and the grip portion;

acquiring, by an arm tip positional information acquisition unit, positional information on the end effector of the robot arm during the "teaching mode";

generating, by a desired trajectory generation unit, a desired trajectory of the end effector of the robot arm during the "teaching mode", based on the arm tip positional information acquired by the arm tip positional information acquisition unit and the information on the relative position acquired by the relative positional information acquisition unit; and causing, by the control unit, the tracking control unit to perform tracking control on the robot arm moving in accordance with a teaching operation of the person when the mode switch unit switches to the "teaching mode", and controlling, by the control unit, the robot arm in accordance with the desired trajectory generated by the desired trajectory generation unit when the mode switch unit switches to the "playback mode".

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining the arbitrary embodiment(s) or modification(s) of the aforementioned various embodiments and modifications, the effects possessed by the embodiment(s) or modification(s) can be produced.

Industrial Applicability

In the control apparatus and the control method for the robot arm, the robot, the control program for a robot arm, and the integrated electronic circuit according to the present invention, the end effector attached to the main body of the robot arm and the grip portion gripped by a person are mechanically separated from each other, and the robot arm can be operated by the person who handles the grip portion. Therefore, the present invention is useful as a control apparatus and a control method for a robot arm, a robot, a control program for a robot arm, and an integrated electronic circuit in a movable mechanism in an industrial robot, a production plant, or the like. Furthermore, the control apparatus and the control method for the robot arm, the robot, the control program for the robot arm, and the integrated electronic circuit according to the present invention may be possibly applicable as a robot arm of a domestic robot in addition to an industrial robot, a control apparatus and a control method for a robot arm, a robot, a control program for the robot arm, and an integrated electronic circuit.

Although the present invention has been fully described in connection with the embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A control apparatus of a robot arm, for controlling a motion of the robot arm, the control apparatus comprising:
an end effector attached to a main body of the robot arm touched and operated by a person and caused to perform a task;
a grip portion attached to the main body of the robot arm so as to be separated from the end effector with a gap of a predetermined size being provided therebetween, the grip portion being relatively shiftable with respect to the end effector and being gripped by the person during the operation;
a relative positional information acquisition unit that acquires information on a relative position of the grip portion with respect to the end effector during the operation;
a tracking control unit that obtains a shift amount of the robot arm in order to perform tracking control of shifting the robot arm in accordance with an amount of variation of a size of the gap between the end effector and the grip portion so that the information on the relative position acquired by the relative positional information acquisition unit is within a range of a predetermined threshold;
a control unit that controls the robot arm so as to shift in accordance with the amount of variation of the size of the gap between the end effector and the grip portion, based on the shift amount of the robot arm obtained by the tracking control unit;
a fixing portion including a fixing member shiftable between a fixed position where the fixing member is in contact with the end effector and the grip portion to fix the end effector and the grip portion and restrict relative shift between the end effector and the grip portion, and an accommodated position where the fixed member is accommodated in the end effector or in the grip portion and allows the end effector and the grip portion to shift relatively, the fixing portion maintaining the size of the gap between the end effector and the grip portion when the fixing member is located at the fixed position;
a mode switch unit that switches between a "teaching mode" and a "playback mode" as a control mode of the robot arm;
a fixing switch unit that switches between a fixing state where, when the mode switch unit switches to the "playback mode", the fixing portion is located at the fixed position to fix the end effector and the grip portion and maintain the size of the gap between the end effector and the grip portion, and a relatively shiftable state where, when the mode switch unit switches to the "teaching mode", the fixing portion is located at the accommodated position and allows the end effector and the grip portion to shift relatively without maintaining the size of the gap between the end effector and the grip portion;
an arm tip positional information acquisition unit that acquires positional information on the end effector of the robot arm during the "teaching mode"; and
a desired trajectory generation unit that generates a desired trajectory of the end effector of the robot arm during the "teaching mode", based on the arm tip positional information acquired by the arm tip positional information acquisition unit and the information on the relative position acquired by the relative positional information acquisition unit, wherein the control unit causes the tracking control unit to perform tracking control on the robot arm moving in accordance with a teaching operation of the person when the mode switch unit switches to the "teaching mode", and controls the robot arm in accordance with the desired trajectory generated by the desired trajectory generation unit when the mode switch unit switches to the "playback mode".

2. The control apparatus for a robot arm according to claim 1, further comprising;

a movable region acquisition unit that acquires a movable region of the robot arm; and a movable region limiting unit that obtains a limited region smaller than the movable region, from the movable region acquired by the movable region acquisition unit and the information on the relative position acquired by the relative positional information acquisition unit; wherein in the "teaching mode", the control unit controls the robot arm to be limitedly movable only within the limited region obtained by the movable region limiting unit.

3. The control apparatus for a robot arm according to claim 1, further comprising:

a force information acquisition unit that acquires information on force externally applied to the grip portion; wherein the control unit controls the robot arm so that the robot arm is taught and plays back a task performed with contact between the person and the grip portion, based on the force information acquired by the force information acquisition unit.

4. The control apparatus for a robot arm according to claim 3, wherein the control unit generates a sensor feedback rule in the "teaching mode" based on the desired trajectory generated by the desired trajectory generation unit and the force information acquired by the force information acquisition unit, and controls the motion of the robot arm in the "playback mode" in accordance with the desired trajectory, the force information acquired by the force information acquisition unit in the "playback mode", and the generated sensor feedback rule.

5. A robot comprising:
the robot arm according to claim 1; and
a control apparatus for the robot arm.

6. A control method of a robot arm, for controlling a motion of the robot arm including: an end effector attached to a main body of the robot arm touched and operated by a person and caused to perform a task; and a grip portion attached to the main body of the robot arm so as to be separated from the end effector with a gap of a predetermined size being provided therebetween, the grip portion being relatively shiftable with respect to the end effector and being gripped by the person during the operation, the control method comprising:

acquiring, by a relative positional information acquisition unit, information on a relative position of the grip portion with respect to the end effector during the operation;

obtaining, by a tracking control unit, a shift amount of the robot arm in order to perform tracking control of shifting the robot arm in accordance with an amount of variation of a size of the gap between the end effector and the grip portion so that the information on the relative position acquired by the relative positional information acquisition unit is within a range of a predetermined threshold;

controlling, by a control unit, the robot arm so as to shift in accordance with the amount of variation of the size of the gap between the end effector and the grip portion, based on the shift amount of the robot arm obtained by the tracking control unit;

maintaining the size of the gap between the end effector and the grip portion, by a fixing portion including a fixing member shiftable between a fixed position where the fixing member is in contact with the end effector and the grip portion to fix the end effector and the grip portion and restrict relative shift between the end effector and the grip portion, and an accommodated position where the fixed member is accommodated in the end effector or in the grip portion and allows the end effector and the grip portion to shift relatively, when the fixing member is located at the fixed position;

switching, by a mode switch unit, between a "teaching mode" and a "playback mode" as a control mode of the robot arm;

switching, by a fixing switch unit, between a fixing state where, when the mode switch unit switches to the "playback mode", the fixing portion is located at the fixed position to fix the end effector and the grip portion and maintain the size of the gap between the end effector and the grip portion, and a relatively shiftable state where, when the mode switch unit switches to the "teaching mode", the fixing portion is located at the accommodated position and allows the end effector and the grip portion to shift relatively without maintaining the size of the gap between the end effector and the grip portion;

acquiring, by an arm tip positional information acquisition unit, positional information on the end effector of the robot arm during the "teaching mode"; and generating, by a desired trajectory generation unit, a desired trajectory of the end effector of the robot arm during the "teaching mode", based on the arm tip positional information acquired by the arm tip positional information acquisition unit and the information on the relative position acquired by the relative positional information acquisition unit, wherein the control unit causes the tracking control unit to perform tracking control on the robot arm moving in accordance with a teaching operation of the person when the mode switch unit switches to the "teaching mode", and controls the robot arm in accordance with the desired trajectory generated by the desired trajectory generation unit when the mode switch unit switches to the "playback mode".

7. A non-transitory computer readable medium storing a control program of a robot arm, for controlling a motion of the robot arm including: an end effector attached to a main body of the robot arm touched and operated by a person and caused to perform a task; and a grip portion attached to the main body of the robot arm so as to be separated from the end effector with a gap of a predetermined size being provided therebetween, the grip portion being relatively shiftable with respect to the end effector and being gripped by the person during the operation, the control program causing a computer to execute steps of:

acquiring, by a relative positional information acquisition unit, information on a relative position of the grip portion with respect to the end effector during the operation;

obtaining, by a tracking control unit, a shift amount of the robot arm in order to perform tracking control of shifting the robot arm in accordance with an amount of variation of a size of the gap between the end effector and the grip portion so that the information on the relative position acquired by the relative positional information acquisition unit is within a range of a predetermined threshold;
controlling, by a control unit, the robot arm so as to shift in accordance with the amount of variation of the size of the gap between the end effector and the grip portion, based on the shift amount of the robot arm obtained by the tracking control unit;
maintaining the size of the gap between the end effector and the grip portion, by a fixing portion including a fixing member shiftable between a fixed position where the fixing member is in contact with the end effector and the grip portion to fix the end effector and the grip portion and restrict relative shift between the end effector and the grip portion, and an accommodated position where the fixed member is accommodated in the end effector or in the grip portion and allows the end effector and the grip portion to shift relatively, when the fixing member is located at the fixed position;
switching, by a mode switch unit, between a "teaching mode" and a "playback mode" as a control mode of the robot arm;
switching, by a fixing switch unit, between a fixing state where, when the mode switch unit switches to the "playback mode", the fixing portion is located at the fixed position to fix the end effector and the grip portion and maintain the size of the gap between the end effector and the grip portion, and a relatively shiftable state where, when the mode switch unit switches to the "teaching mode", the fixing portion is located at the accommodated position and allows the end effector and the grip portion to shift relatively without maintaining the size of the gap between the end effector and the grip portion;
acquiring, by an arm tip positional information acquisition unit, positional information on the end effector of the robot arm during the "teaching mode";
generating, by a desired trajectory generation unit, a desired trajectory of the end effector of the robot arm during the "teaching mode", based on the arm tip positional information acquired by the arm tip positional information acquisition unit and the information on the relative position acquired by the relative positional information acquisition unit; and
causing, by the control unit, the tracking control unit to perform tracking control on the robot arm moving in accordance with a teaching operation of the person when the mode switch unit switches to the "teaching mode", and controlling, by the control unit, the robot arm in accordance with the desired trajectory generated by the desired trajectory generation unit when the mode switch unit switches to the "playback mode".

8. An integrated electronic circuit of a robot arm, for controlling a motion of the robot arm including: an end effector attached to a main body of the robot arm touched and operated by a person and caused to perform a task; and a grip portion attached to the main body of the robot arm so as to be separated from the end effector with a gap of a predetermined size being provided therebetween, the grip portion being relatively shiftable with respect to the end effector and being gripped by the person during the operation, the integrated electronic circuit configured to:
acquiring, by a relative positional information acquisition unit, information on a relative position of the grip portion with respect to the end effector during the operation;
obtaining, by a tracking control unit, a shift amount of the robot arm in order to perform tracking control of shifting the robot arm in accordance with an amount of variation of a size of the gap between the end effector and the grip portion so that the information on the relative position acquired by the relative positional information acquisition unit is within a range of a predetermined threshold;
control, by a control unit, the robot arm so as to shift in accordance with the amount of variation of the size of the gap between the end effector and the grip portion, based on the shift amount of the robot arm obtained by the tracking control unit;
maintain the size of the gap between the end effector and the grip portion, by a fixing portion including a fixing member shiftable between a fixed position where the fixing member is in contact with the end effector and the grip portion to fix the end effector and the grip portion and restrict relative shift between the end effector and the grip portion, and an accommodated position where the fixed member is accommodated in the end effector or in the grip portion and allows the end effector and the grip portion to shift relatively, when the fixing member is located at the fixed position;
switch, by a mode switch unit, between a "teaching mode" and a "playback mode" as a control mode of the robot arm;
switch, by a fixing switch unit, between a fixing state where, when the mode switch unit switches to the "playback mode", the fixing portion is located at the fixed position to fix the end effector and the grip portion and maintain the size of the gap between the end effector and the grip portion, and a relatively shiftable state where, when the mode switch unit switches to the "teaching mode", the fixing portion is located at the accommodated position and allows the end effector and the grip portion to shift relatively without maintaining the size of the gap between the end effector and the grip portion;
acquire, by an arm tip positional information acquisition unit, positional information on the end effector of the robot arm during the "teaching mode"; and
generate, by a desired trajectory generation unit, a desired trajectory of the end effector of the robot arm during the "teaching mode", based on the arm tip positional information acquired by the arm tip positional information acquisition unit and the information on the relative position acquired by the relative positional information acquisition unit, wherein
the control unit causes the tracking control unit to perform tracking control on the robot arm moving in accordance with a teaching operation of the person when the mode switch unit switches to the "teaching mode", and controls the robot arm in accordance with the desired trajectory generated by the desired trajectory generation unit when the mode switch unit switches to the "playback mode".

* * * * *